United States Patent [19]

Jones

[11] Patent Number: 4,543,654

[45] Date of Patent: Sep. 24, 1985

[54] INTERFACING A COMMUNICATION NETWORK

[75] Inventor: Donald J. Jones, Dracut, Mass.

[73] Assignee: Wang Laboratories, Inc., Lowell, Mass.

[21] Appl. No.: 463,660

[22] Filed: Feb. 3, 1983

[51] Int. Cl.$^4$ ............................. H04J 3/00; H04J 3/16
[52] U.S. Cl. ........................................ 370/94; 370/60; 370/86; 340/825.5
[58] Field of Search ............................. 370/94, 60, 86; 340/825.5

[56] References Cited

U.S. PATENT DOCUMENTS

| | | | |
|---|---|---|---|
| 4,063,220 | 12/1977 | Metcalfe et al. | 340/825.5 |
| 4,287,592 | 9/1981 | Paulish et al. | 370/94 |
| 4,317,197 | 2/1982 | Ulug | 370/94 |
| 4,320,500 | 3/1982 | Barberis et al. | 370/94 |
| 4,413,337 | 11/1983 | Dauphin et al. | 370/94 |
| 4,443,875 | 4/1984 | Blausten | 370/94 |
| 4,445,213 | 4/1984 | Baugh et al. | 370/60 |
| 4,453,247 | 6/1984 | Suzuki et al. | 370/94 |

OTHER PUBLICATIONS

Data Communications, Davis, Jan. 82.

Primary Examiner—Douglas W. Olms
Assistant Examiner—Curtis Kuntz
Attorney, Agent, or Firm—Michael H. Shanahan; Kenneth L. Milik

[57] ABSTRACT

A carrier sense multiple access with collision detection strategy ascertains for a particular network configuration the network propagation time, and promulgates a parameter p providing an indication thereof to each station of the network. Each station of the network stores p for use in making decisions about collisions. Whenever a modification of the network is made changing the propagation time, a new value of p is promulgated to the stations of the network so that the collision related decisions made by each stations's interface controller will reflect the new network configuration. Communications are formed in packets with a preamble long enough to propagate the network. The controllers analyze the signals they receive to discern whether a packet has been contaminated by an interference.

11 Claims, 52 Drawing Figures

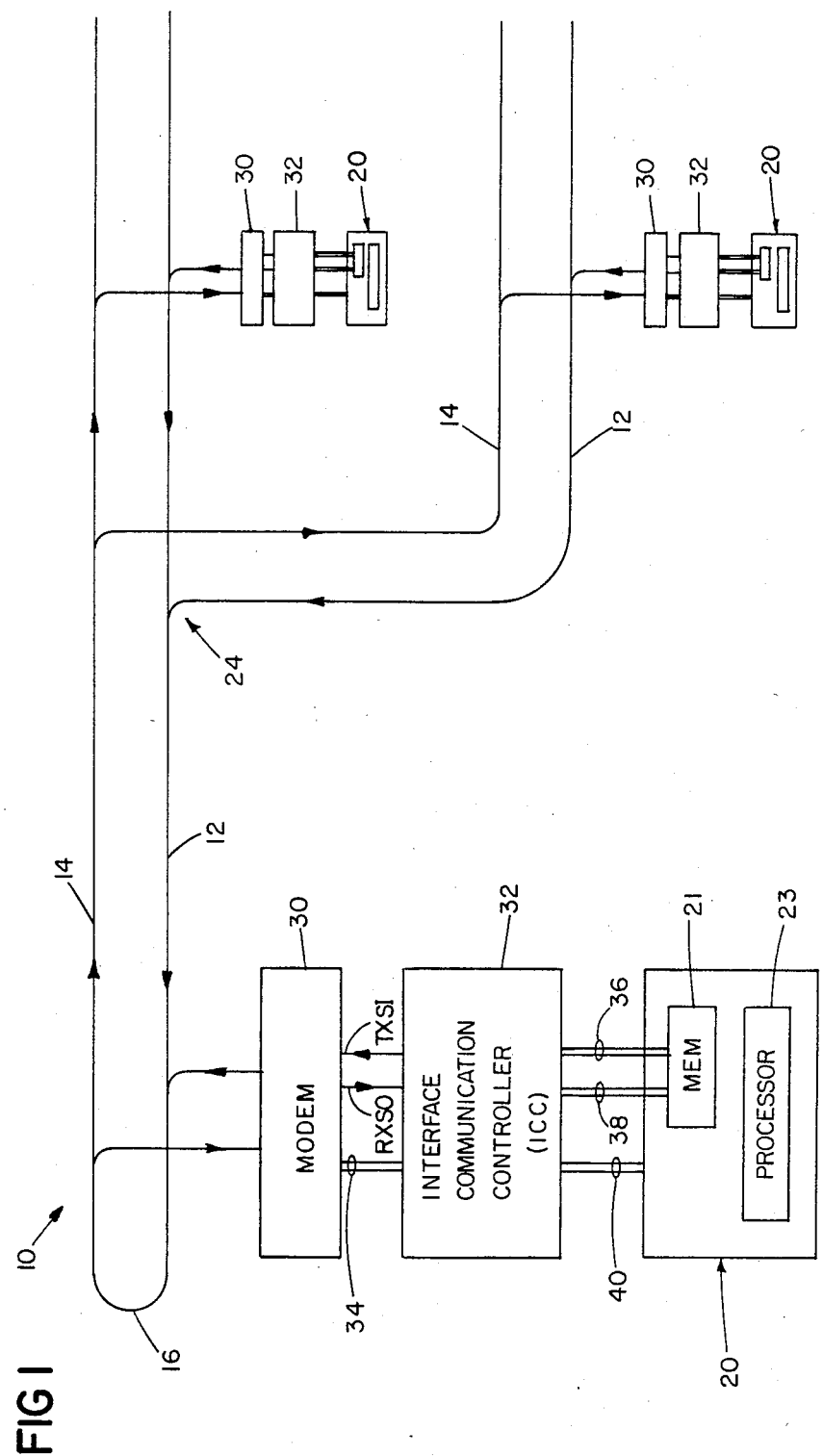

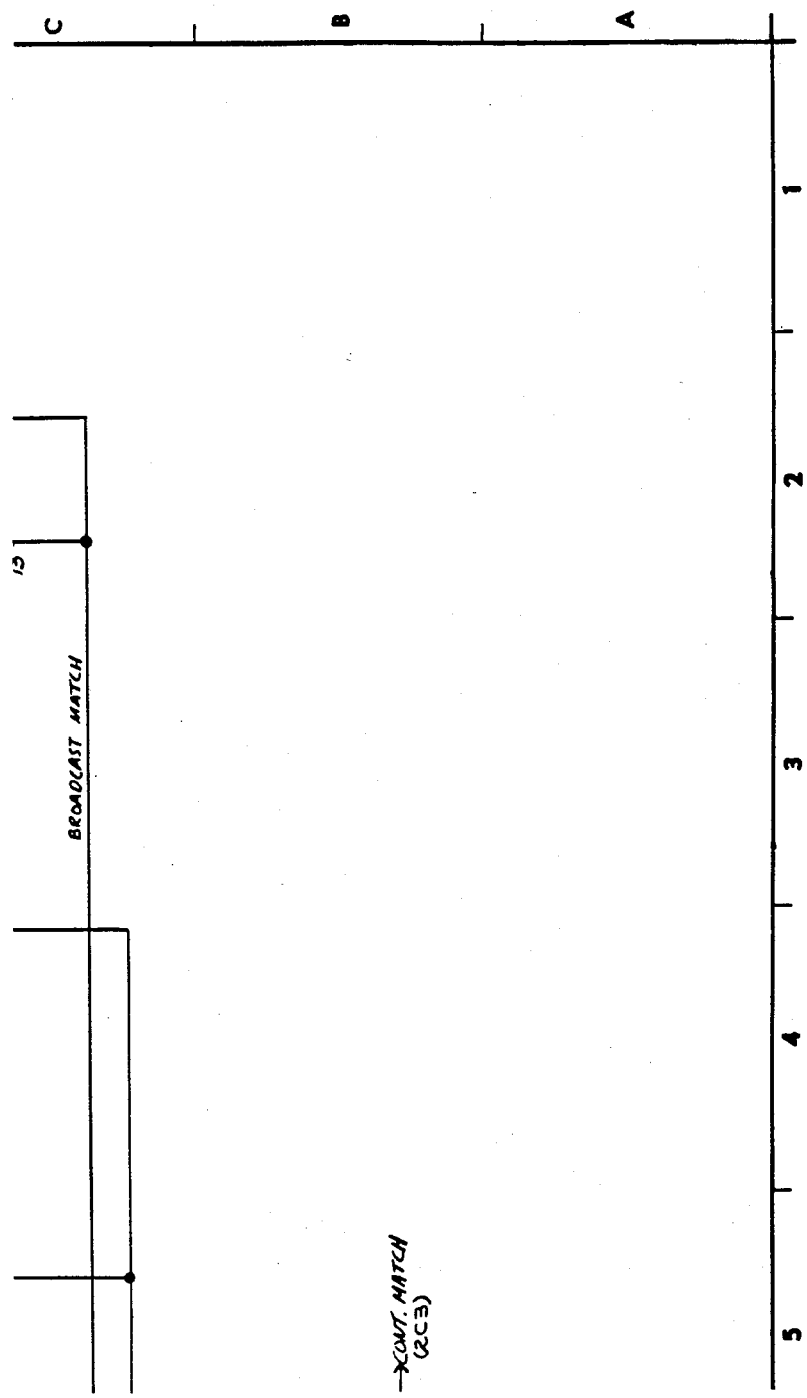

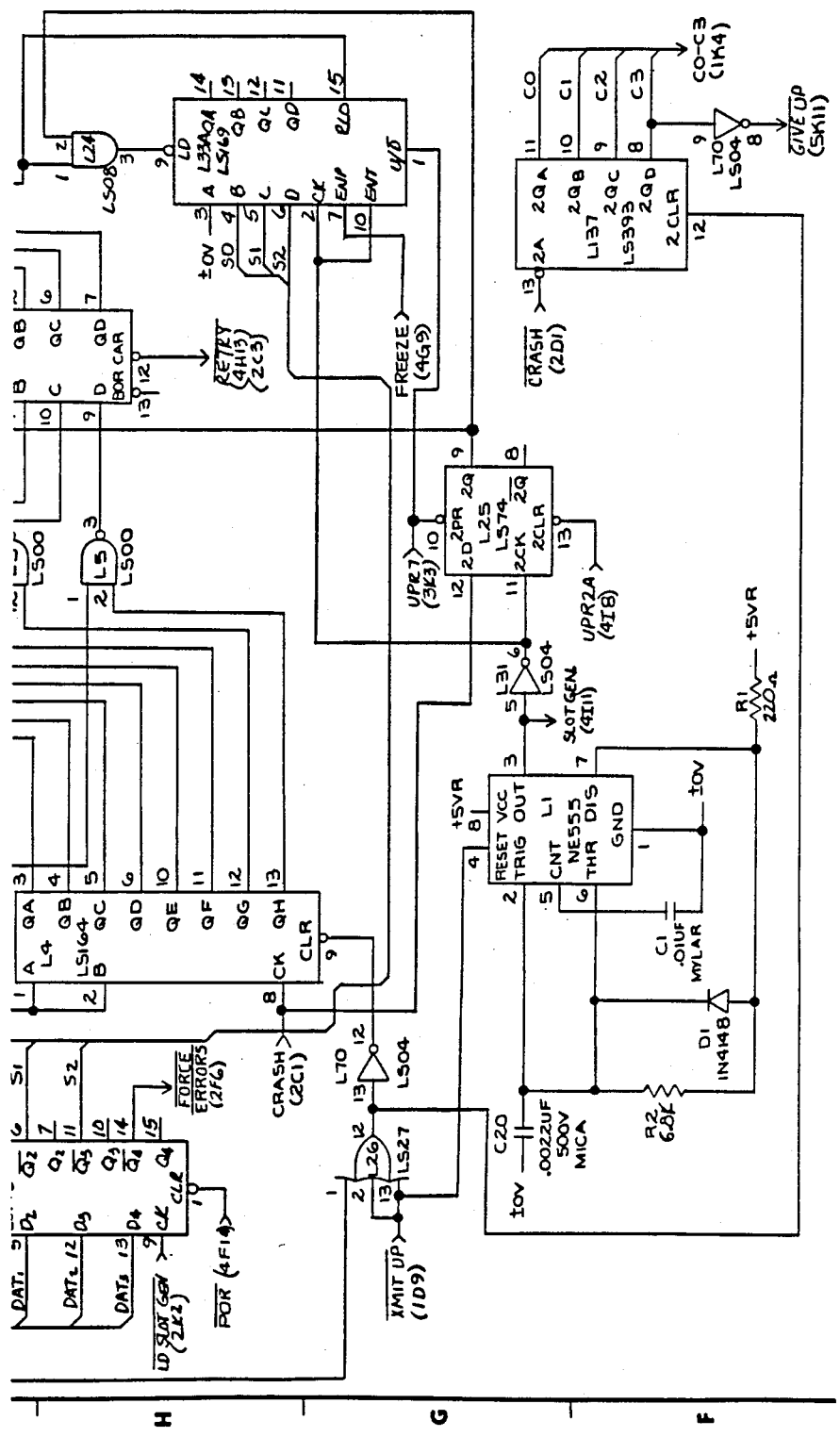

INTERFACING A COMMUNICATION NETWORK

BACKGROUND OF THE INVENTION

This invention relates to network communication and computers and particularly communication networks functioning to transfer data from a memory in one computer station to the memory of another.

Communications systems have been described which operate with inbound and outbound channels connected at a head end. (See for instance U.S. Pat. No. 4,210,780.) In these systems a station, which may be a computer or other communicating device, delivers a message consisting of a packet of serial discrete signals to the inbound channel of the network which conducts the packet to the head end of the network and thence along the outbound channel to a station designated to receive the packet. The signal transmission on the network often is carried on a modulated carrier with modems for each station to convert the modulated signals to and from the baseband signals conventionally employed by computers. Packets may be transmitted from any of a plurality of sending stations to any of a plurality of receiving stations, but only one packet may be effectively transmitted at a given time. The priority for allocation of the network to a particular transmitting station is resolved by a contention procedure in which stations wishing to transmit monitor the outbound channel and make decisions about transmission in view of what they hear.

Communication systems have been described of the general form indicated above, but these have not provided an effective contention resolving method applicable where the signal transmission rate and network length were such that a large number of signals were transmitted during the time required for a signal to propagate through the network, nor did they provide any way to adjust the operation of the system to accomodate changes in the network which in turn changed the time required to propagate a signal through the network.

SUMMARY OF THE INVENTION

The invention features a method of operating a communication network connecting a plurality of computer stations each having a memory, the function of the network being to transfer data from the memory of one station to that of another, the network having an inbound channel connected to the stations for receiving transmissions from any station and conducting such transmissions to a network head end, and an outbound channel parallel to the inbound channel and connected to the head end and to the stations for conducting transmissions from the head end to all of the stations. Data transmissions are effected over the network in the form of packets of sequential discrete signals transmitted at a uniform rate, and the time required for a signal transmitted by the ultimate station to the head on the inbound channel and thence on the outbound channel to the ultimate station is more than the time required to transmit 32 discrete signals.

The method of the invention defines a current network propagation parameter p derived from the network signaling rate and the time required for a signal transmitted from the ultimate station to propagate to the network head and back to the ultimate station, the parameter p providing an indication of the number of discrete signals n that can be transmitted from the ultimate station on the inbound channel before the first of such signals can be detected on the outbound channel at the ultimate station, promulgates p to each station, and stores the value of p at each station.

The method forms, with reference to the stored value of p, each packet for transmission so as to have greater than n discrete signals, starts to transmit a packet only when no signals are being received by the station from the outbound channel, compares, with reference to the stored value of p, the first n signals of the packet next received after starting transmission with the first n signals of the packet being transmitted to ascertain if there are discrepancies therebetween, and terminates transmission when discrepancies are discerned, and absent such discrepancies, transmits an entire packet.

The method may additionally feature revising the definition of p whenever the network is changed to reflect such changes; promulgating the revised value of p to each station of the network to supersede the previously promulgated value; forming each packet for transmission with reference to the stored value of p so as to have greater than 2n discrete signals; evaluating, with reference to the stored value of p, the number of discrete signals received in each received packet; accepting no data as valid unless received in a packet that contains more than 2n discrete signals.

The invention may further feature forming each packet for transmission to have at least 2n preliminary signals and after the preliminary signals a sequence of signals designating the station which is to receive the packet; accepting at a given station no data as valid unless received in a packet that contains a sequence of signals designating the given station.

The invention may additionally feature forming packets with a coded indication of the number q of discrete signals that can be transmitted by the sending station on the inbound channel before the first of such signals is received by the sending station on the outbound channel, the coded indication being included within the first r discrete signals of the packet, and r being uniform for all stations of the network; forming packets so as to have a number of signals greater than n plus the greater of r or its own q; analyzing at each station the first r signals of incoming packets to ascertain a putative value q' of the number of discrete signals that can be transmitted by the packet sending station on the inbound channel before the first of such signals is received by the packet sending station on the outbound channel; and accepting no data as valid unless it is in a packet with more than n plus the greater of q' or r discrete signals.

In another aspect the invention features apparatus for interfacing a communication network to one of a plurality of computer stations each having a memory, the function of the network being to transfer data from the memory of one station to that of another, the network having an inbound channel connected to the stations for receiving transmissions from any station and conducting such transmissions to a network head end, and an outbound channel parallel to the inbound channel and connected to the head end and to the stations for conducting transmissions from the head end to all of the stations, data transmissions being effected over the network in the form of packets of sequential discrete signals transmitted at a uniform rate, and the time required for a signal transmitted by the ultimate station to the head on the inbound channel and thence on the outbound channel to the ultimate station being more than the time required to transmit 32 discrete signals. The invention includes packet transmitting means and packet receiving means, network parameter storing means for receiving and storing a current network propagation parameter p indicative of the number n of sequential discrete signals which may be transmitted onto the inbound channel by the ultimate station before the first such signal is received by the ultimate station from the outbound channel, channel activity sensing means to receive an indication of activity on the outbound channel, delaying means to delay starting to transmit until no signals are being received from the outbound channel, packet assembling means for assembling each packet for transmission so as to have the total packet length greater than n discrete signals, and comparing means for comparing the first n signals of the packet next received after starting transmission with the first n signals of the packet being transmitted, transmission terminating means for terminating transmission when discrepancies are discerned in such comparing, and absent such discrepancies, transmitting an entire packet.

The invention may additionally feature means for assembling each packet for transmission with an initial sequence of at least 2n signals followed by a receiving station address sequence designating the station which is to receive the packet and positioning all packet data following after the receiving station address sequence; discriminating means that accepts no data that is not preceded in a received packet with a signal sequence designating the address of the apparatus; assembling means for assembling each packet to have greater than 2n discrete signals; counting means for counting the number of discrete signals received in each received packet; discriminating means for accepting no data as valid unless received in a packet that contains more than 2n discrete signals; packet assembling means for assembling within the first n signals in each packet a contention field containing a periodicly repeating sequence of signals, the number of repeats of such sequence being dependent on the stored value of p; and packet assembling means which assembles within the first n signals in each packet a sequence of signals uniquely identifying the apparatus.

In another aspect the invention features in apparatus for interfacing a computer station with a communication network, the interfacing apparatus from time to time receiving a packet with data from the network and storing the data therefrom in a station memory at a location assigned by the station and identified by an address an address queue means for storing a plurality of addresses, the addresses being ordered by age in the address queue means, an address queue storing means for receiving from the station an address designating a location in station memory where data from a packet to be received is to be stored, and for storing the address when received in the address queue means, the address queue operating to present successive addresses with an interval shorter than the time required by the computer station to supply a new address, data entry means for entering data from a packet on arrival thereof in the station memory at a location identified by the oldest address in the address queue means and, when the packet data has been validly stored, cancelling the oldest address from the address queue means, whereby the interfacing apparatus enters data from packets into the station memory at preassigned locations during periods wherein data packets are received from the network at a rate exceeding the maximum rate at which the station is capable of assigning addresses.

BRIEF DESCRIPTION OF THE DRAWING

FIG. 1 shows a block diagram of a communication network with computer stations connected thereto through an interfacing controller in accordance with the invention.

FIGS. 2-1a, 2-1b, 2-1c, 2-1d, 2-1e, 2-1f, 2-1g, 2-1h, 2-1i, 2-1j, 2-1k, 2-1l, 2-2a, 2-2b, 2-2c, 2-2d, 2-2e, 2-2f, 2-2g, 2-2h, 2-2i, 2-2j, 2-2k, 2-2l, 2-3a, 2-3b, 2-3c, 2-3d, 2-3e, 2-3f, 2-3g, 2-3h, 2-3i, 2-3j, 2-3k, 2-3l, 2-4a, 2-4b, 2-4c, 2-4d, 2-4e, 2-4f, 2-4g, 2-4h, 2-4i, 2-4j, 2-4k, 2-4l, 2-5a, and 2-5d are in the aggregate the schematic wiring diagram of the interfacing controller of FIG. 1. Multipart FIG. 2 should be reconstituted into 5 sheets by placing the lettered fragments together edge to edge, twelve fragments being joined for each of composite FIGS. 2-1, 2-2, 2-3, and 2-4, and two fragments being joined for FIG. 2-5. In order to avoid a clutter of lines a number of connecting leads are not shown in full but are terminated with an arrowhead and a notation identifying the lead and the location on the drawing where it goes, the location being given by a first number, a letter, and a second number all in parenthesis. The first number indicates the drawing sheet; the letter and the second number indicates, by reference to the edge marking, the place on the sheet. At the designated place will be found a lead starting with an arrowtail and a notation identifying the lead and an indication in parenthesis of the origin of the lead. The arrowhead and arrowtail thus coupled are to be considered as connected.

FIG. 3 shows the organization of packets employed in the invention.

DESCRIPTION OF EMBODIMENT

Figures 1A, 2:
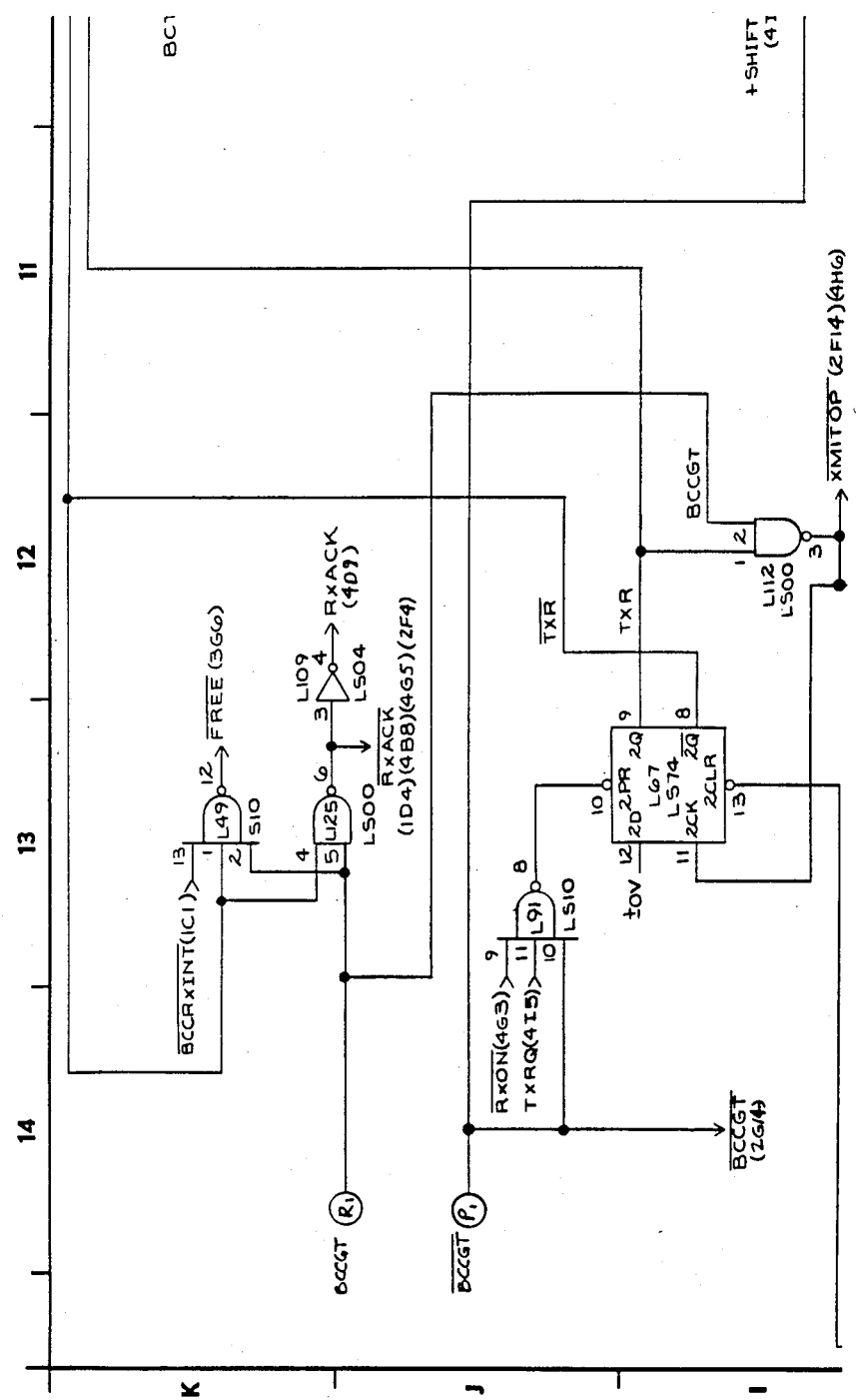
Figures 1B, 2:
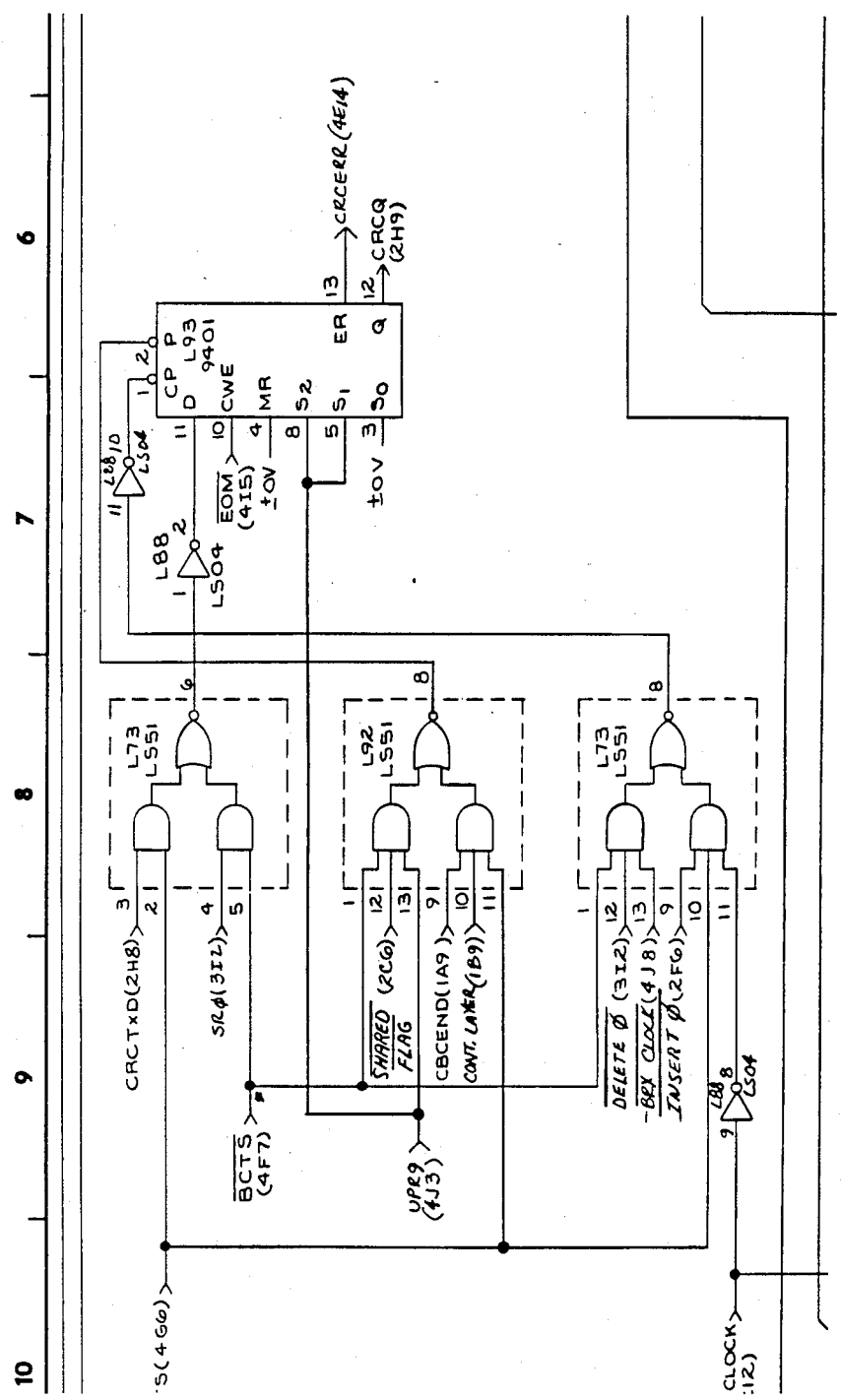
Figures 1C, 2:
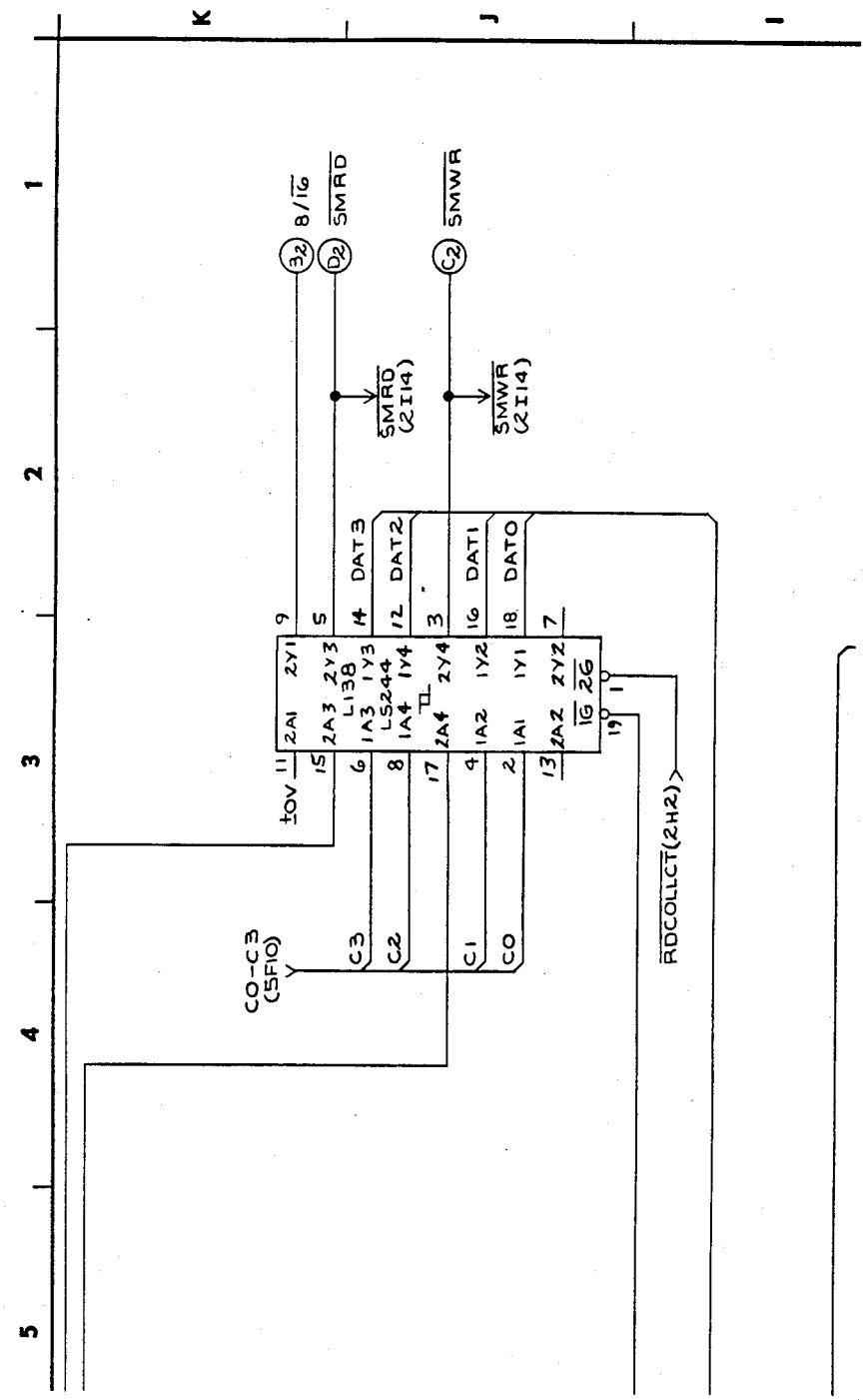
Figures 1D, 2:
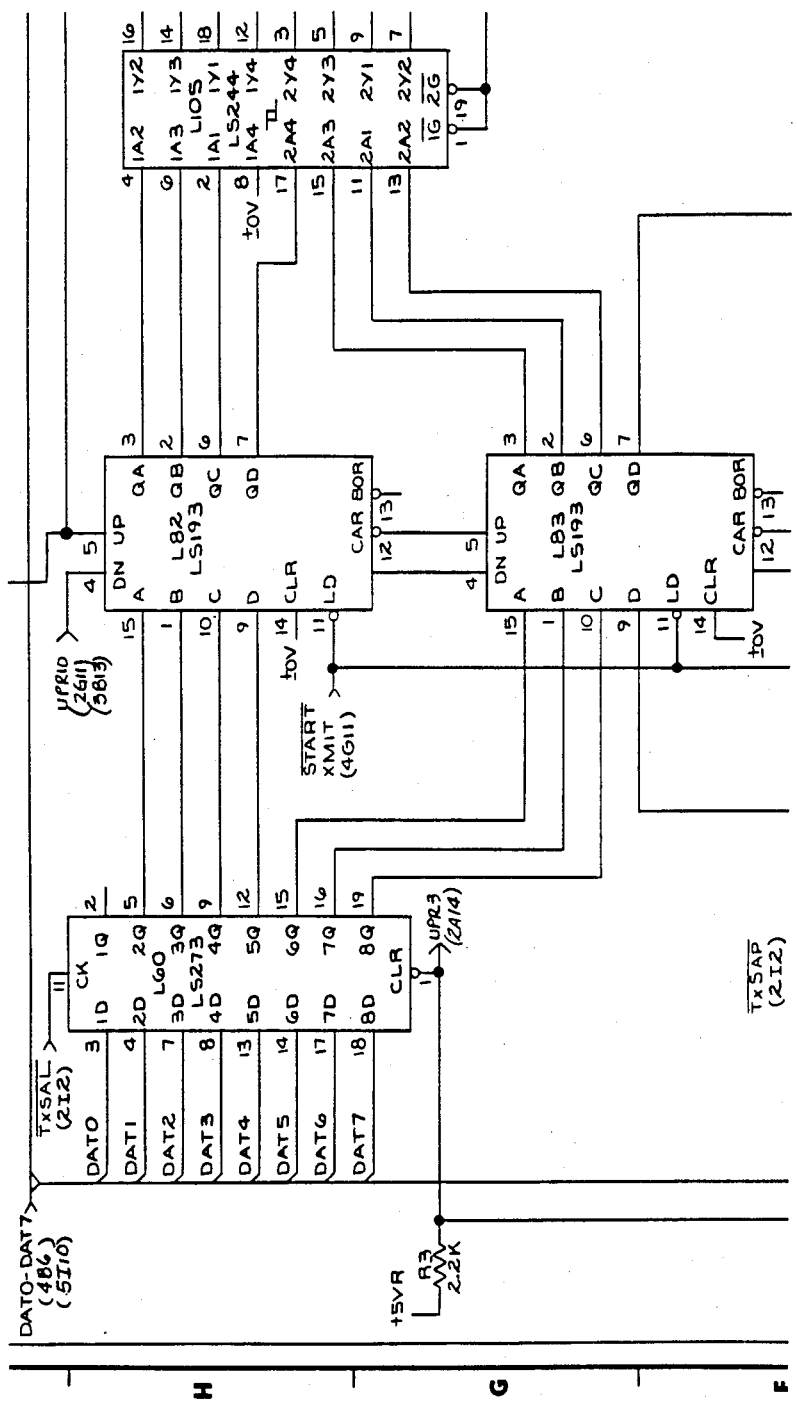
Figures 1E, 2:
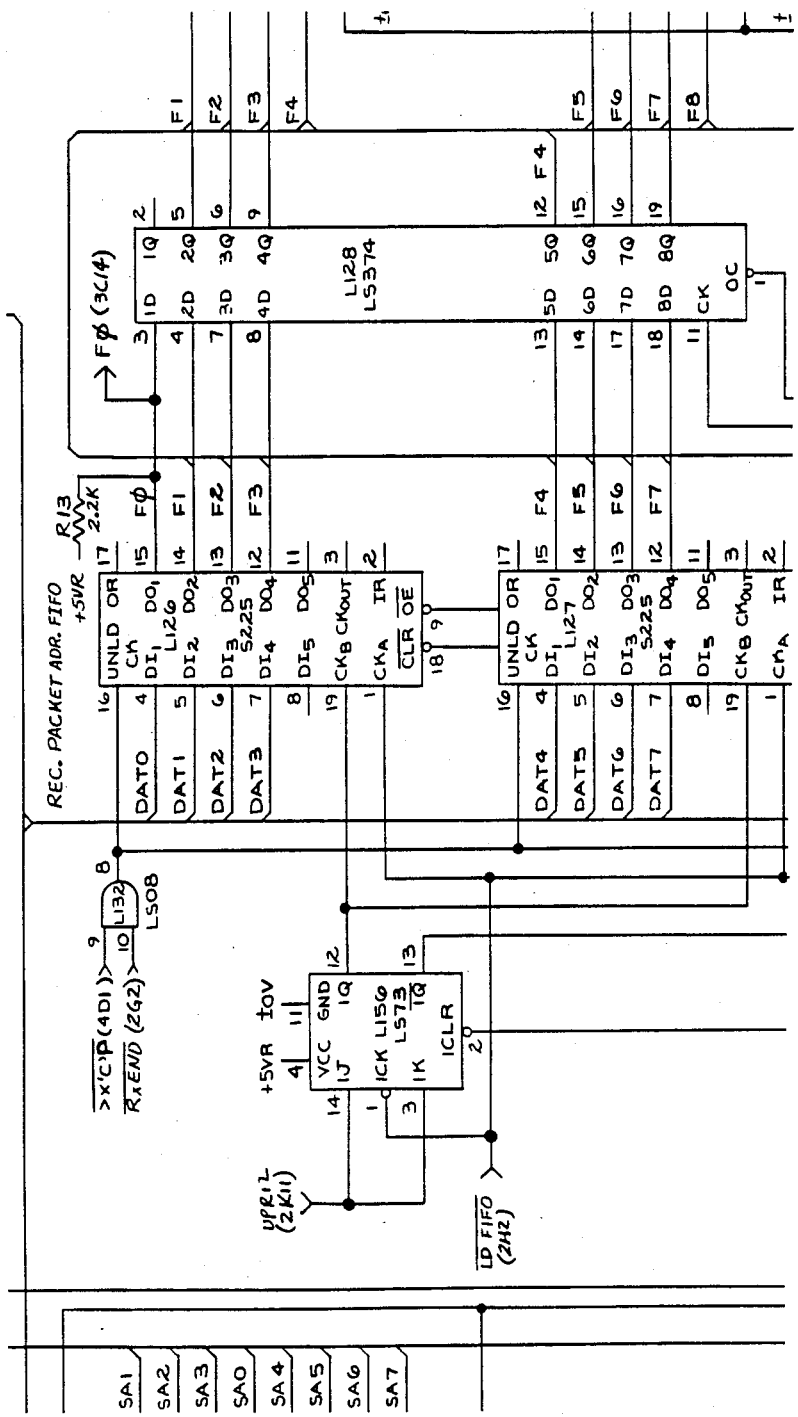
Figures 1F, 2:
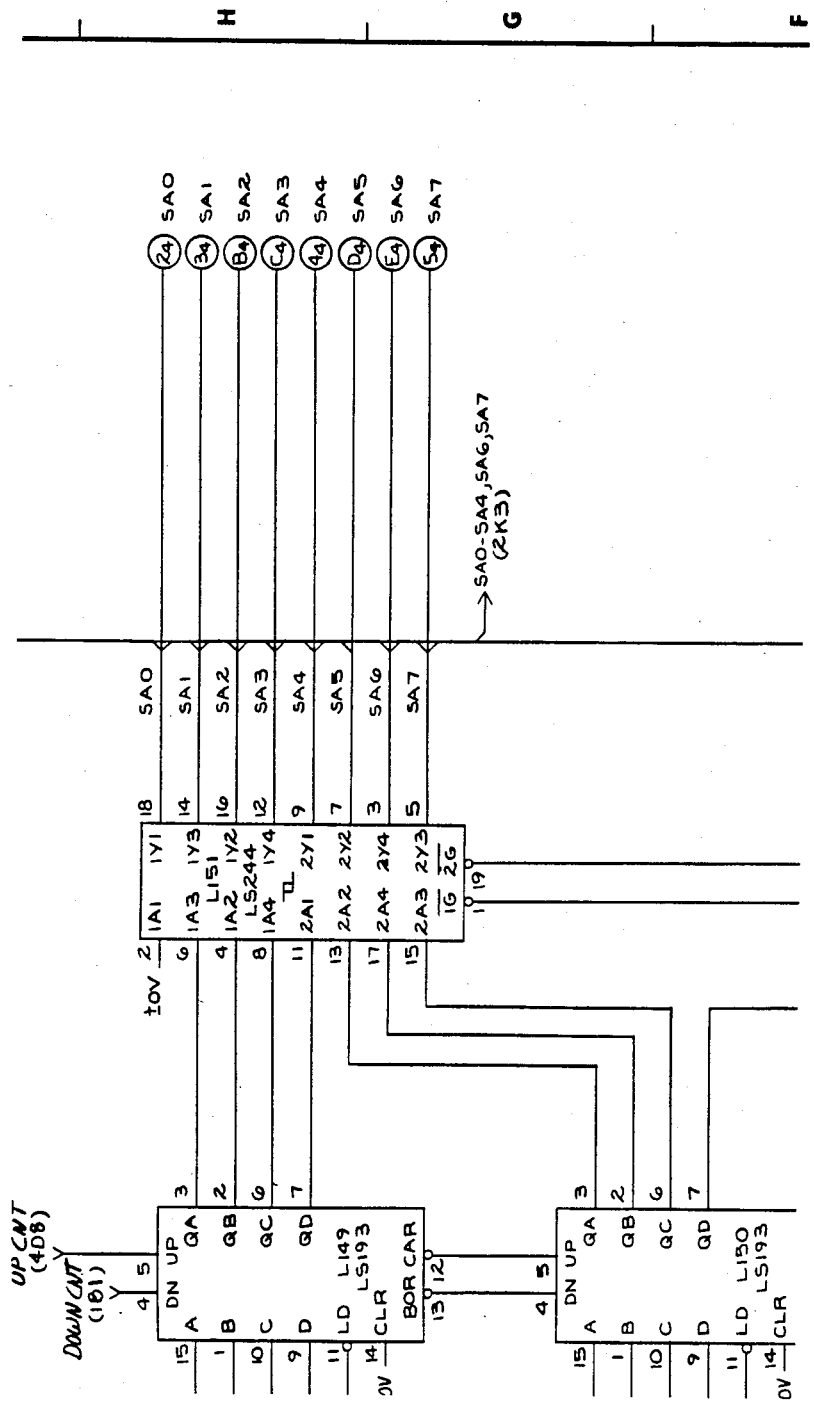
Figures 1G, 2:
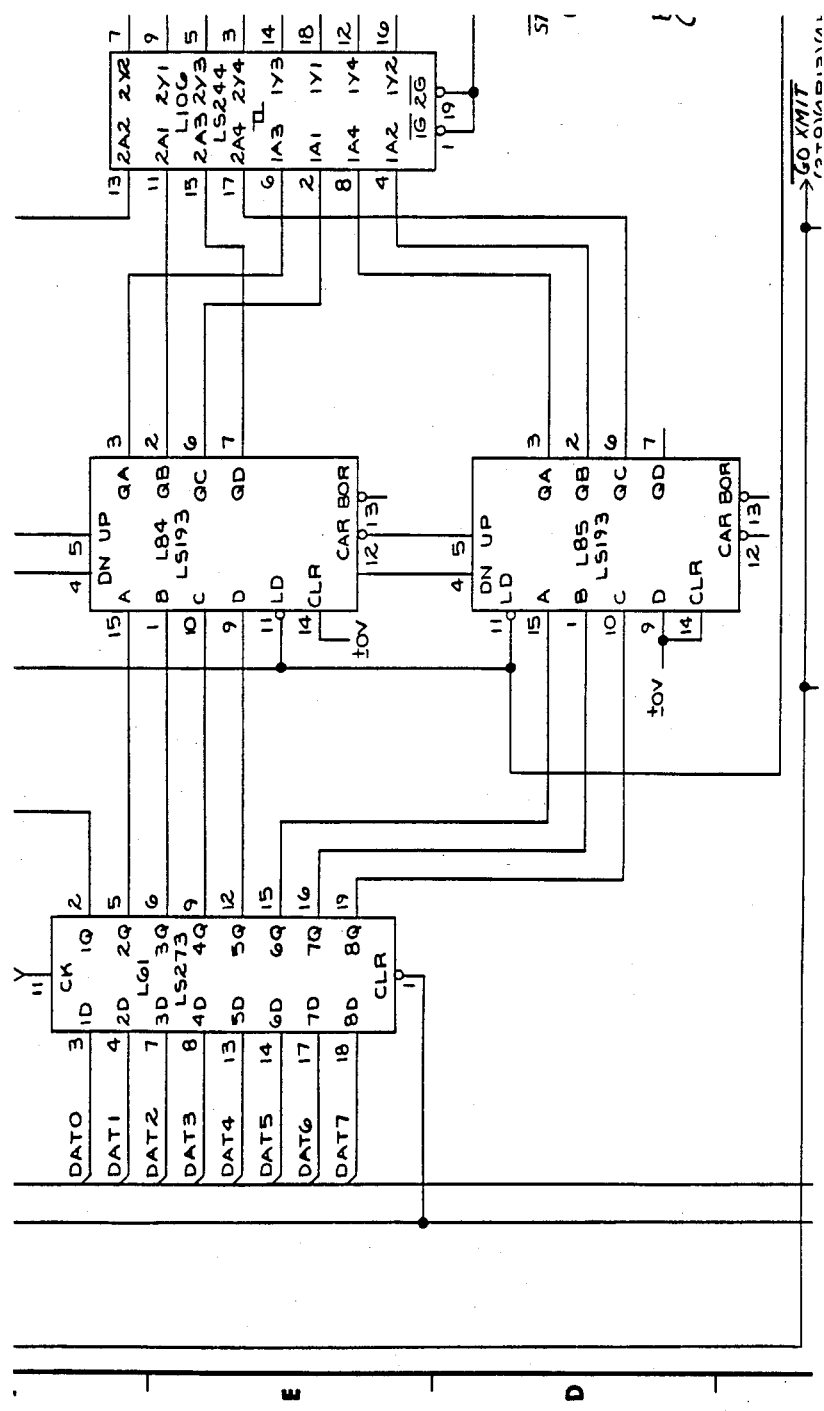
Figures 1H, 2:
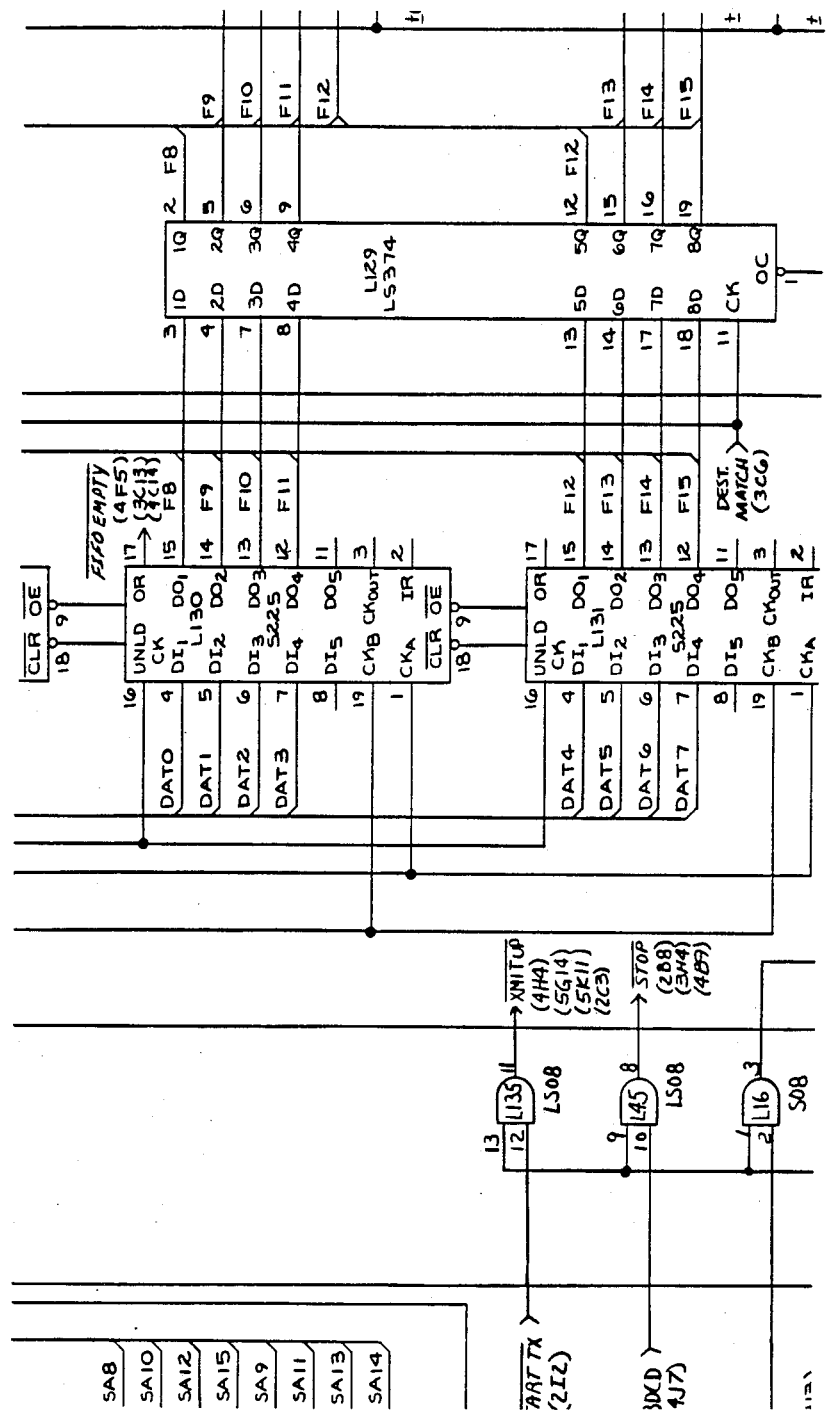

As shown schematically in FIG. 1, communication network 10 includes inbound channel 12 and generally parallel outbound channel 14, connecting at head end 16. Each of dispersed plurality of computer stations 20 are connected to both the inbound and outbound channels through a modem 30 and an interface controller 32. Network 10 may have one or more branchings such as branching 24. Further, network 10 may extend over considerable distances so that appreciable time may be required for a signal to propagate from one point of a channel to another. It will be convenient to designate the station requiring the longest time for a signal to propagate therefrom to the head end as the ultimate station of the network.

Network channels 12 and 14 may employ any of a variety of technologies for transmitting signals, but may advantageously employ a modulated carrier transmitted over coaxial cable connected to stations through modems. The cables may be fitted with amplifiers, splitters, terminators, and taps in accordance with well known art for maintaining signal strength and matching impedances.

Computer station 20 may have any of a variety of functions, but in any case will have a memory 21 and a processor 23, and, it is assumed, will need from time to time to transfer data between its memory and that of other computer stations connected to the network.

Controller 32 is connected through modem 30 to outbound channel 14 to receive therefrom signals and to inbound channel 12 to deliver thereto transmitted signals. Interface communication controller 32 is connected to modem 30 by lead RXSO which conveys serial bit signals from modem to controller, and by lead TXSI which conveys serial bit signals from controller to modem. Additional control and status signals pass between modem and controller on leads 34. Interface controller 32 is also connected to computer station 20 by address bus 36 and data bus 38 connecting to memory 21. Additional connections 40 between controller 32 and station 20 provide for transfer of control and status signals.

Interface controller 32 includes integrated circuit chips numbered L1 through L156 interconnected as shown in composite FIG. 2. All integrated circuit chips are commercially available and the type identification of each is indicated in FIG. 2. Controller 32 is connected to station 20 through the following connections:

BCCGT—Controller Station Bus Grant. Issued in response to a controller Station bus request (BCCRQ) to signal that the controller can read or write Station memory via the Station data bus.

/BCCRQ—Controller Station Bus Request. (A "/" preceding a connection or signal name is the equivalent of an overscore appearing in the wiring drawings.) Generated at L135 by /XMIT REQ (transmit bus request) or /RXON (receive bus request) when the Controller needs to read or write a word of Station memory.

/BCC RX INT—Controller Receive Interrupt. Produced by L107 to generate the station processor interrupt request that signals the end of a packet receive operation. The station processor does not necessarily respond to every receive interrupt request. /BCC RX INT also enables L139 Receive Status Register data onto the Station data bus.

SA0-15—Station Address Bus Bits 0-15.

SD0-15—Station Data Bus Bits 0-15.

/SIORQ—Station Input/Output Request. Asserted at L39 to generate a /BCCIO signal when an I/0 operation is necessary.

/SMR—Station Master Reset. Station bus line which asserts /POR at L94 to reset the Controller.

/SMRD—Station Memory Read. A bus signal produced by L138 to indicate that the current bus transfer is a memory read operation.

/SMWR—Station Memory Write. A bus signal produced by L138 to indicate that the current bus transfer is a memory write operation.

/SYS ACK—Station Acknowledge. This signal is generated when the station is prepared for a transmit operation.

8//16—A bus signal produced by L138 to indicate whether the Controller is placing 8- or 16-bit information on the bus. Since the Controller makes only 16-bit transfers across the bus, 8//16 will always be low.

OB—A timing signal.

Controller 20 is connected to modem 30 by the following:

TXSI—Serial bit stream to modem.

RXSO—Serial bit stream from modem.

RXC—Clock from modem derived from signal on outbound channel.

TXCLK—Clock generated by modem for transmitting signals on inbound channel.

/RTS—Sent to modem to indicate Controller wishes to send a packet.

/CTS—Sent by modem to indicate it is prepared to accept packet for transmission.

/DSR—Sent by modem to indicate it has signals from outbound channel to transfer to Controller.

/DTR. Sent to modem to indicate Controller is ready to recieve serial bit stream from modem.

/DCD1—Sent by modem to indicate presence of signal on outbound channel.

/DCD2—Sent by modem to indicate signal on outbound channel. Differs from DCD1 only in that there is a small delay at the end of channel activity before this lead goes low.

OPERATION OF THE EMBODIMENT

The general approach to network operation, according to the invention, is a distributed control policy called "carrier sense multiple access with collision detection". This control policy is primarily managed by the controllers 32 associated with the several stations. The distributed control policy requires no centralized network controller to allocate access. There is also no need to assign frequency bands or time slots. When a station wants to transmit, its controller 32 contends for the shared communication network until it is able to acquire the network. After a controller acquires the network, it transmits a packet and then releases the network for use by other stations.

To acquire the exclusive use of the communication network, a controller first ascertains whether the network is busy by using a carrier sense capability to detect whether there is a signal being propagated on the outbound channel. If it senses a carrier, the controller delays transmission until the network becomes free. If or when it senses no carrier, the controller begins immediately to transmit. After all other controllers have sensed the transmission of a given controller, they will delay any transmissions and the network will be exclusively available for the transmission of the given controller.

Once a transmission is begun by any controller, however, it must propagate on the inbound channel to the head end of the network and back on the outbound channel to the ultimate station before all controllers can sense its carrier and defer their own transmissions. Because of this interval for a signal to propagate along the network, it is possible for two or more controllers to start transmissions which overlay and interfere with each other even though each detected no carrier on the outbound channel at the time it started its transmission. Such "collisions" generally distort the two or more interfering transmissions and make any such collided transmission unreliable and useless.

Each controller, in order to assess whether a transmission which it has started is involved in a collision, monitors the outbound channel while it transmits on the inbound channel. In order to understand the requirements for such monitoring by a controller, it is convenient to think of a transmission as a train of signals extending along the network channels with the train proceding as a unit toward the head on the inbound channel and toward the distal end of the outbound channel. In this view an interference or "collision" occurs when one transmission falls on top of another. It should be noted that when an interference occurs the leading signal train is not necessarily the one with the earlier start of transmission. A controller situated near the end of the network might, for example, start a transmission, but before the head of this first transmission had propagated along the inbound channel to a more proximal station, this more proximal station might start its transmission. When the head of the earlier transmission from the more distal station arrived along the inbound channel at the more proximal station it would superimpose on a part of the later transmission behind its head. The later transmission would thus be the leading transmission while the earlier transmission would be the lagging one. The maximum lag of the head of a lagging signal train behind the head of the leading signal train will occur when the ultimate station controller begins a transmission on the inbound channel just before the arrival at the ultimate station of the head of the leading transmission on the outbound channel. Any greater lag is precluded by the rule of deferral of transmissions observed by all controllers when a signal is sensed on the outbound channel. The amount of this maximum lag is the distance from the ultimate station along the outbound channel to the head and then along the inbound channel to the ultimate station. The maximum lag may equivalently be expressed from the viewpoint of a stationary observer watching a moving transmission train go past as the time required for a signal to propagate from the transmitter of the ultimate station around the network to the receiver of the ultimate station. This maximum lag time or network propagation time, which may be for convenience designated T, is a fundamental network parameter that depends on signal propagation delay through the length of the network. Adopting now the view of watching a moving transmission pass a given point, collisions will arrive at a point on the outbound channel only during a period of duration T after the arrival of the head of a leading transmission. Since discrete signals are often employed in communication systems, it will be convenient to define also a network propagation number n, which is the number of discrete signals which can be transmitted in the time T.

The above described relationships are taken advantage of according to the invention by ascertaining for a particular network configuration the network propagation number n, and promulgating a parameter conveniently designated p providing an indication thereof to each station of the network. Each station stores p for use in making decisions about collisions. Whenever a modification of the network is made changing the propagation time T, a new value of p is promulgated to the stations of the network so that the collision related decisions made by each controller will reflect the new network configuration.

Each controller senses the state of activity on the outbound channel and starts to transmit only when no signals are being received. After starting a transmission each controller monitors the outbound line and compares the first arriving signal train with that of its own recently started transmission. If the received train is the same as that sent for at least the first n signals, the controller interprets this as indicating that no interference has occurred, and the controller continues to transmit the complete message.

If during period of length T the received train differs from the transmitted train the controller terminates its transmission forthwith. It may be noted, however, that because of the propagation delay, a controller may transmit more than n signals before receiving an indication of a collision on the outbound cable. Since the garbled packet resulting from a collision will correspond to none of the packets sent, a collision of transmissions will result in all controllers stopping their transmissions.

After all transmissions have been halted by a collision, each controller wishing to send a message waits for a random time period before beginning the channel acquisition procedure again. The random delay, called the backoff interval, minimizes synchronized repeated collisions between two or more stations that want to transmit. The delay interval is advantageously adjusted by the controller to reflect network loading which is estimated by counting the average number of collisions that an outbound packet encounters.

Another aspect of the network operation according to the invention concerns the identification at receiving stations of messages which have been contaminated by collisions so that such messages can be rejected or disregarded. Since receiving stations have no prior information about a received packet they cannot make the comparisons used by transmitting stations to detect transmissions contaminated by a collision. The transmitting stations, which can distinguish contaminated transmissions, therefore mark the contaminated transmissions so that receiving stations can identify them. They do this by aborting (that is, prematurely terminating) a contaminated transmission.

The transmission delay of the network imposes constraints on how early a transmitting station can detect a collision and abort its transmission, and to be able to recognize an aborted transmission a receiving station must be be put in possession of information as to what the minimum length of an unaborted packet may be.

According to the invention three different strategies may alternatively be employed to identify received transmissions which are contaminated by collisions. As discussed above, a station at the distal end of the network can produce a collision delayed with respect to the head of the leading transmission by as much as the network propagation time T (or equivalently by n signals). Furthermore a station at the distal end of the network will have transmitted as much as n signals on the signal train after the collision before it has an opportunity to detect the collision. An abort may therefore be, if the two collision generating stations are at the distal end of the network and if the lagging transmission is started just before the station sending it begins to receive the leading transmission, at a time 2T after the beginning of the leading transmission, or equivalently after 2n signals of the signal train have been transmitted.

Accordingly, the first discrimination strategy, according to the invention, is to have a policy that all packets be formed for transmission so as to have more than 2n signals in them, and that any packet received that is less than 2n signals in length be considered as resulting from an abort marking it as a packet contaminated by interference.

A second discrimination strategy, according to the invention, is to have a policy that all packets will be formed for transmission with a starting sequence of at least 2n signals followed (not necessarily immediately) with a sequence of signals identifying the station to receive the packet. In this strategy since any abort would occur ahead of the identification, no receiving station, would ever identify an aborted message as directed thereto.

A third strategy, according to the invention, employs a policy in which each station forms a packet for transmission so as to include in the first r signals transmitted (r less than n) an indication of its proper propagation time (meaning the time to propagate a signal from its transmitter around the head of the network and back to its own receiver). The corresponding value referred to discrete signals is conveniently designated q. Packets are additionally required by the policy to be formed so that they will have more than n plus the larger of r or q discrete signals. From the viewpoint of the receiving station, a packet will be received and a putative value q' of the proper propagation number of the sending station can be inferred from the first r received signals of the packet. At this point the receiving station has enough information to limit the possibilities to these two cases: (1) the putative value q' is garbled by a collision, in which case a collision start was situated in the source address field and therefore no farther than r signals behind the beginning of the transmission, or (2) the putative value q' correctly gives the proper propagation number q of the sending station, in which case the sending station would be able to implement an abort following q' signals after a collision. In either case the latest position in the received packet at which an abort (if required) would occur is established as less than 2n. The receiving station cannot resolve which of the two possibilities is in fact true, but one of the possibilities places an upper limit less than n on the collision interval while the other possibility places a value less than n on the number of signals transmitted by the sending station subsequent to a collision. Accordingly the receiving station interprets a packet with a number of signals greater than n plus the greater or q' or r as not being aborted, and the transmission rule ensures that any sending station will sense and abort a collided transmission before that many signals are sent.

The practical application of the subject invention, which relates essentially to timing strategies for dealing with the network propagation delays, may frequently become involved with two other timing considerations. The first of these arises because an interference does not definitely alter a signal but only randomizes it. The effect of this is that a signal train that has interference from another may not in a single or a few signals display any discrepancy from its normal form and so is undetectable as interferred with. It is advantageous, therfore, to diminish the chance that the distorted signal might fortuitously generate the undistorted signal by providing a statistical resolution period where necessary for assessing whether a signal is distorted. The circumstances requiring such statistical resolution periods and the length thereof are well understood and need not be further considered here. For our present purposes of explaining the invention, we consider essentially the relationships of the network propagation delays to a "collision" or starting point of an interference.

The second timing consideration arises because a sequence of operations is frequently required by any signal processing apparatus before it can characterize a signal train that it has received. The effect of this is to create a processing delays for the interpretation of received signals which must be considered in conjunction with the network delays, which are the essential considerations for the subject invention. These processing delays and the method of dealing with them are well understood and need not be further considered here.

Turning now to more specific points of the operation, prior to initiating regular communications over the network, each station is assigned a unique 16-bit address (which may advantageously indicate the proper propagation time of the station). A standard frame format is adopted including provisions that each frame sent will start with a header portion of a standard length, that this header will start with the address of the destination station, and that all frames will include a minimum of thirteen 16-bit words and not more than a defined maximum number of words. A current network propagation parameter p is defined, derived from the network propagation time and the bit transmission rate of the controllers 32, and indicating the number of discrete signals n required to produce a wave train extending from the ultimate station transmitter around the network and back to the ultimate station's receiver. The value of p is promulgated to each station, where it is stored. Whenever a network change is made affecting the network propagation time, the value of p is revised and the revised value is promulgated to each station to supersede the previously promulgated value.

Before receiving communications on the network, the station processor loads the station address into L53, L54 of controller 32, loads a value specifying the standard header length into L118, loads a value specifying the maximum frame length into L141, and loads the values of one or more addresses in its memory available for storage of received messages into FIFO (L26, L27, L30, L31).

Figures 2, 3, 4, 5, 6, 7, 8, 9, 10, 11:
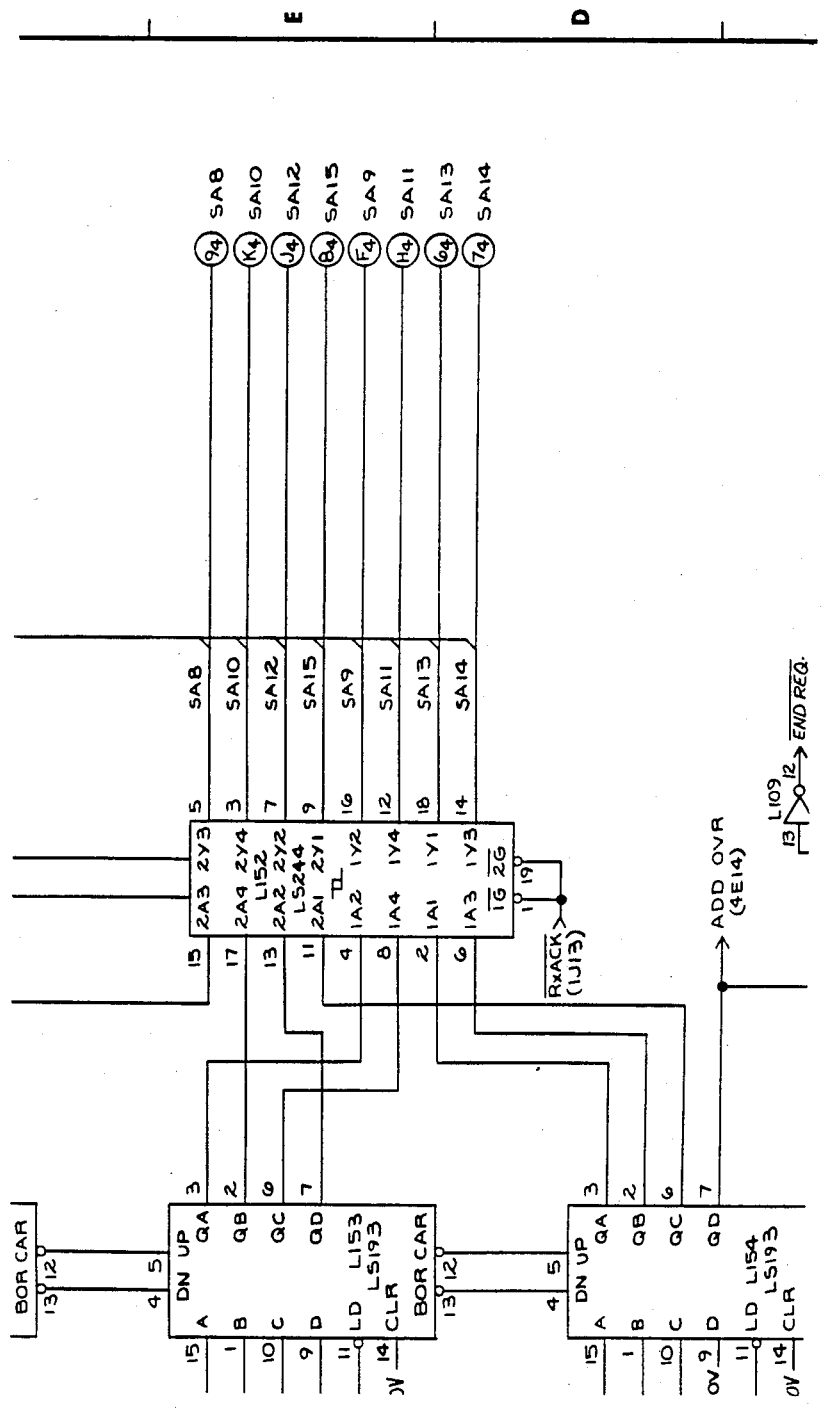
Figures 1J, 2:
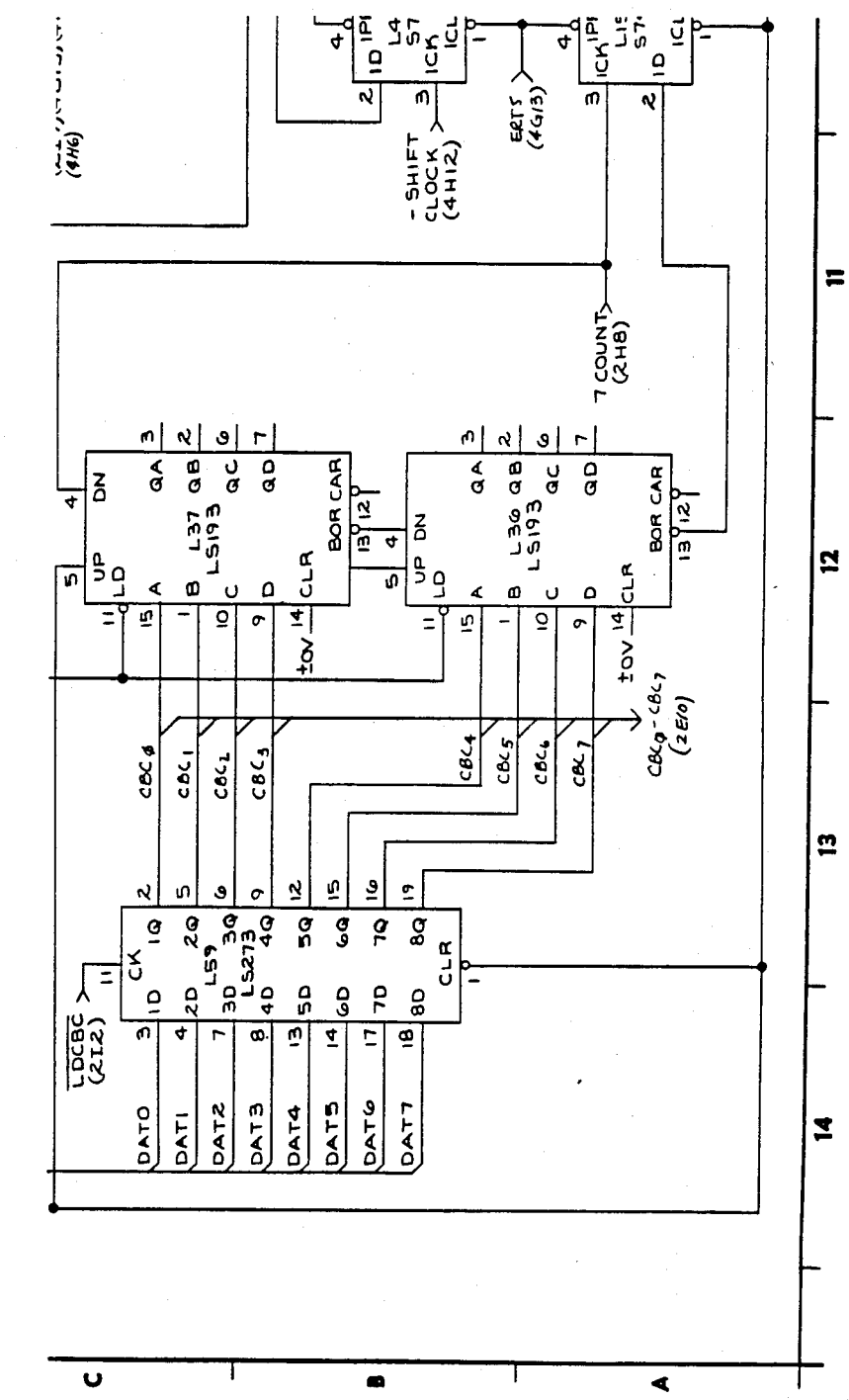
Figures 1K, 2:
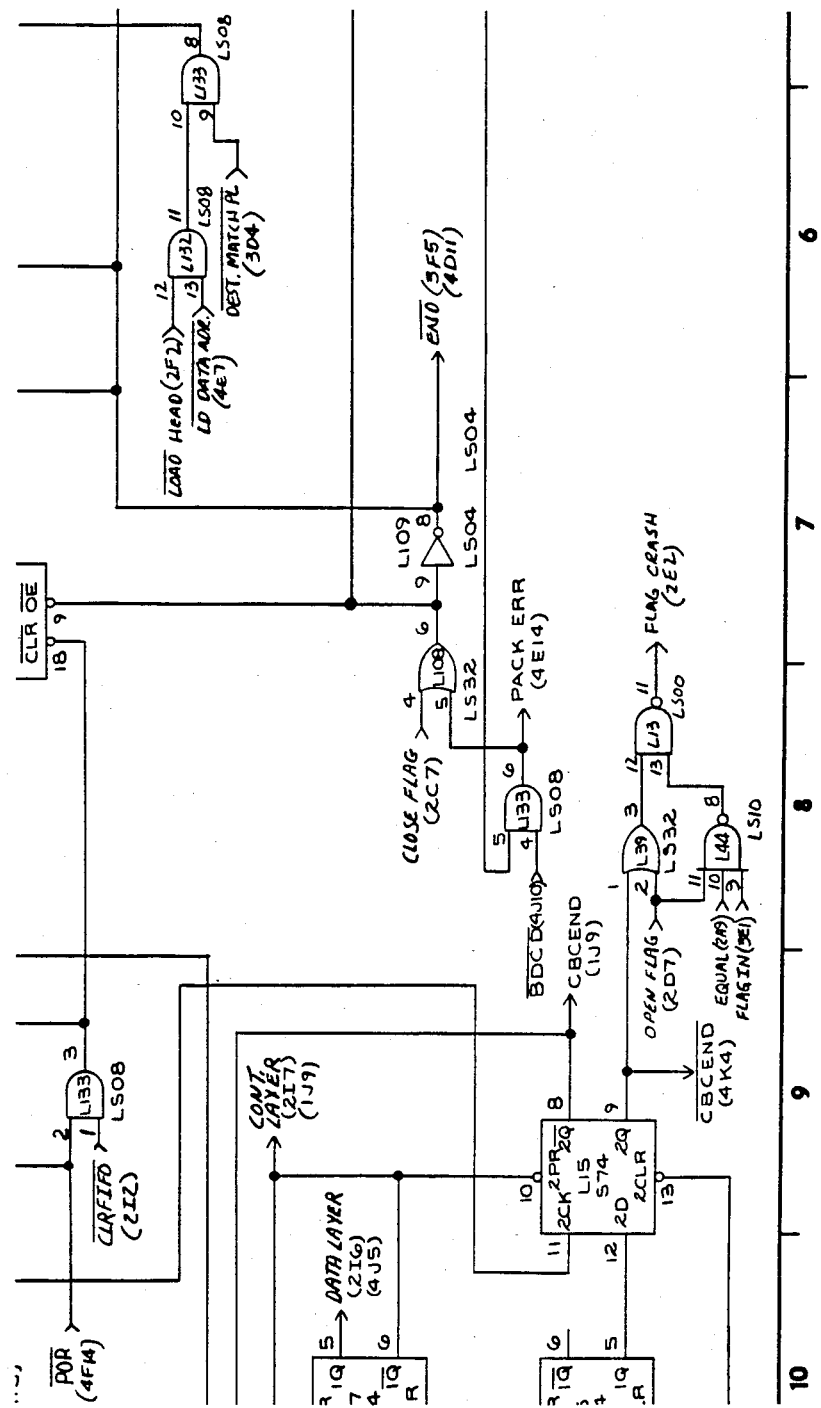
Figures 2, 3, 4, 5, 6, 7, 8, 9, 10, 11:
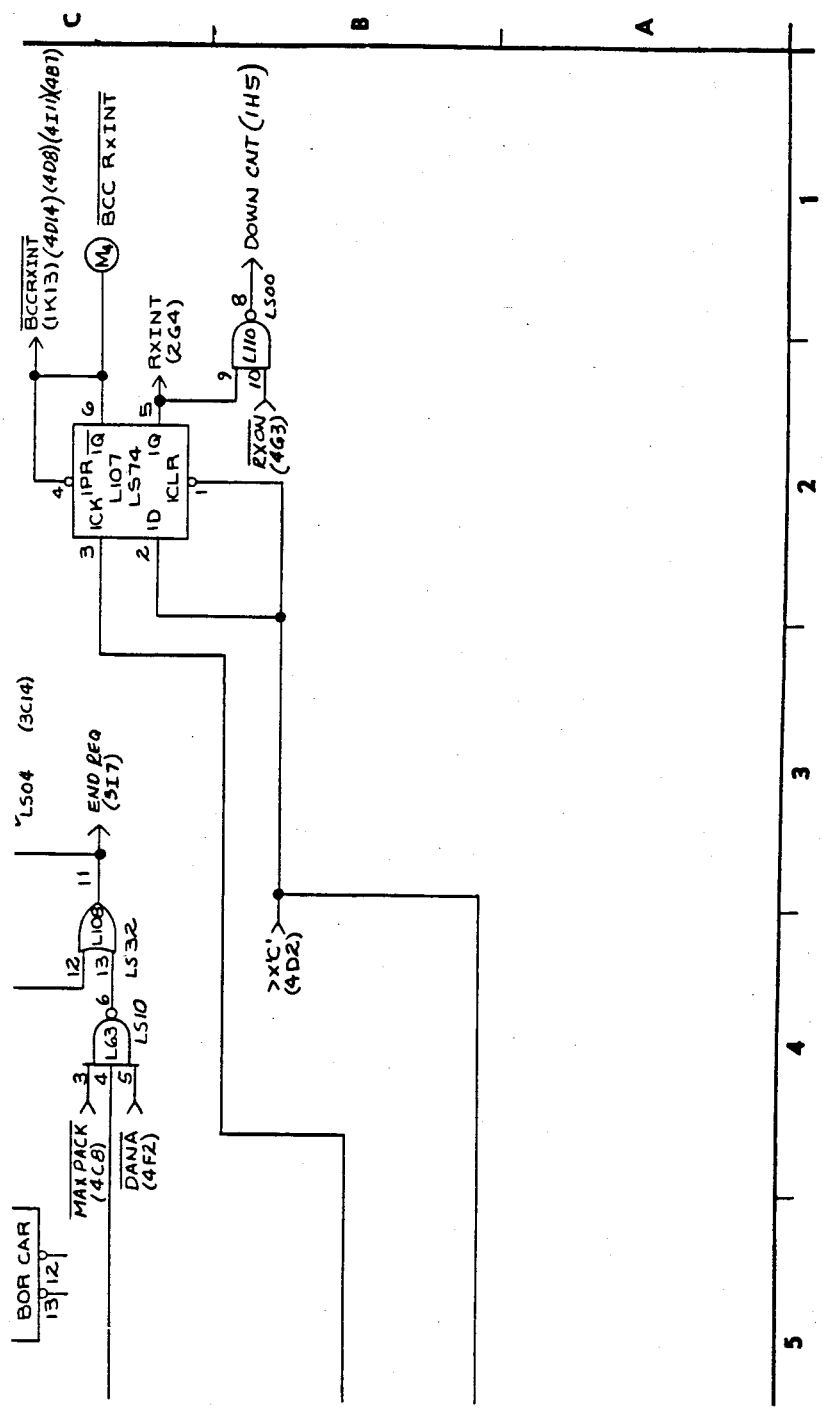
Figures 2, 2A:
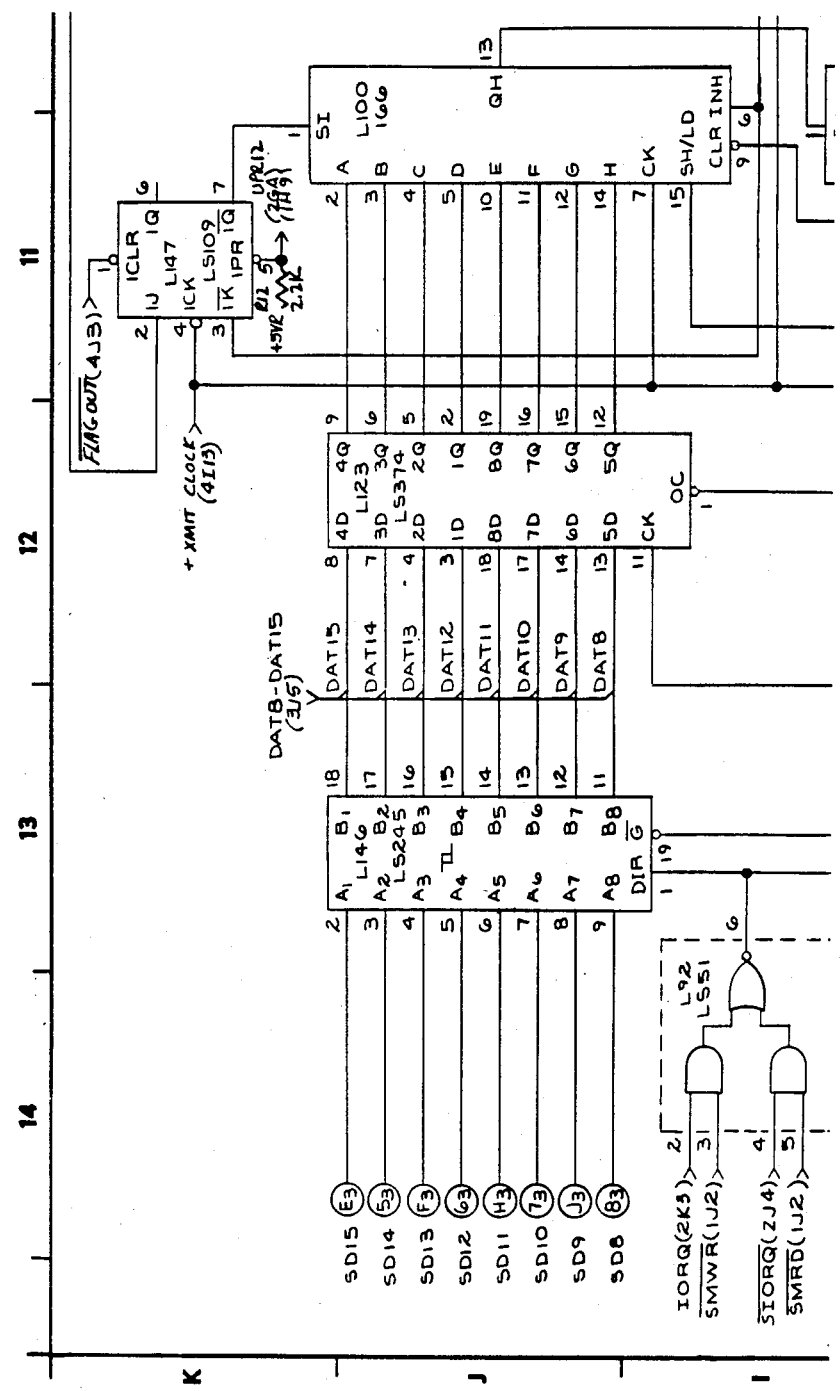
Figures 2, 2B:
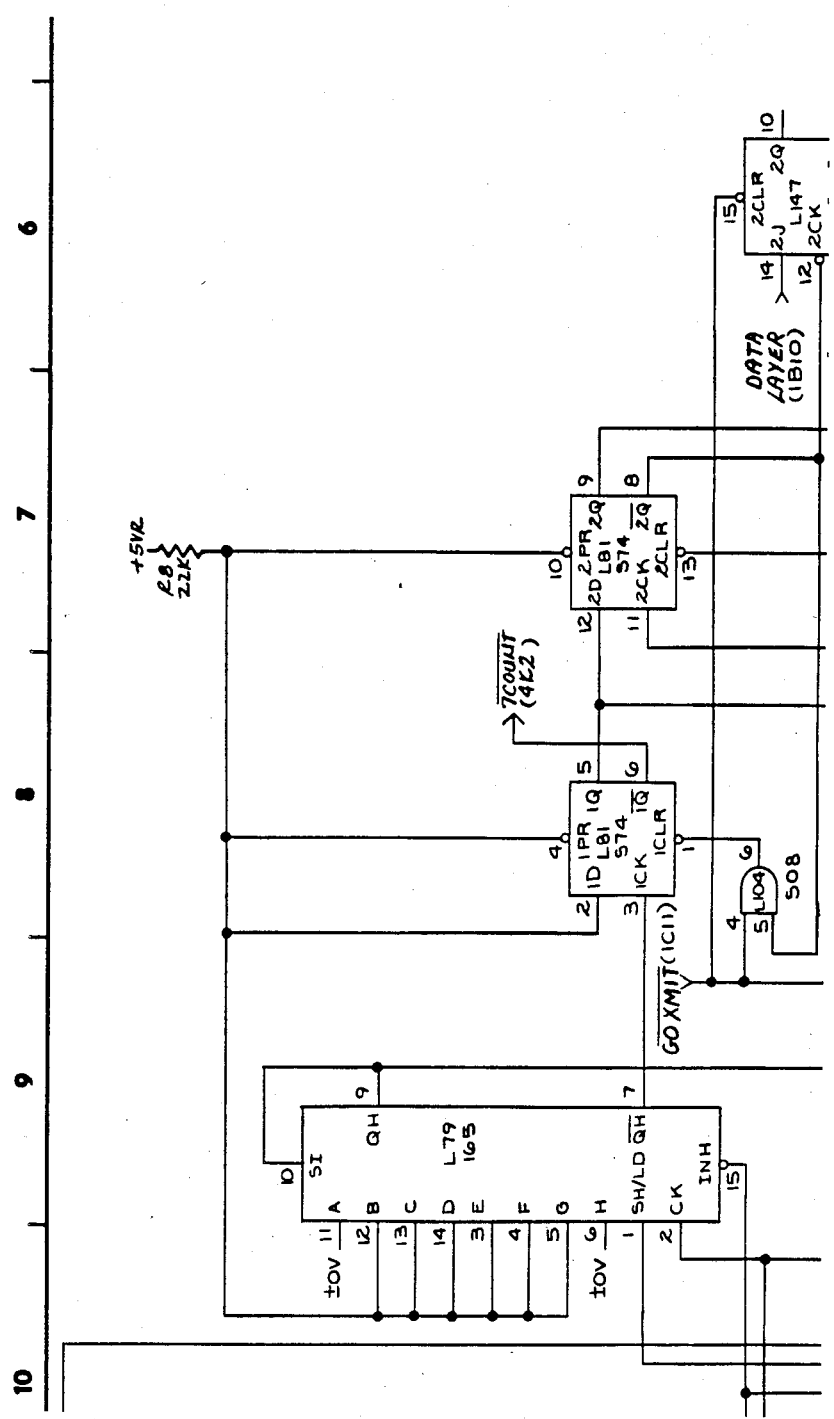
Figures 2, 2C:
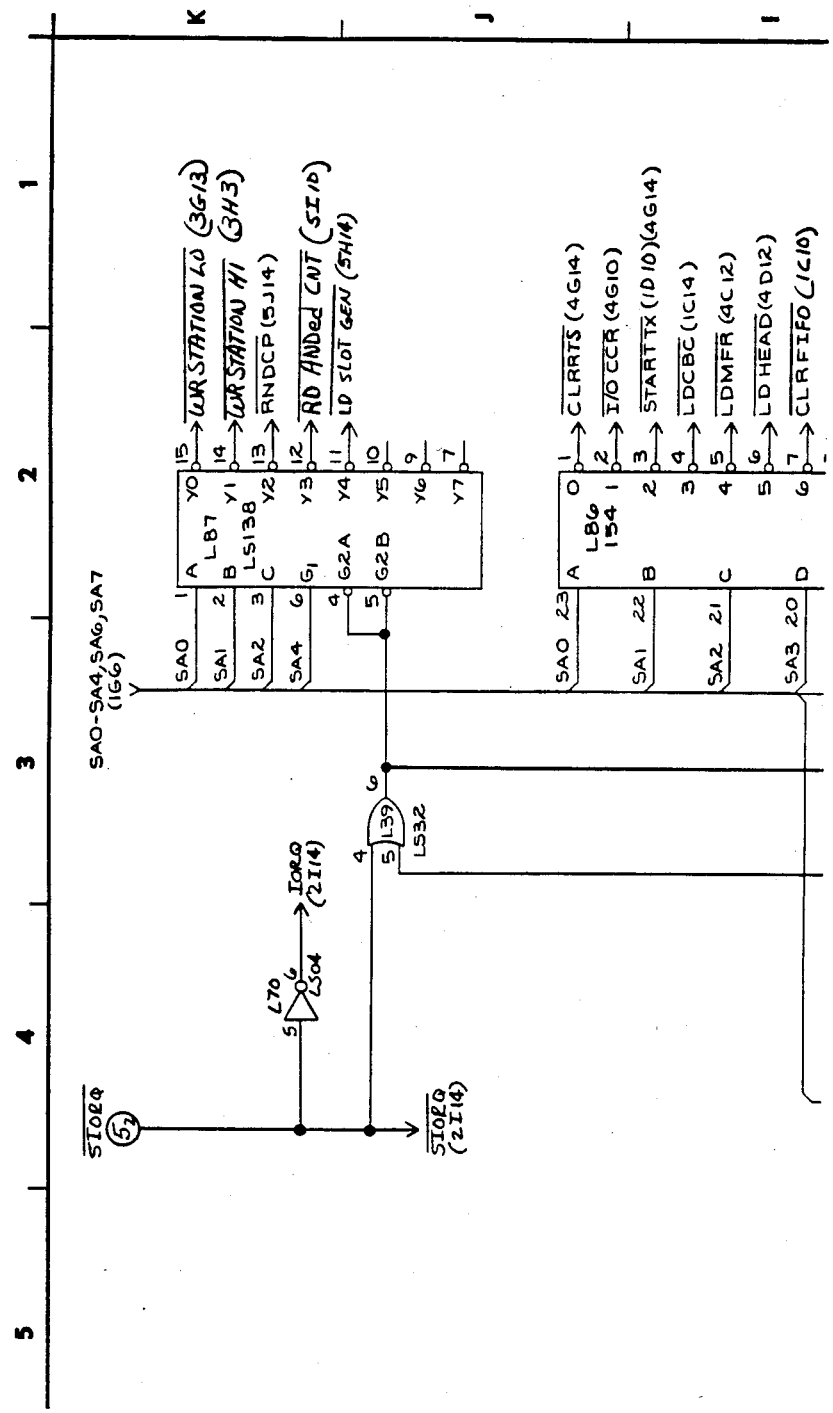
Figures 2, 2D:
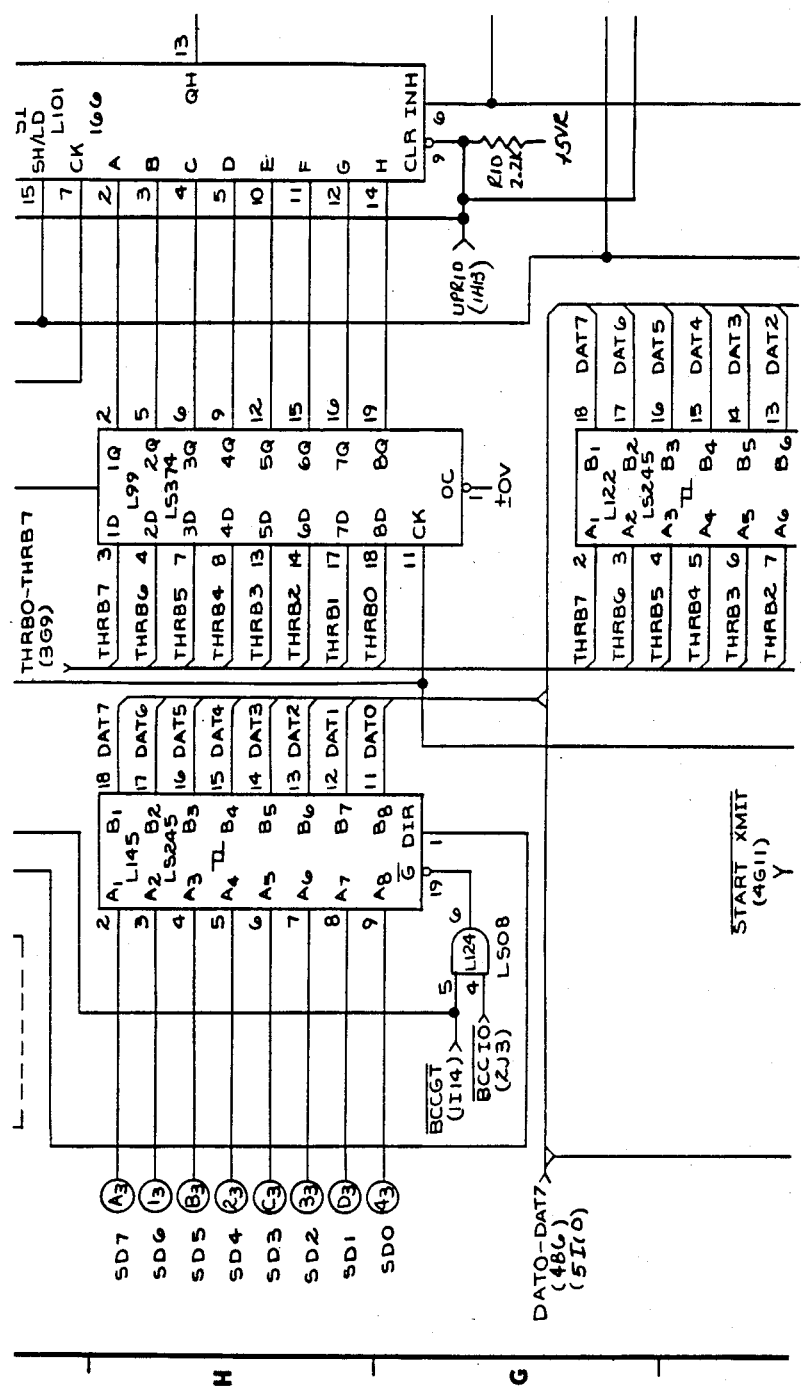
Figures 2, 2E:
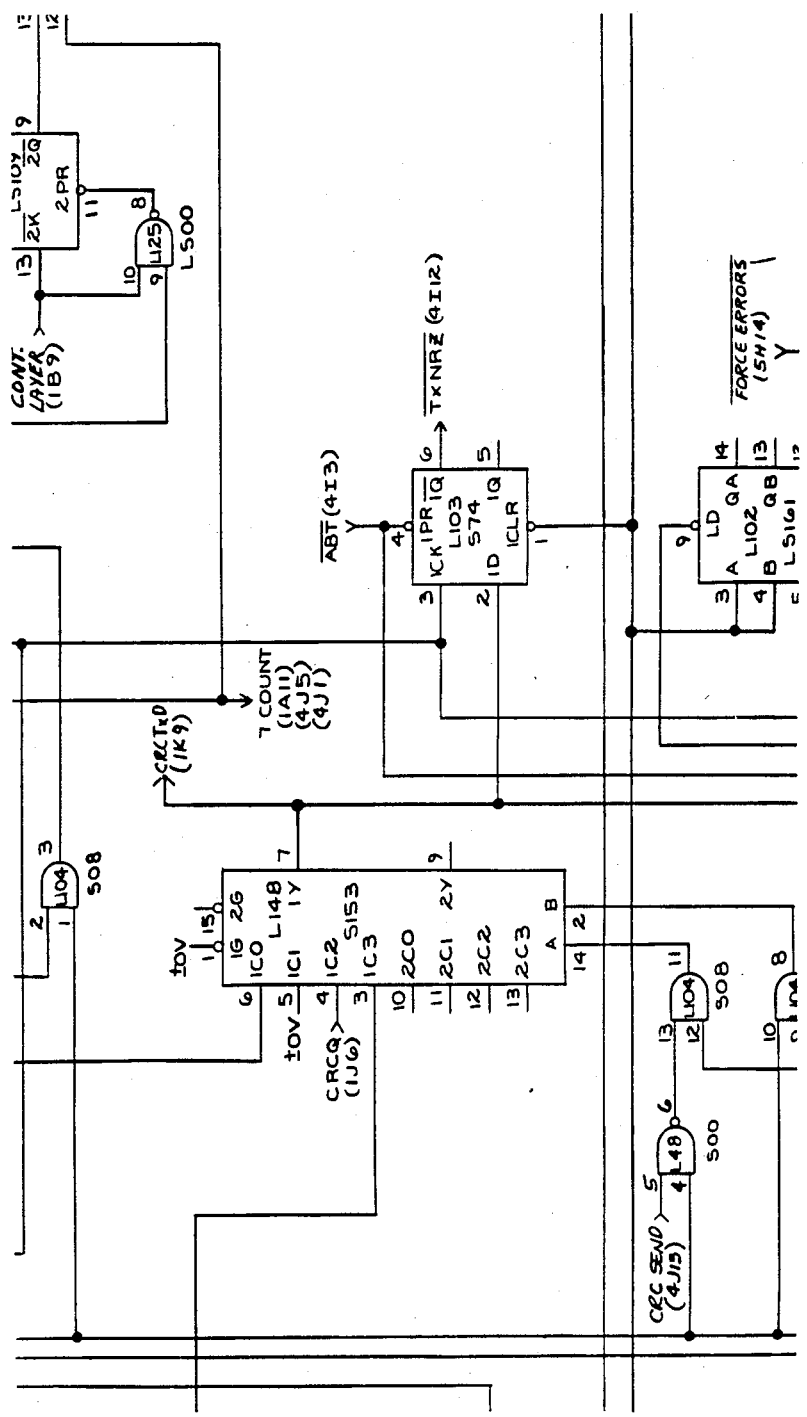
Figures 2, 2F:
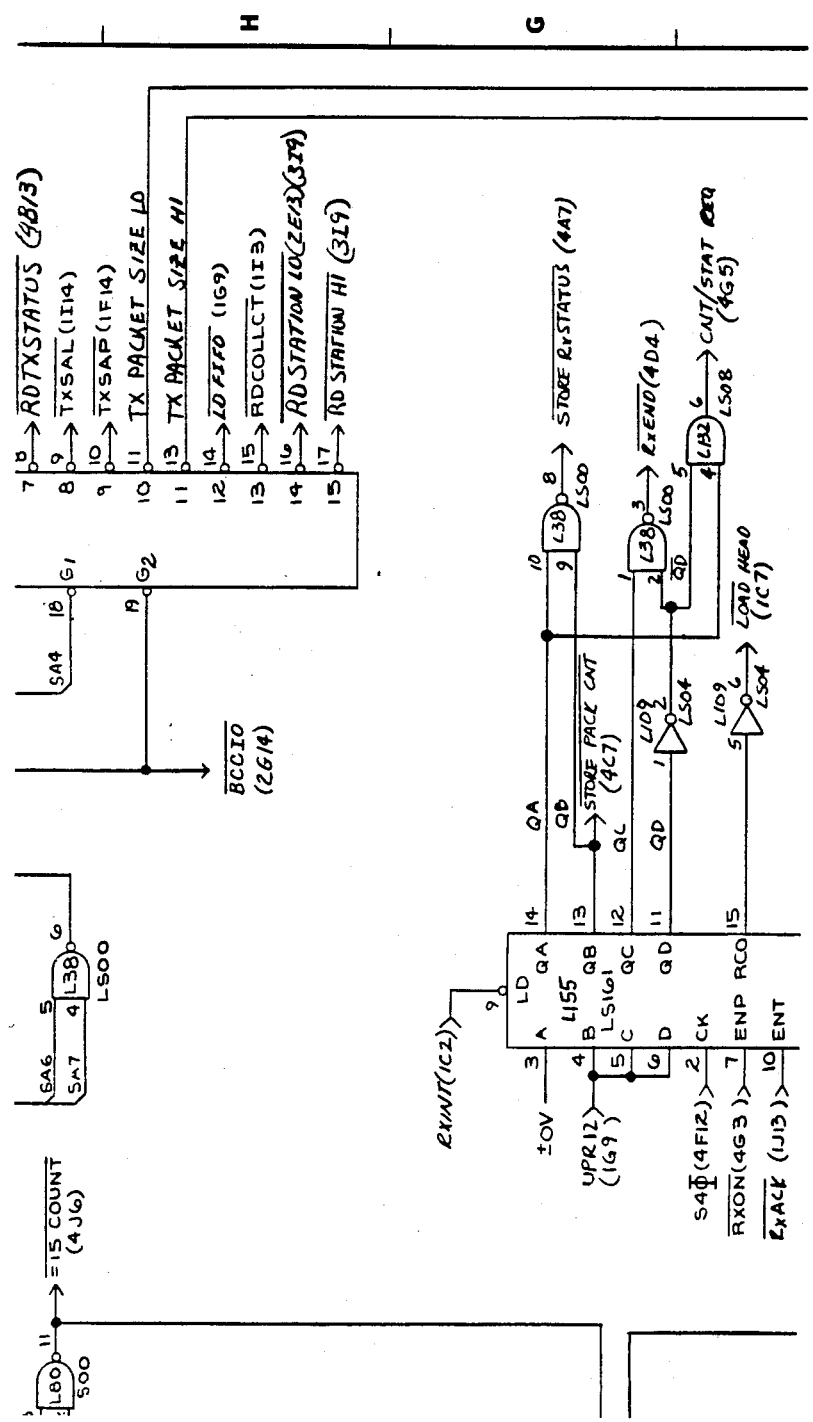
Figures 2, 2G:
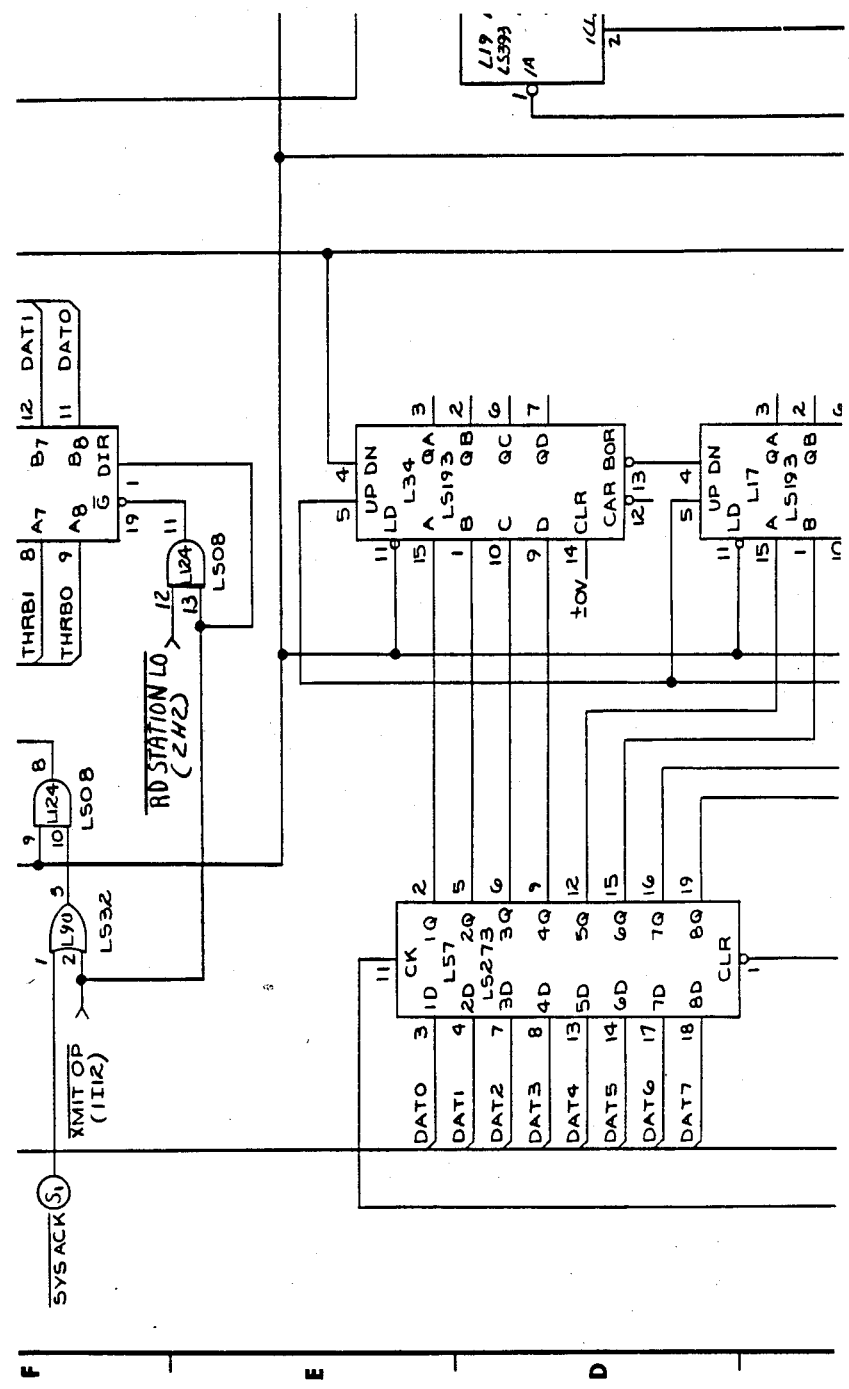
Figures 2, 2H:
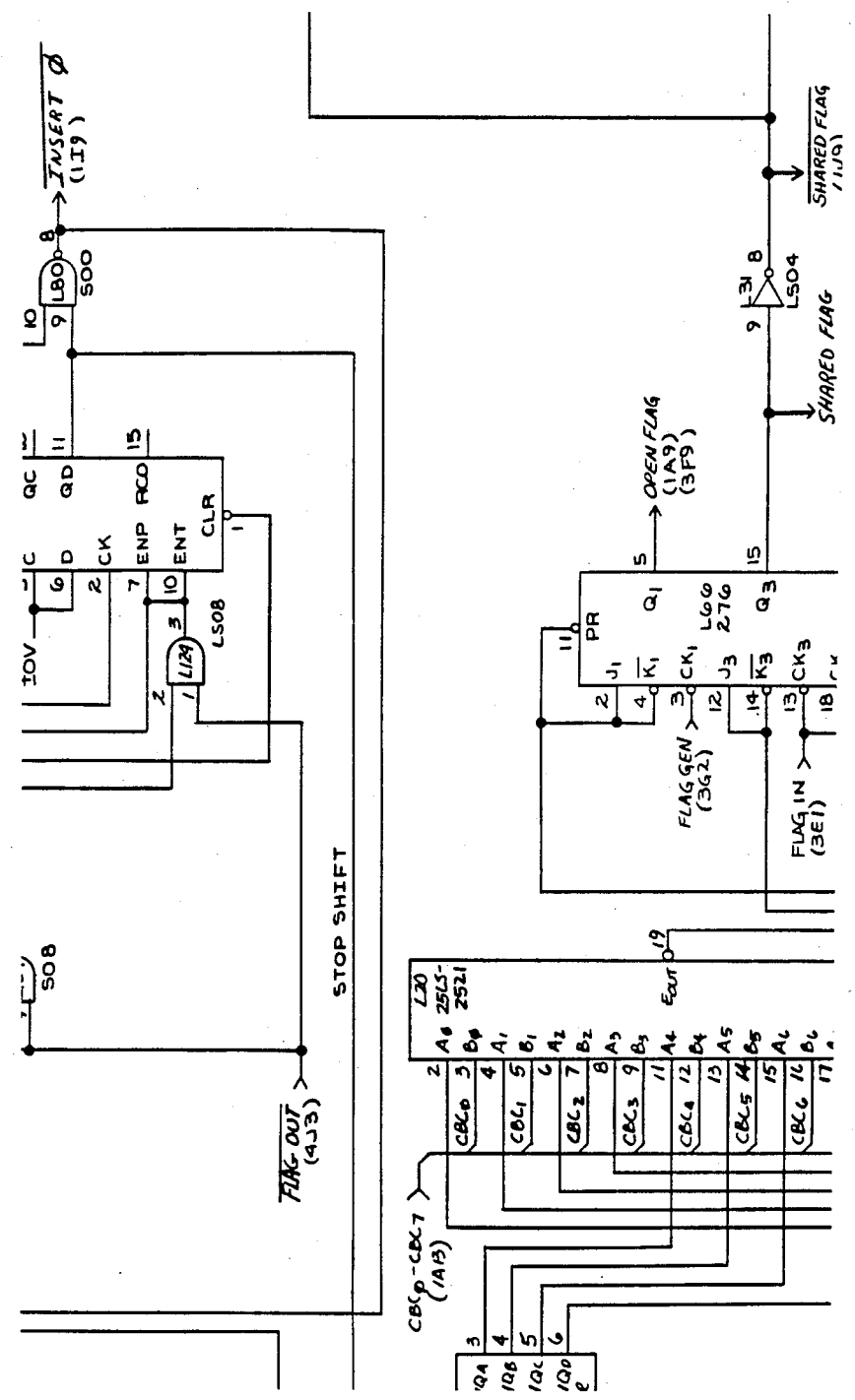
Figures 2, 2I:
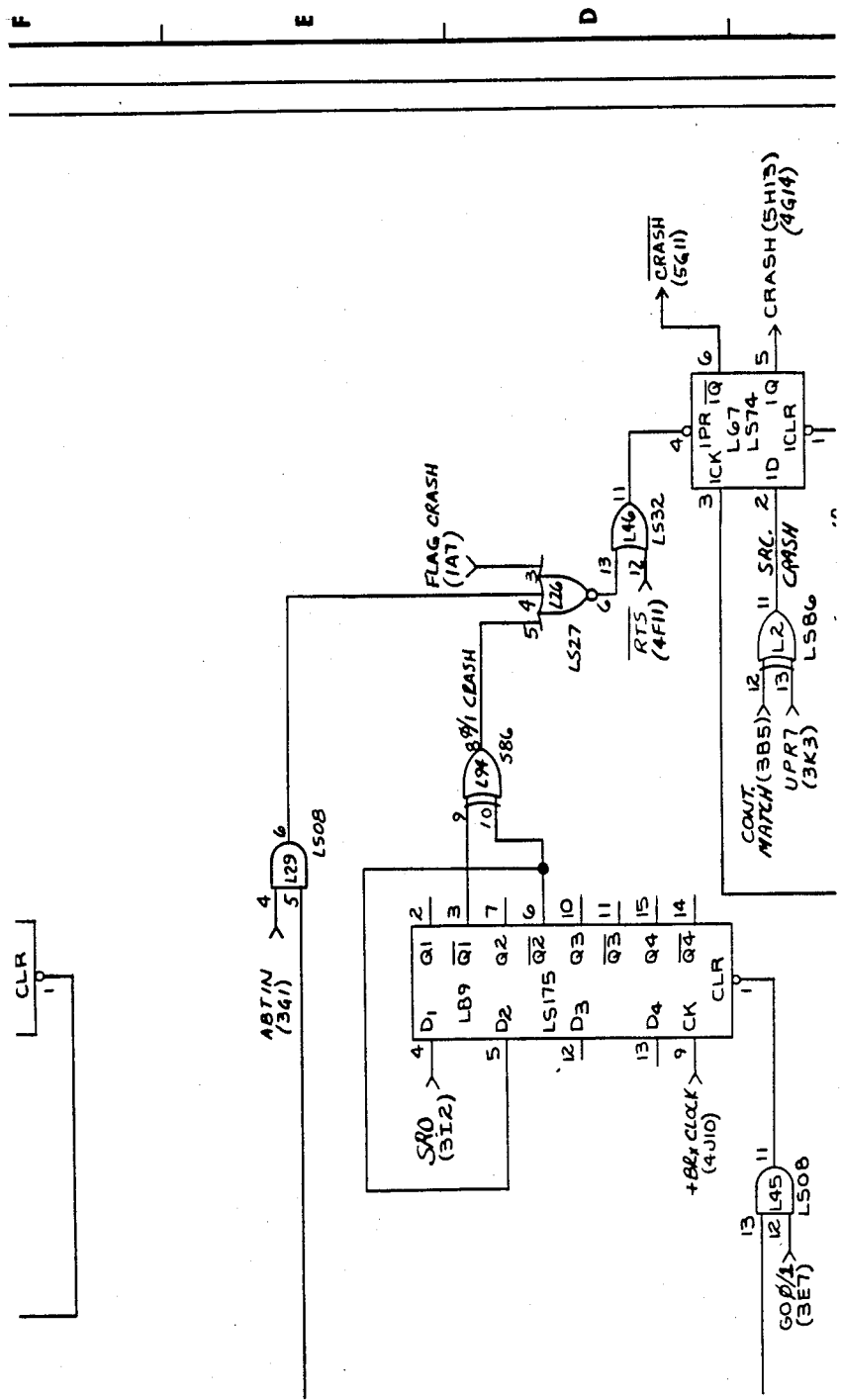
Figures 2, 2J:
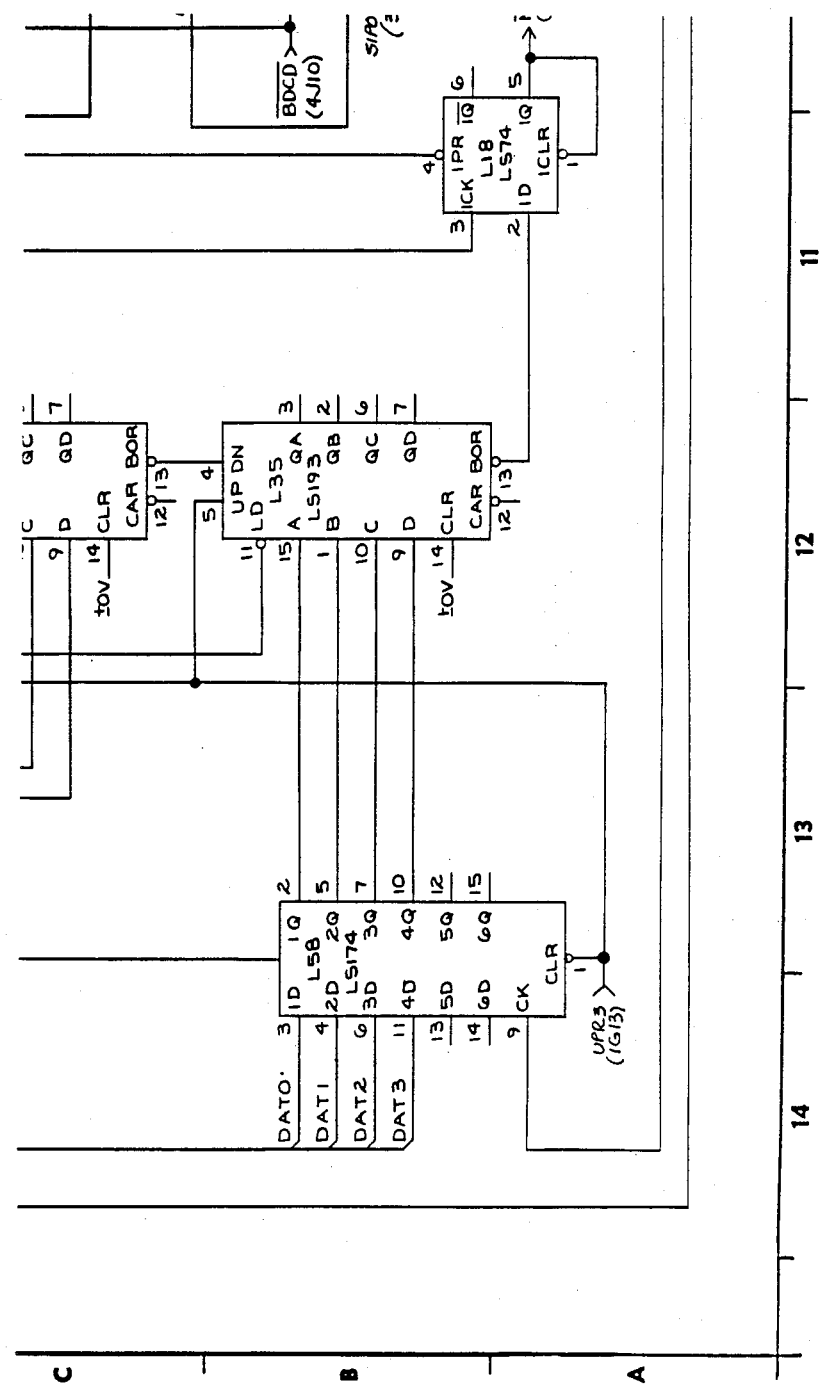
Figures 2, 2K:
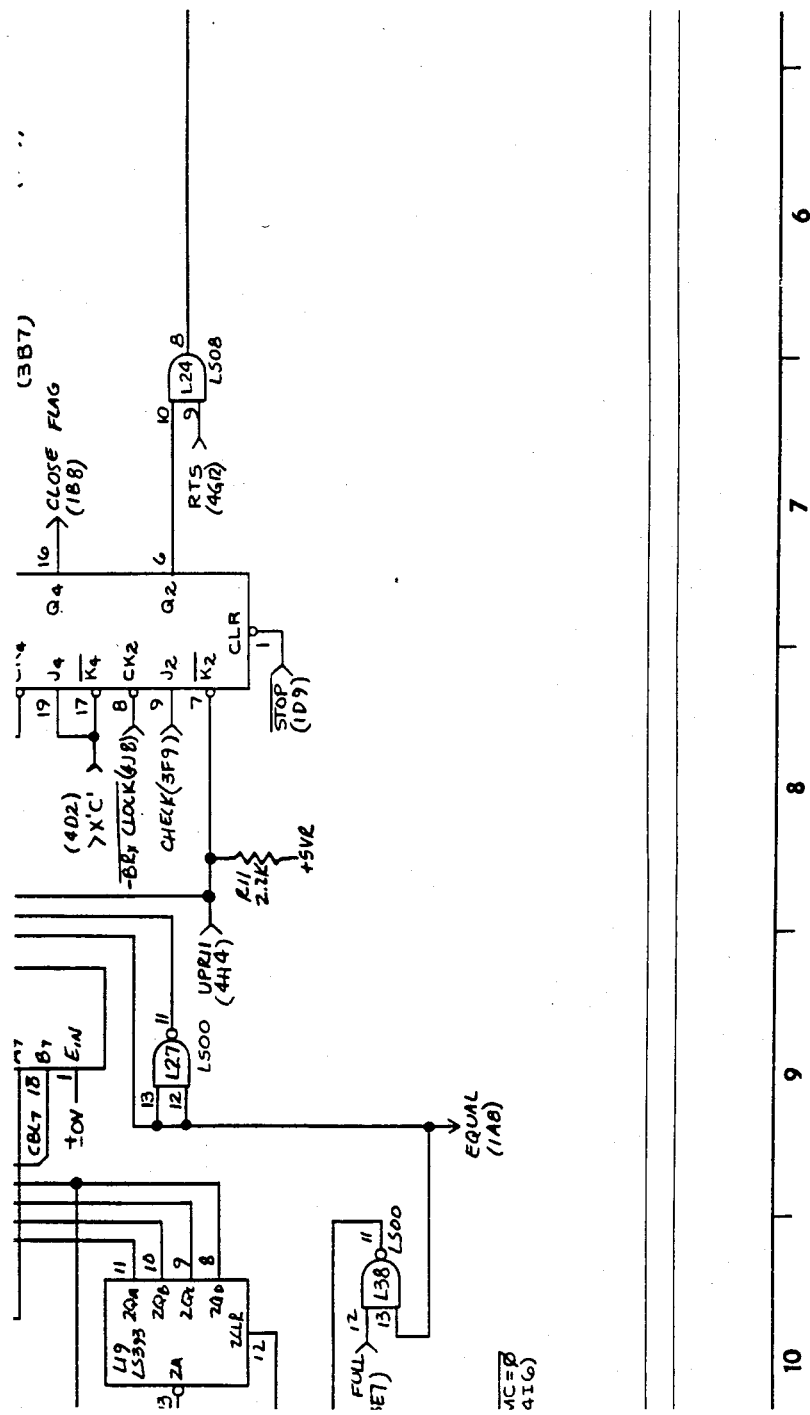
Figures 2, 3, 4, 5, 6, 7, 8, 9, 10, 11, 12, 13, 14, 15, 16, 17, 18, 19, 20, 21:
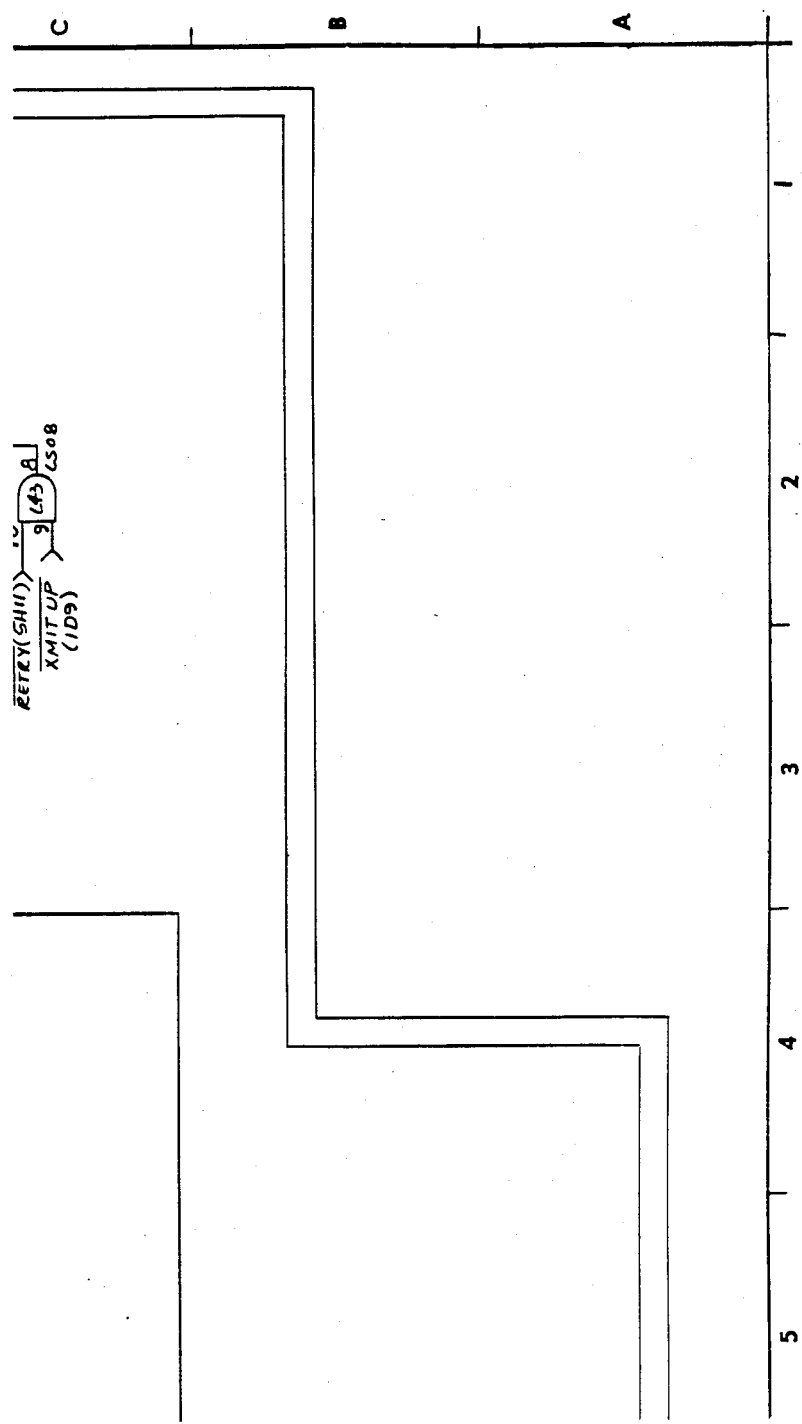
Figures 2, 3, 3A:
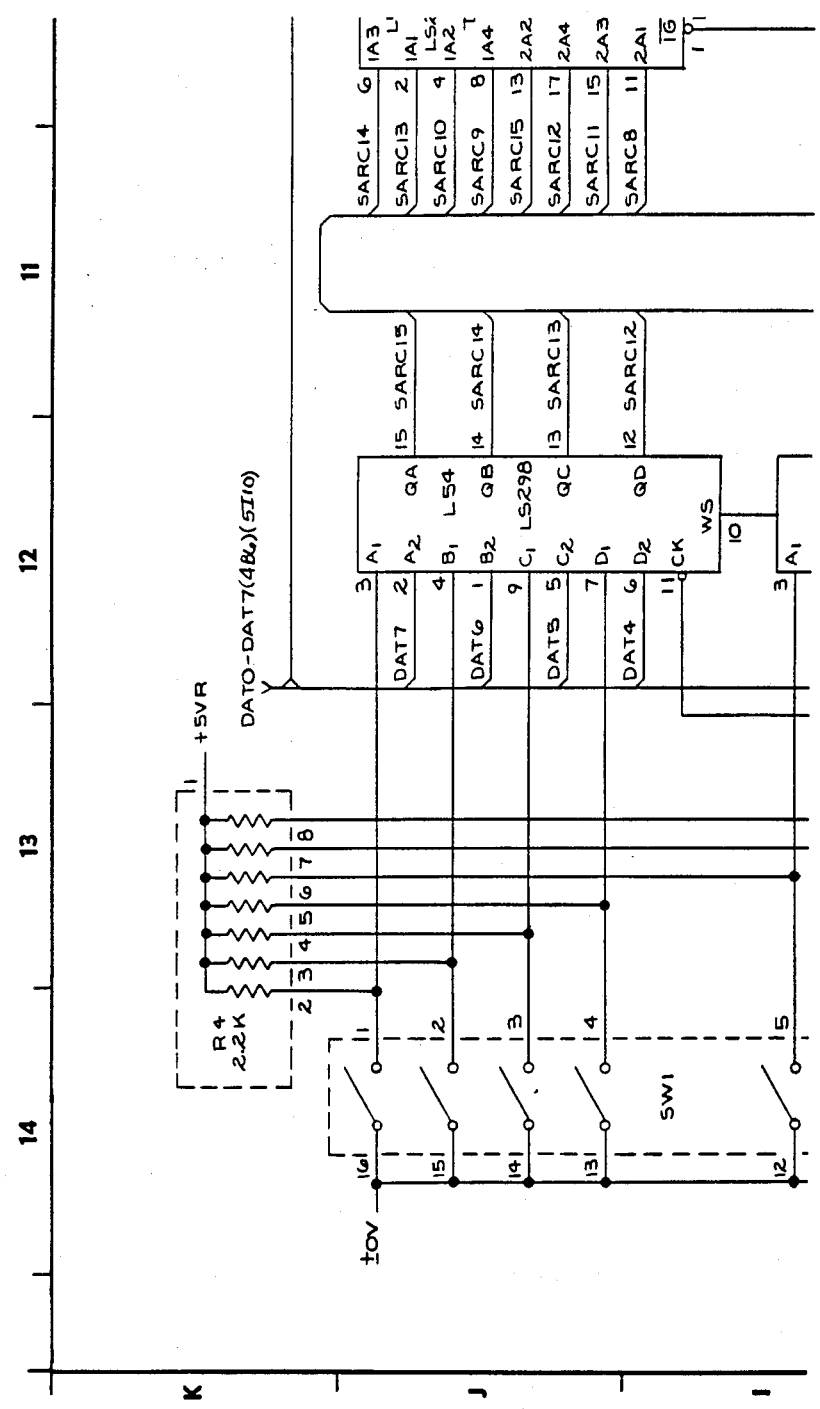
Figures 2, 3, 3B:
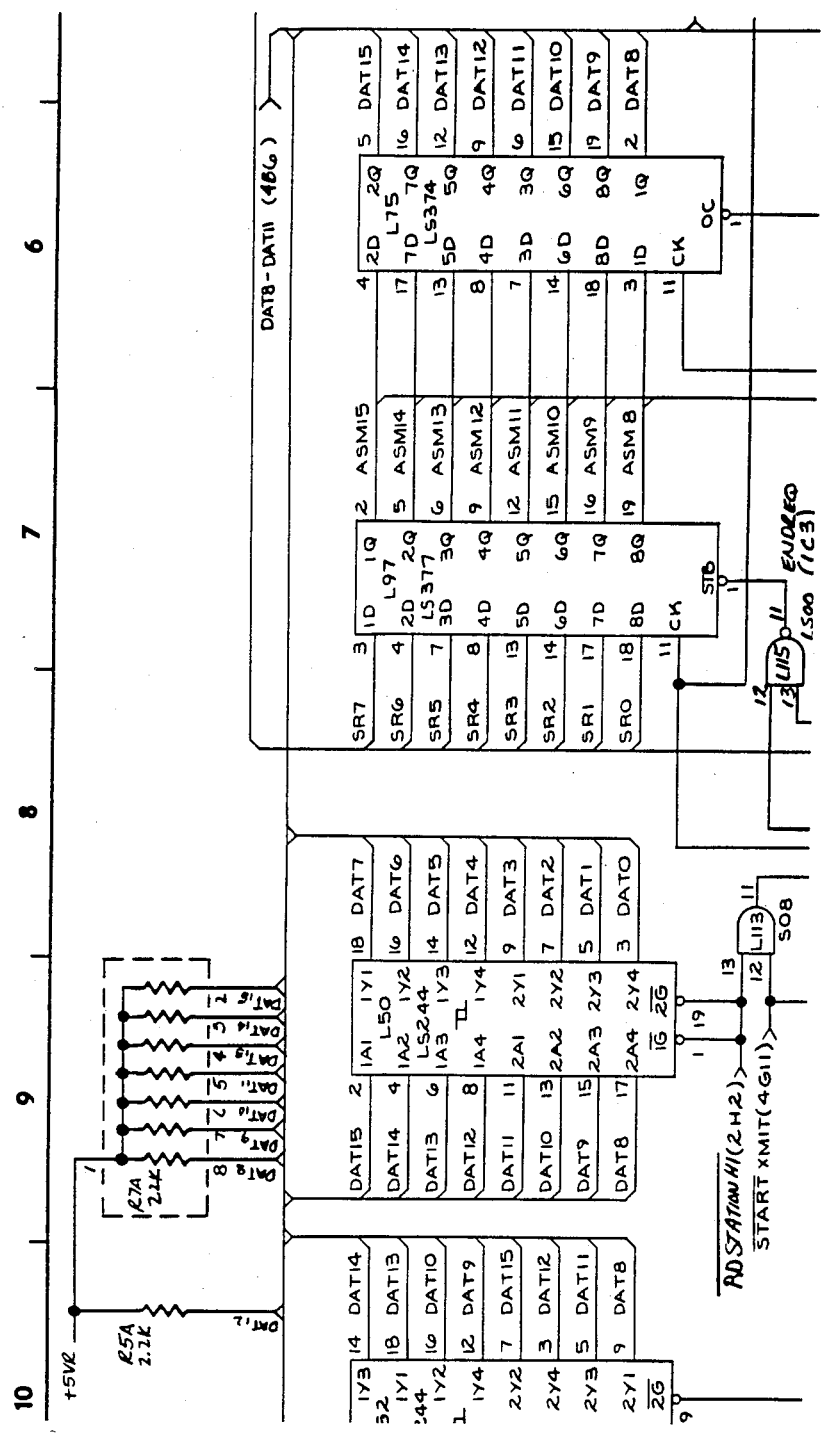
Figures 2, 3, 3C:
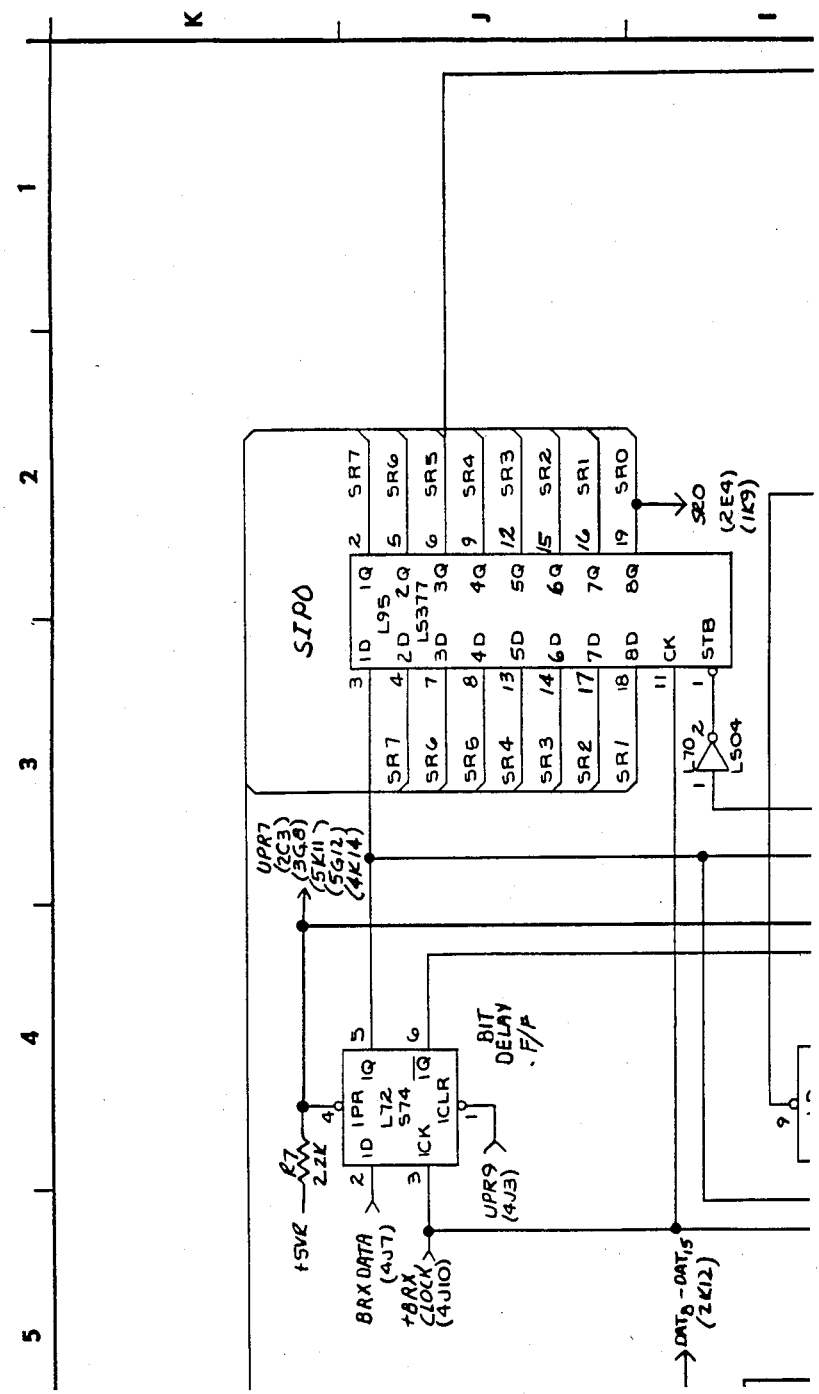
Figures 2, 3, 3D:
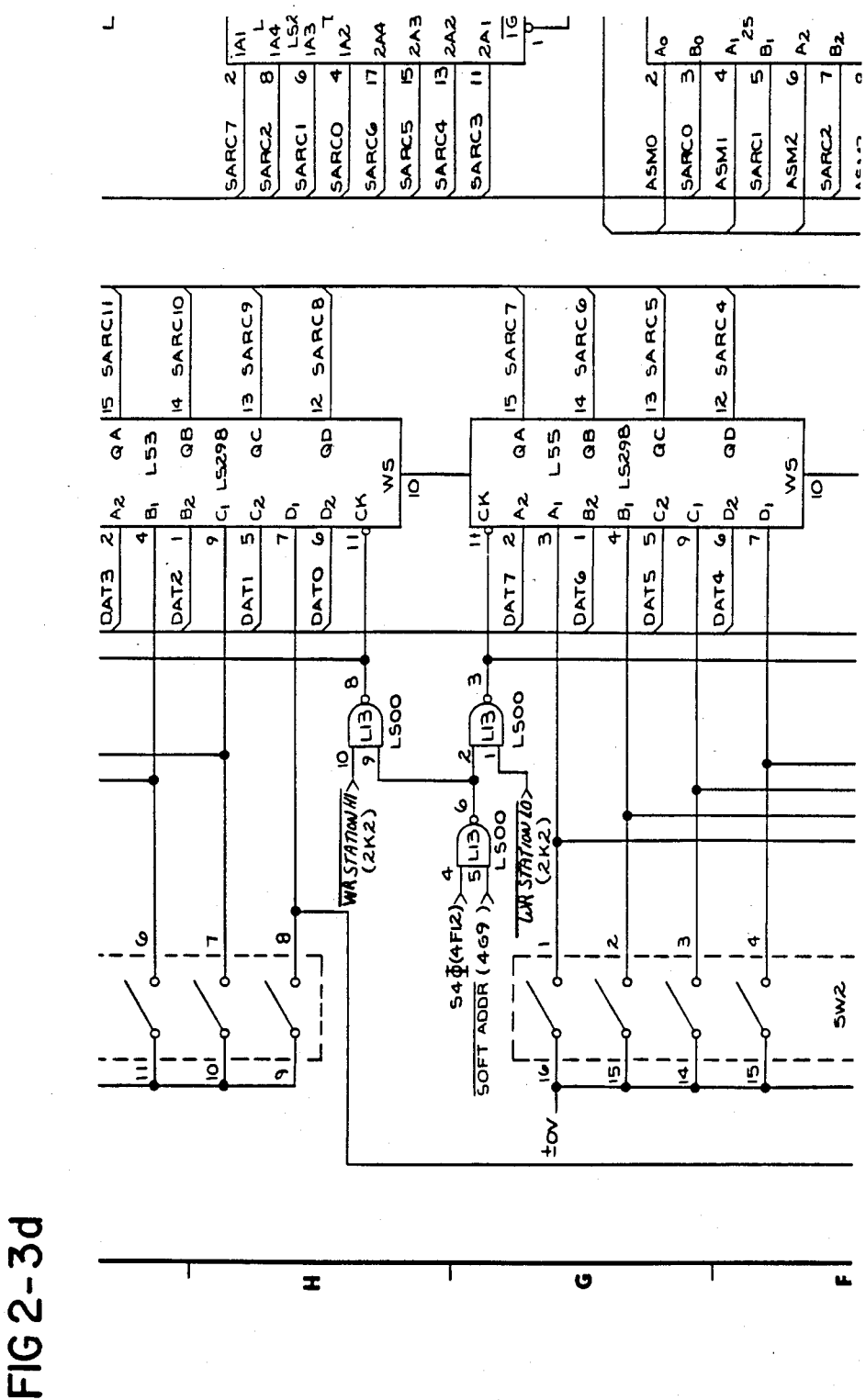
Figures 2, 3, 3E:
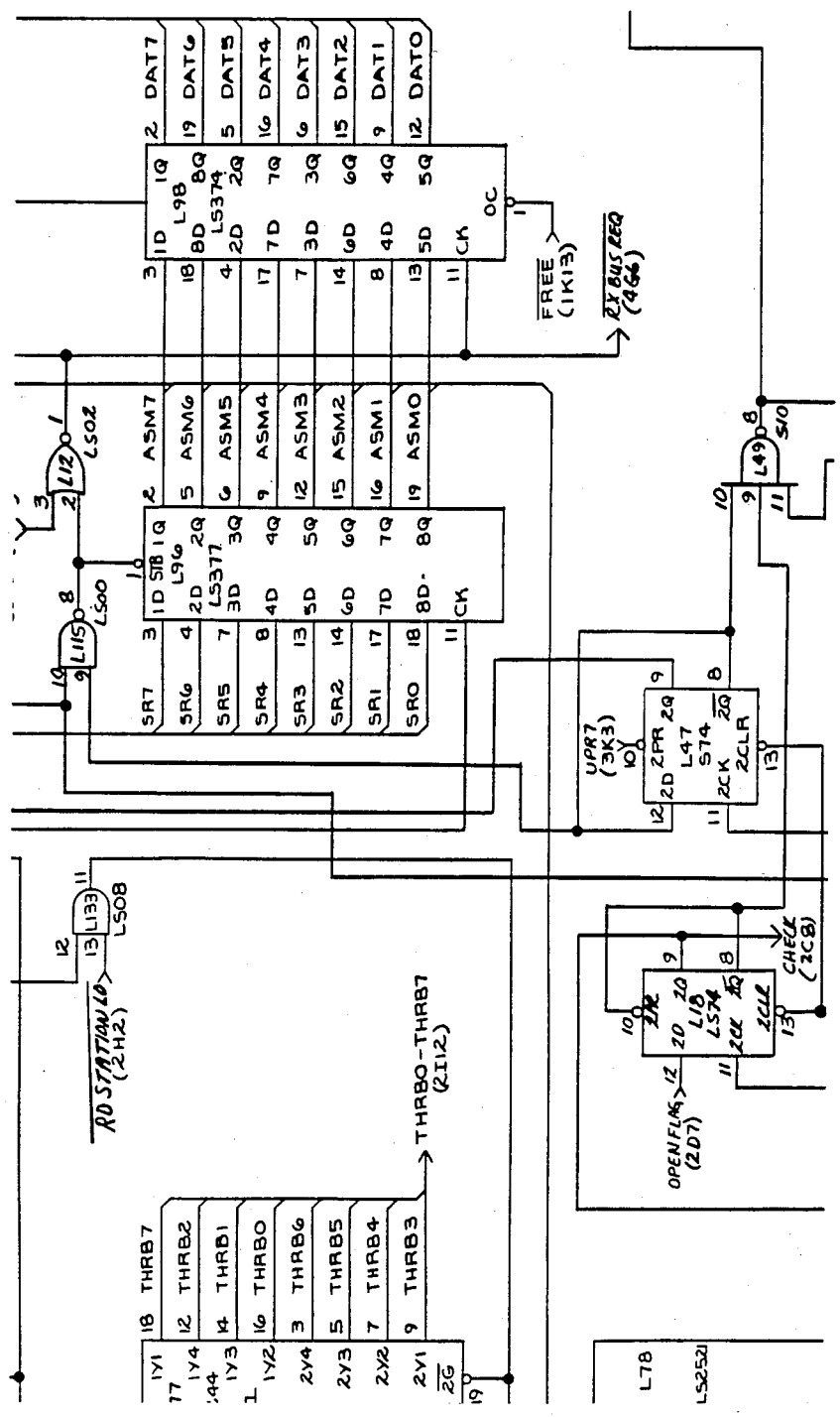
Figures 2, 3, 3F:
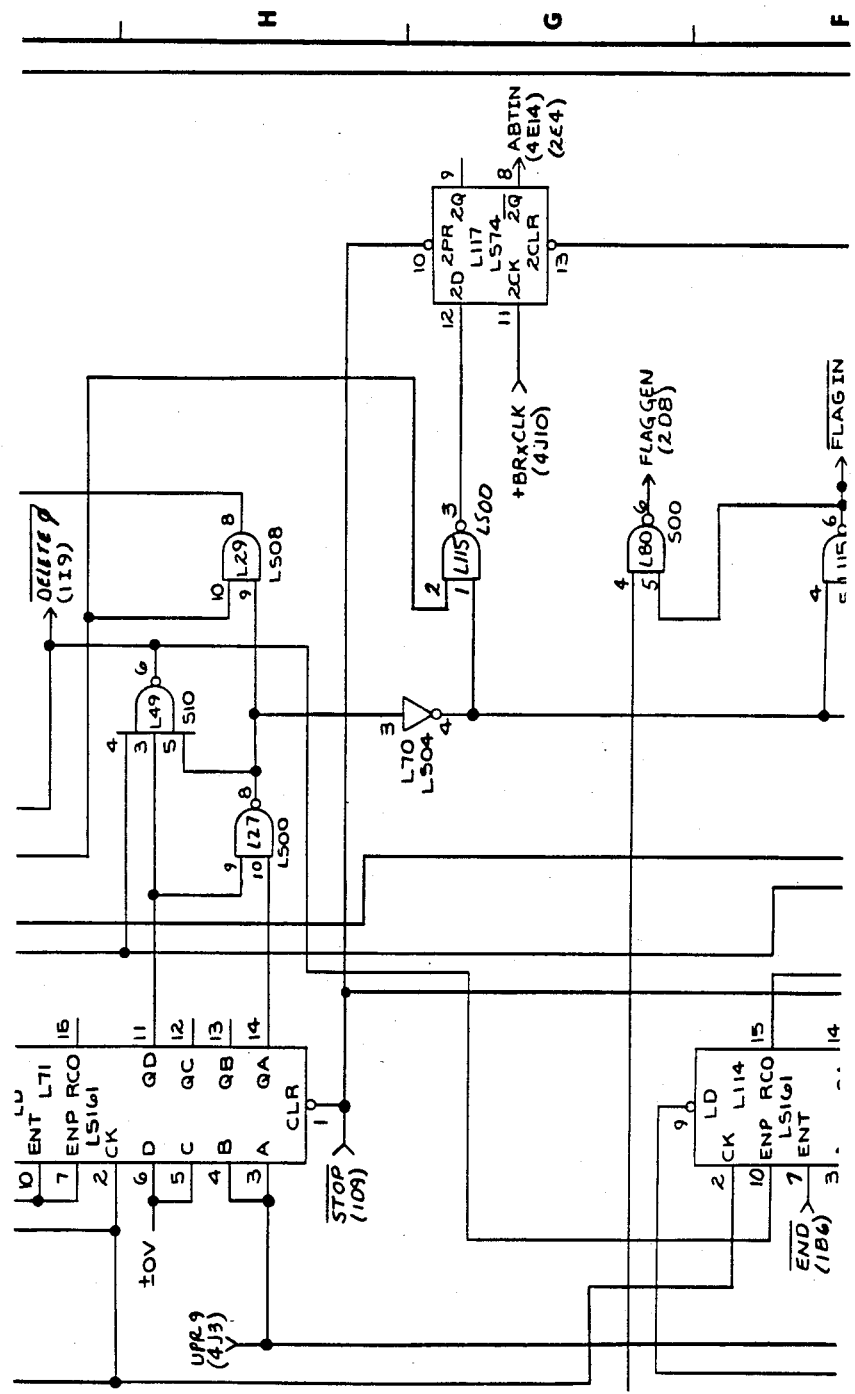
Figures 2, 3, 3G:
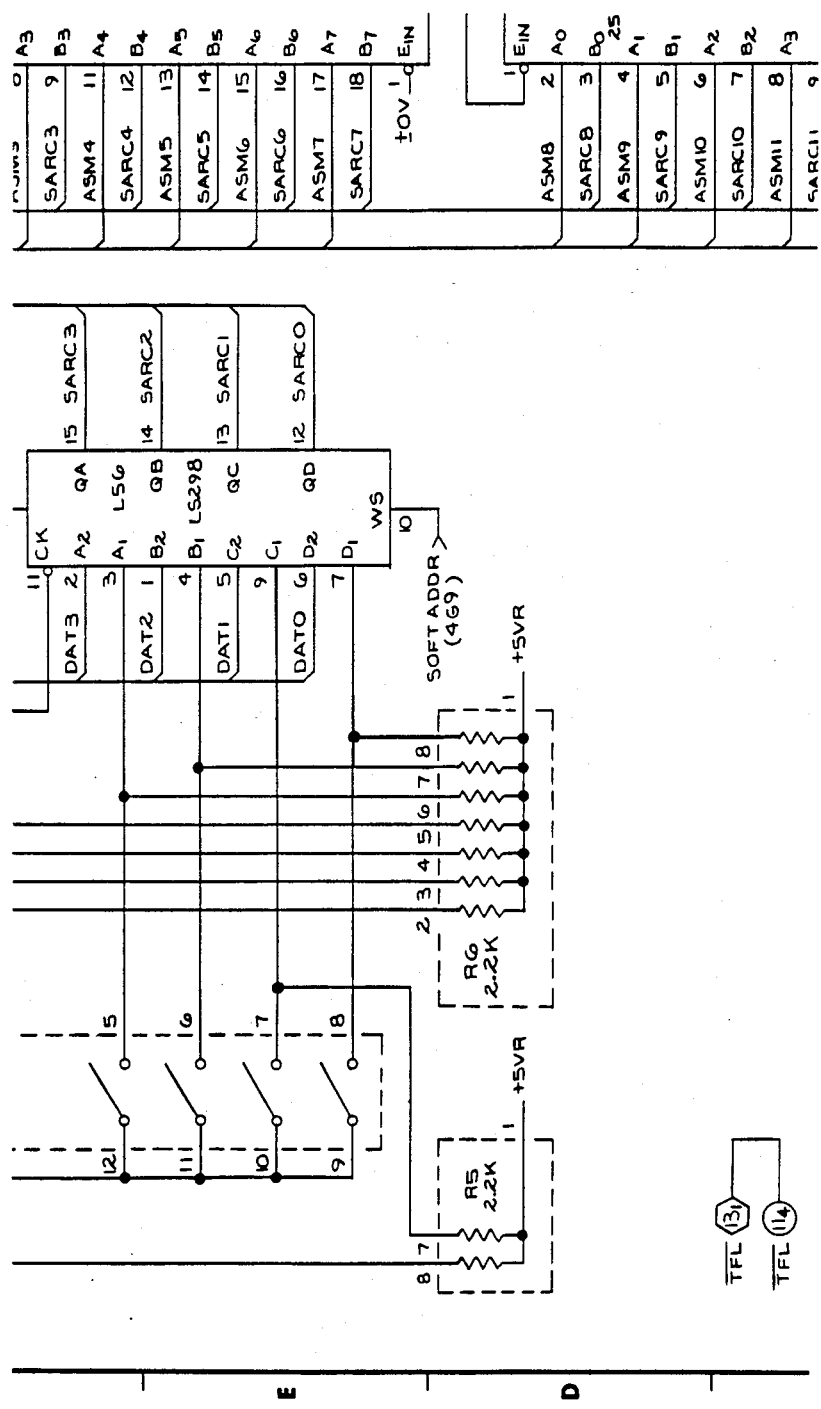
Figures 2, 3, 3H:
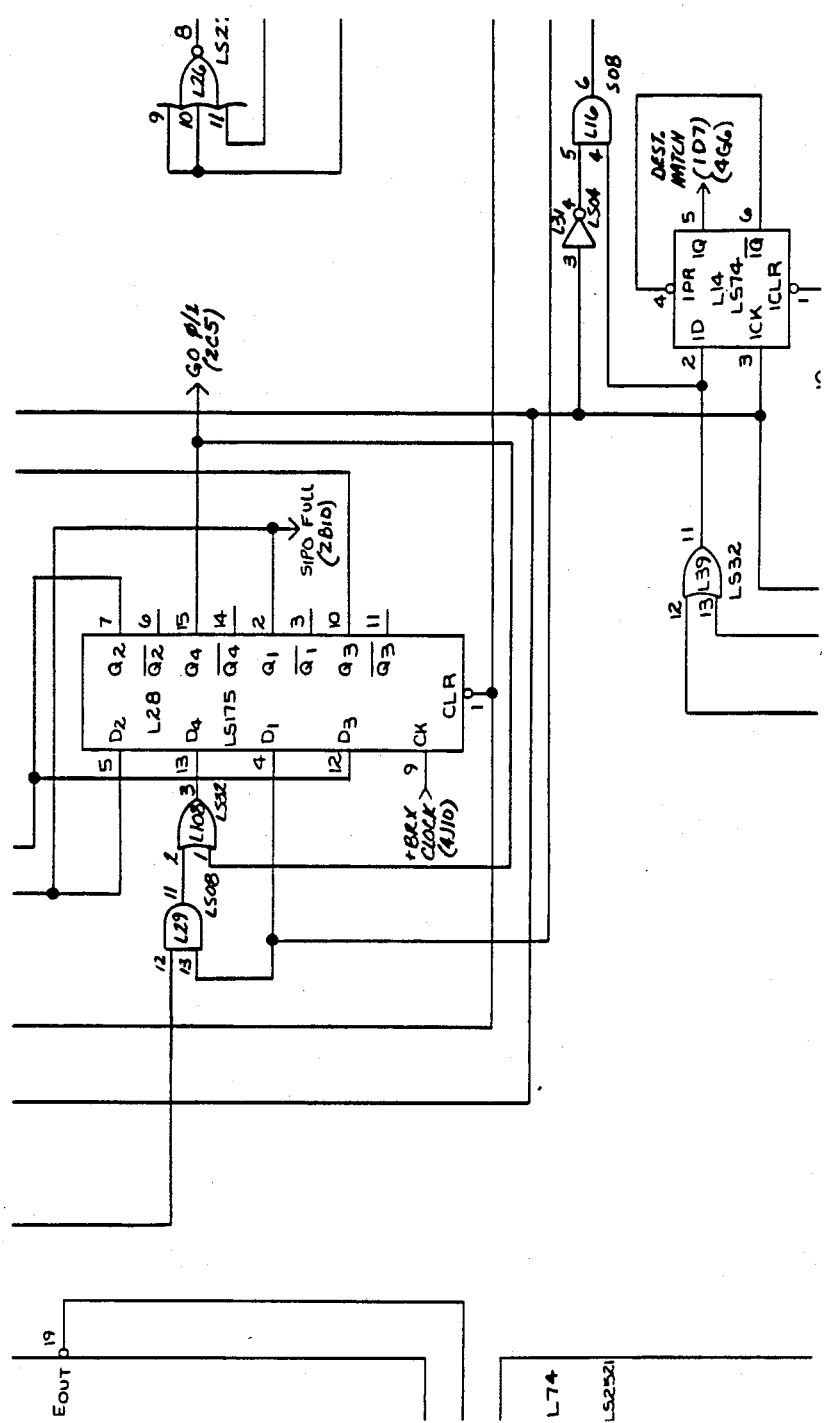
Figures 2, 3, 3I:
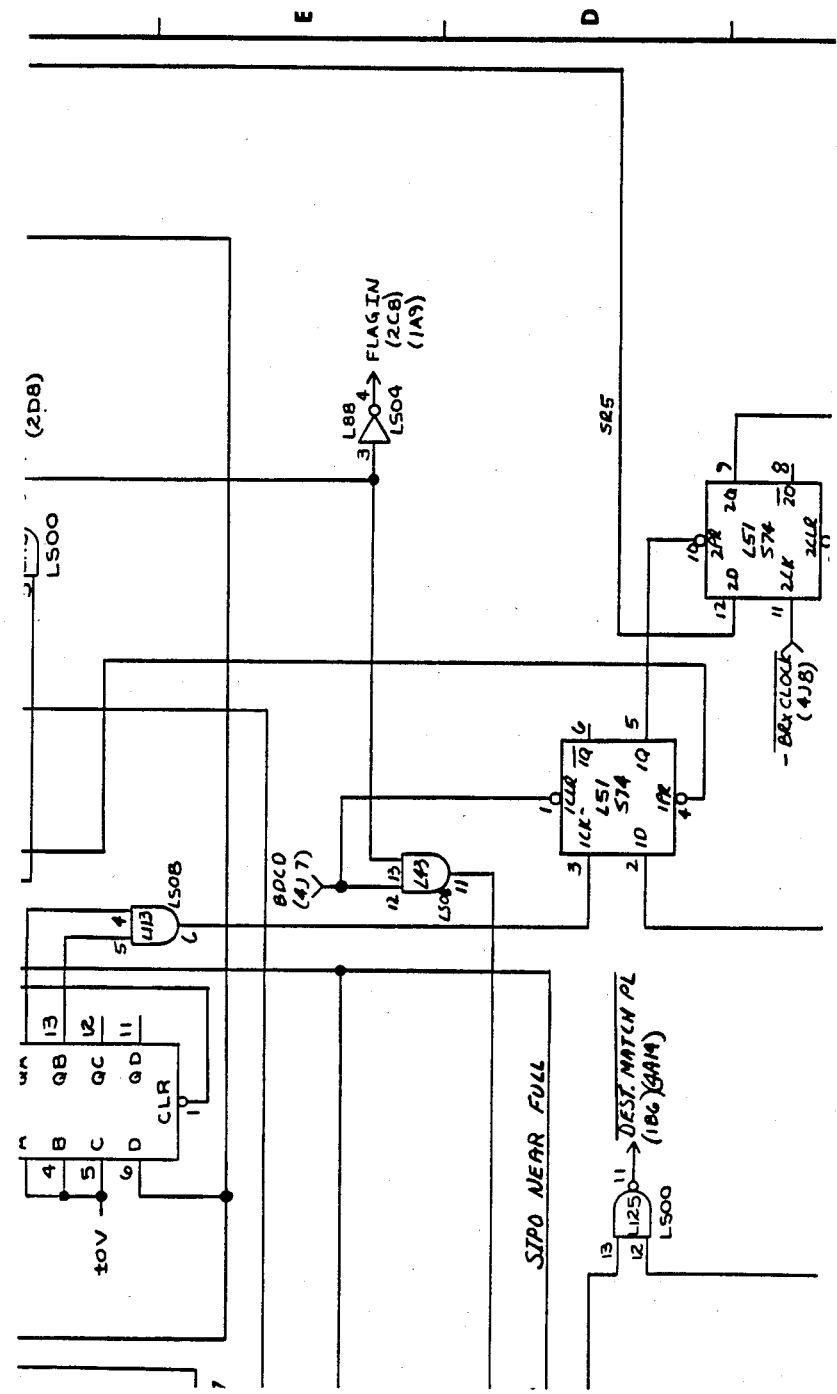
Figures 2, 3, 3J:
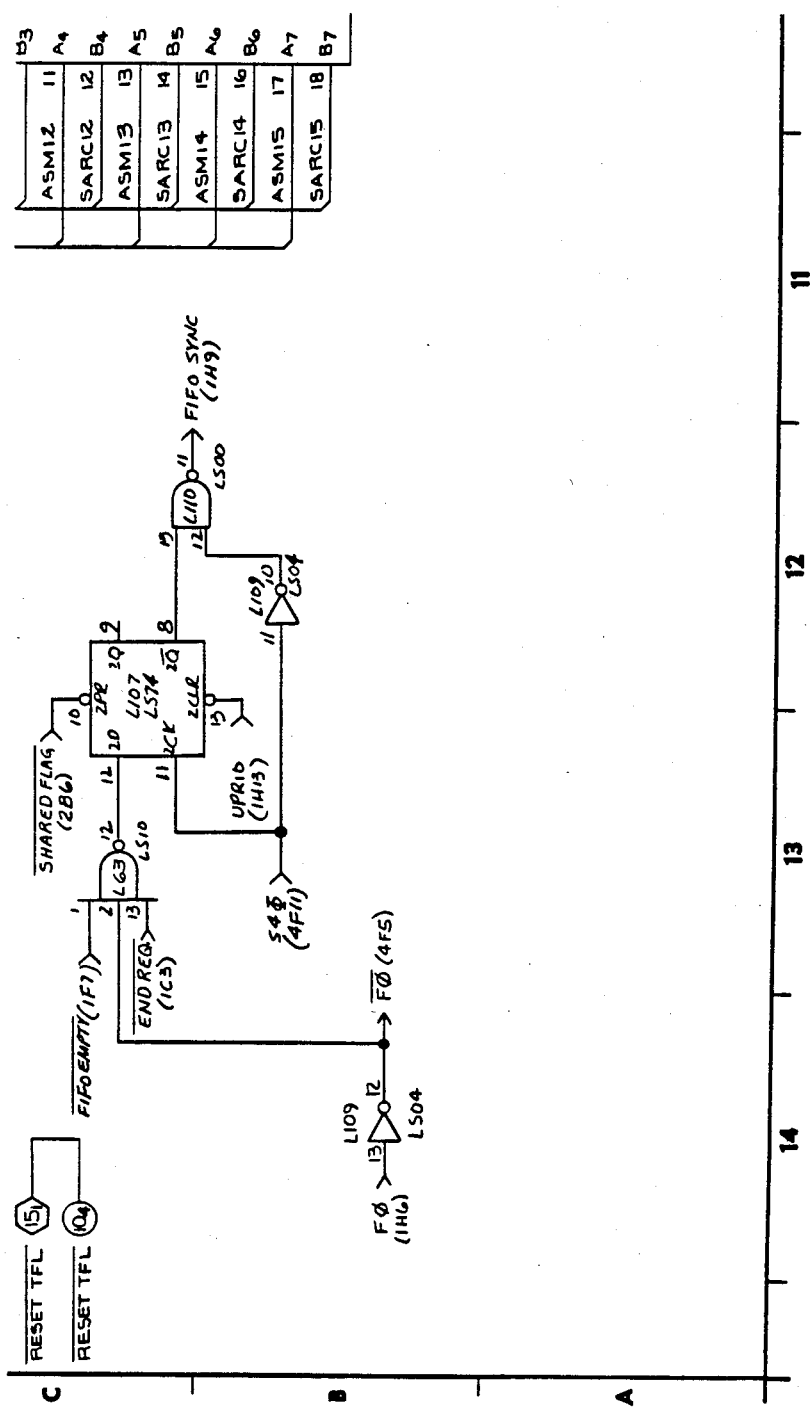
Figures 2, 3, 3K:
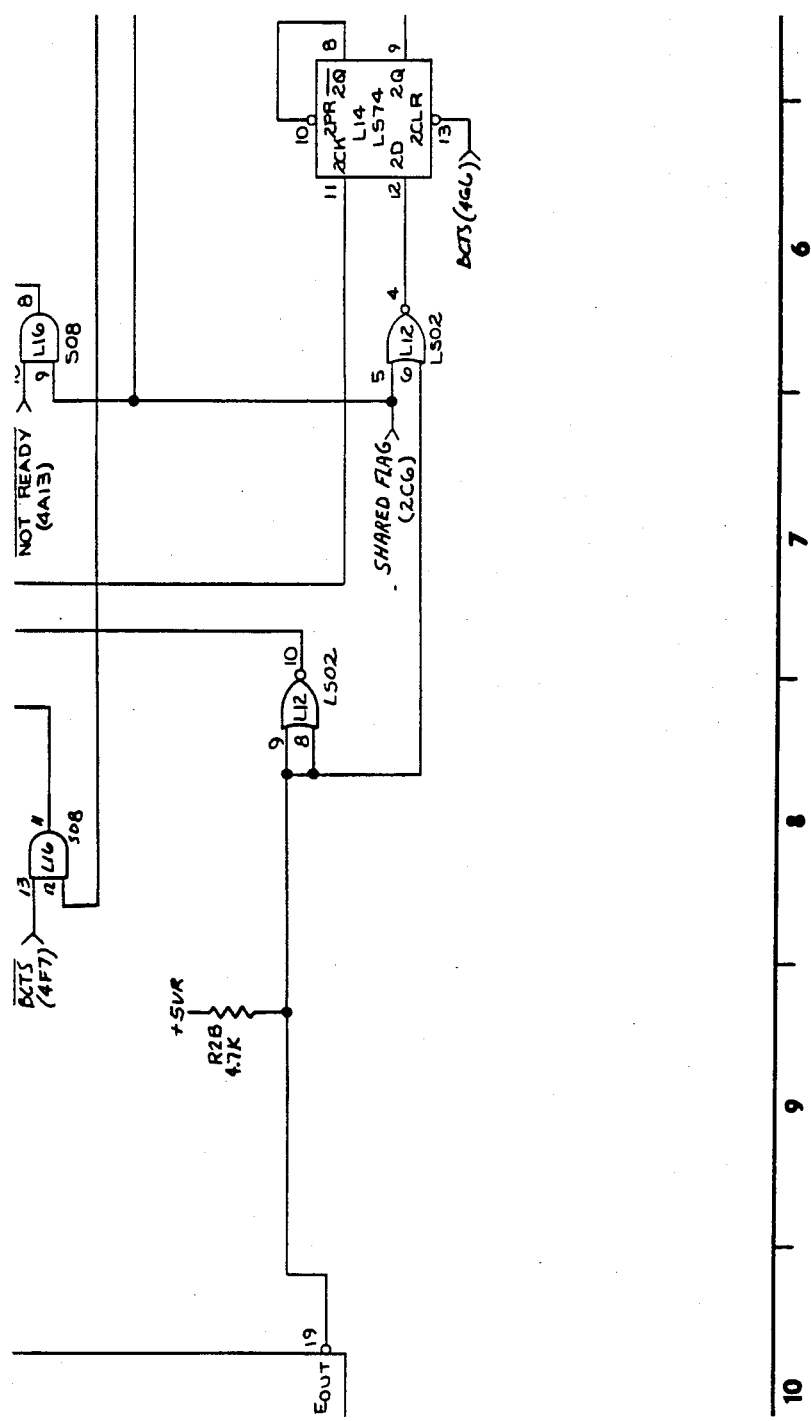
Figures 2, 3, 4, 4A:
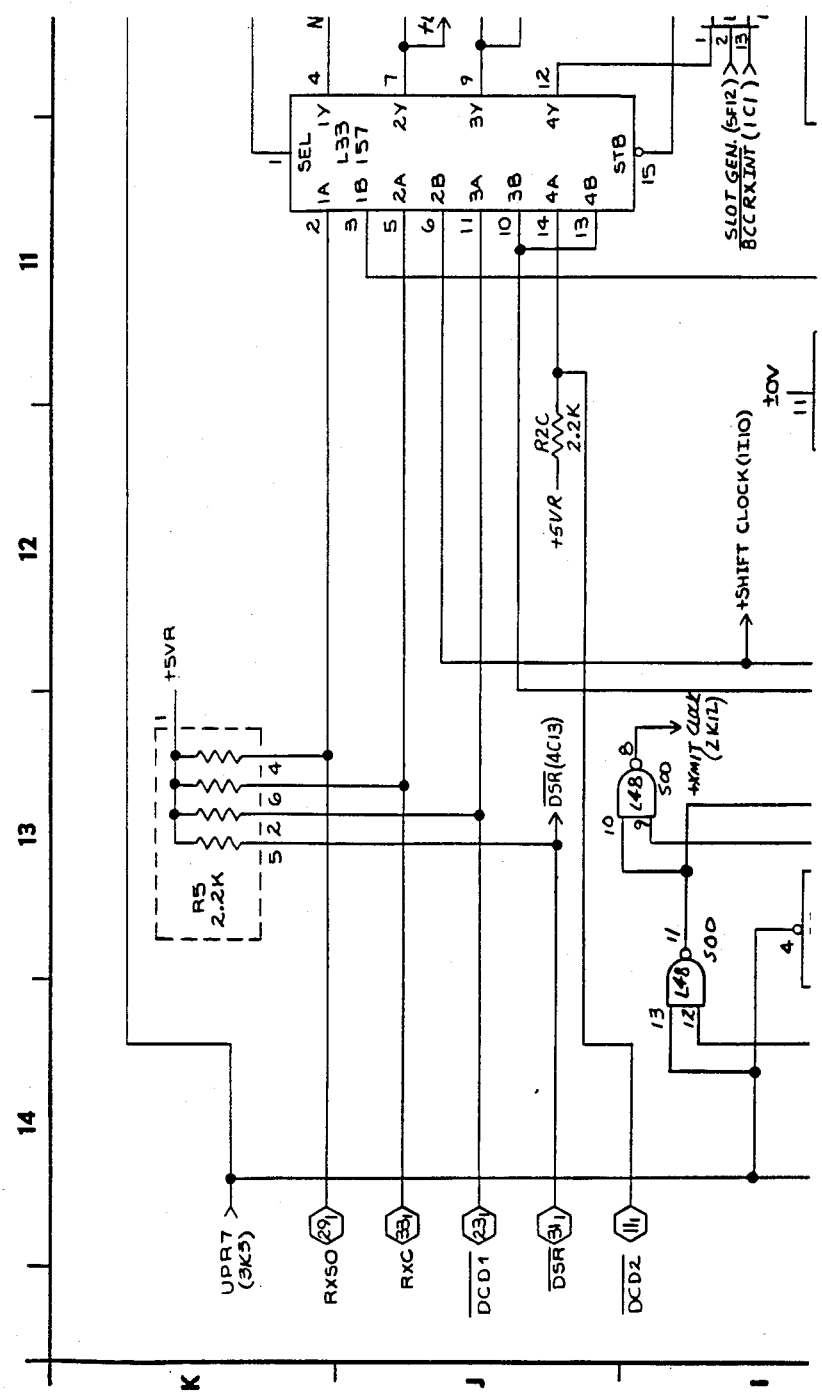
Figures 2, 3, 4, 4B:
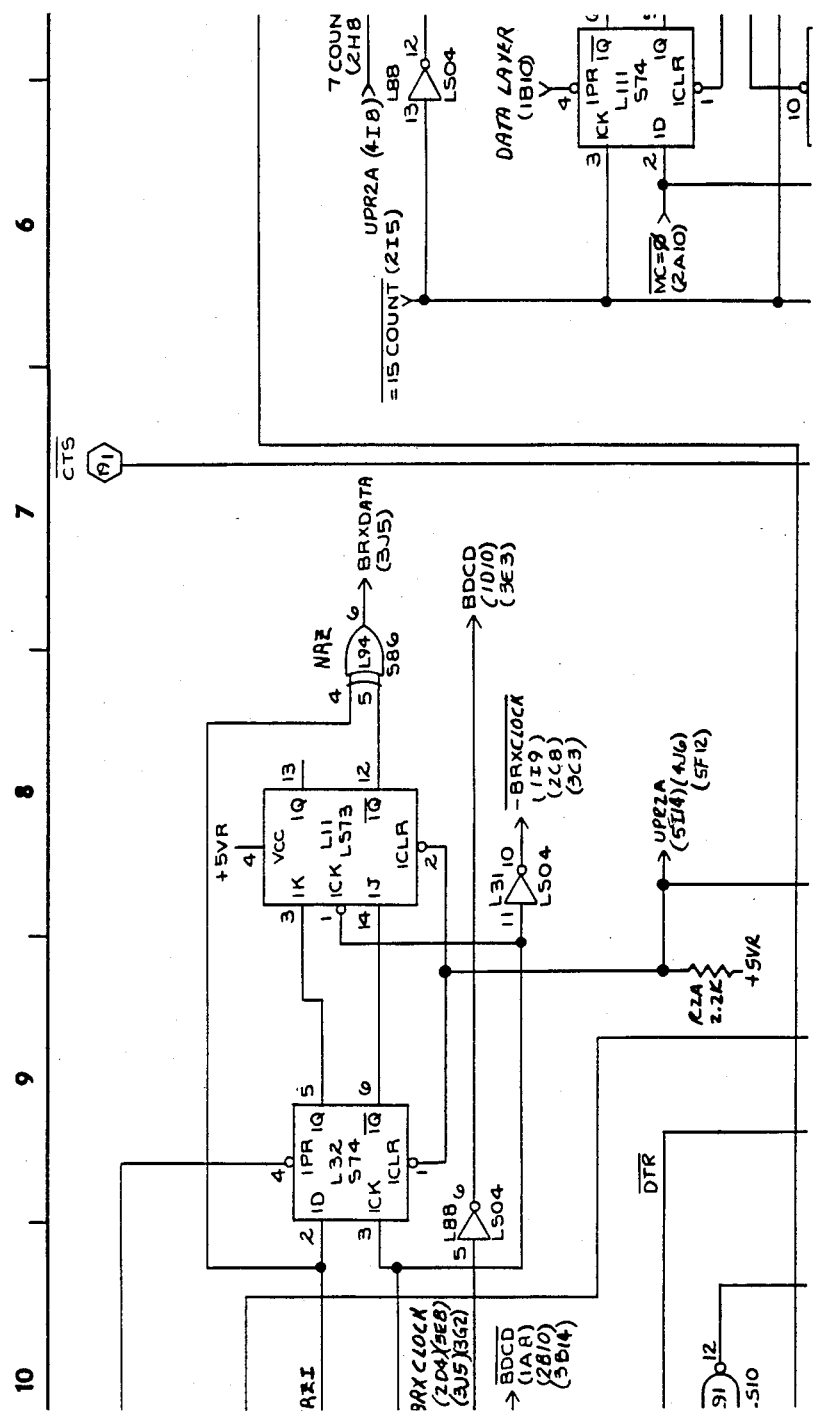
Figures 2, 3, 4, 4C:
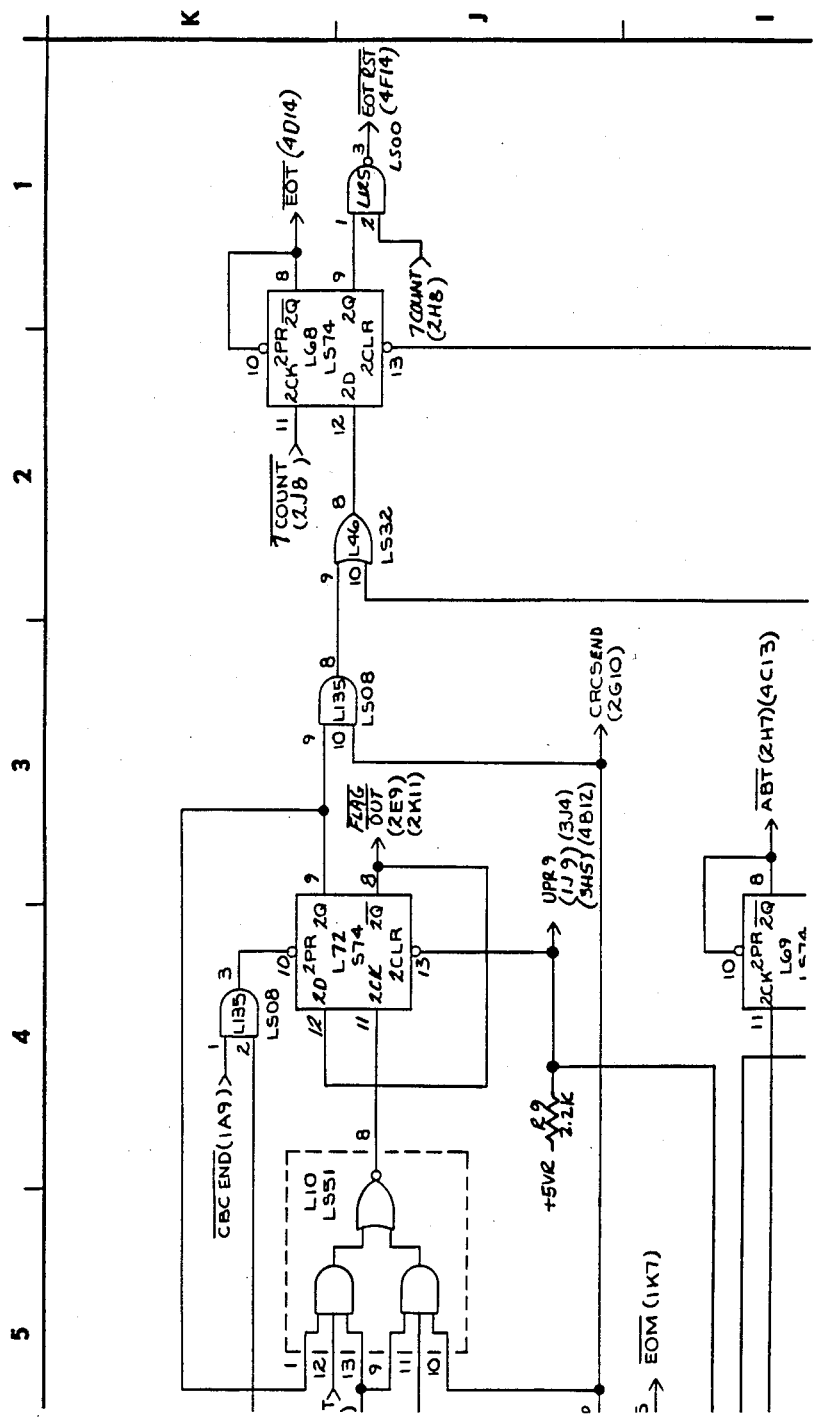
Figures 2, 3, 4, 4D:
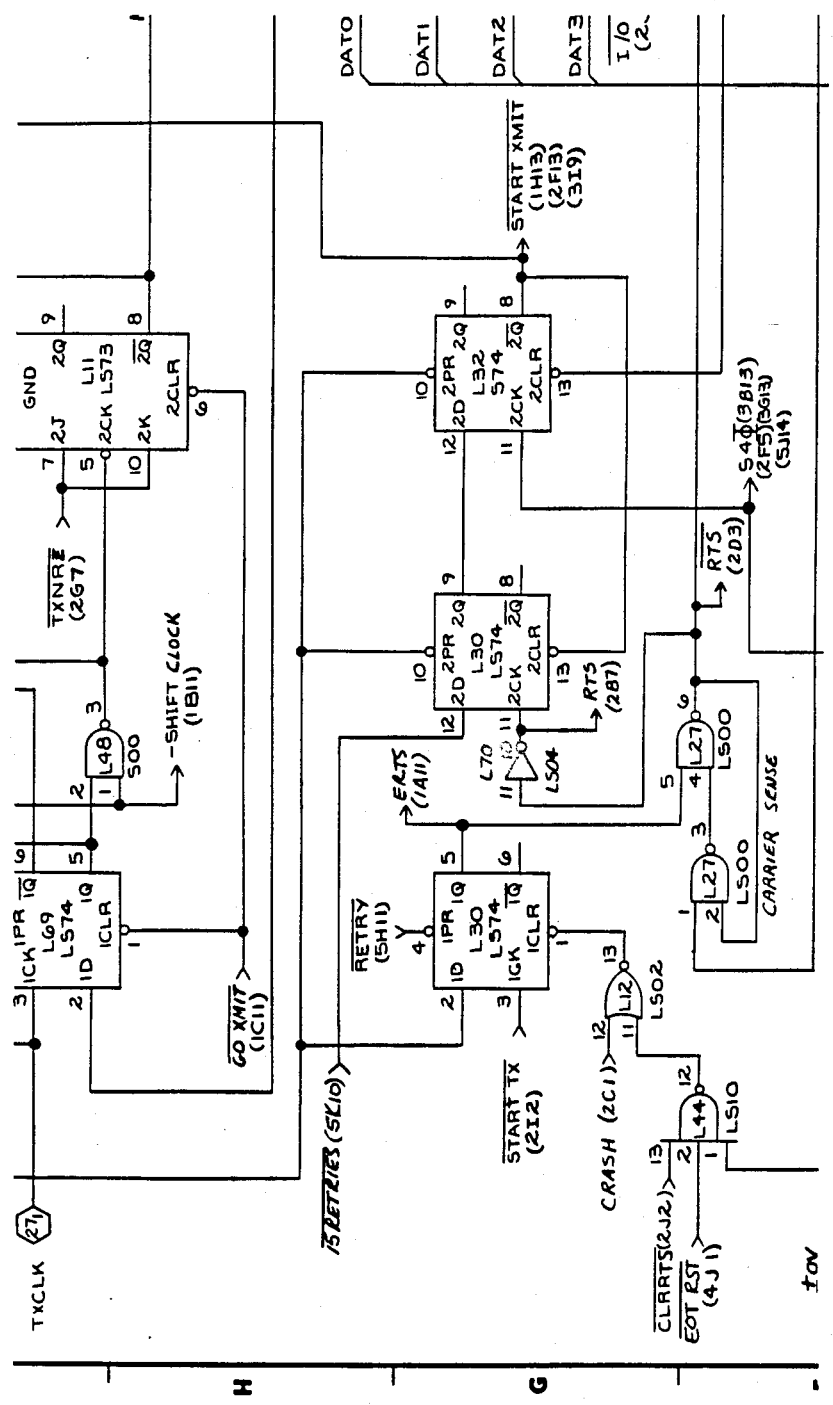
Figures 2, 3, 4, 4E:
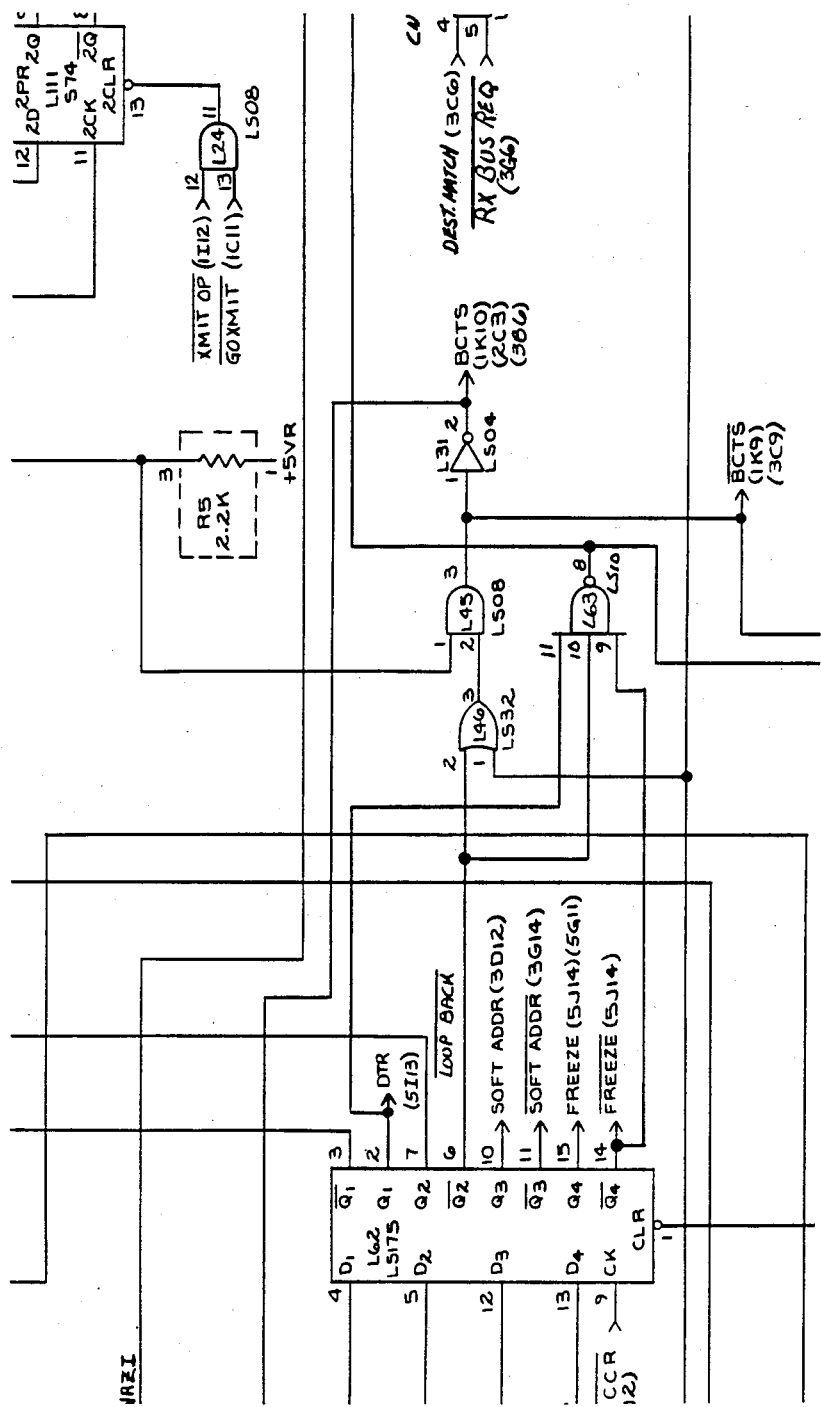
Figures 2, 3, 4, 4F:
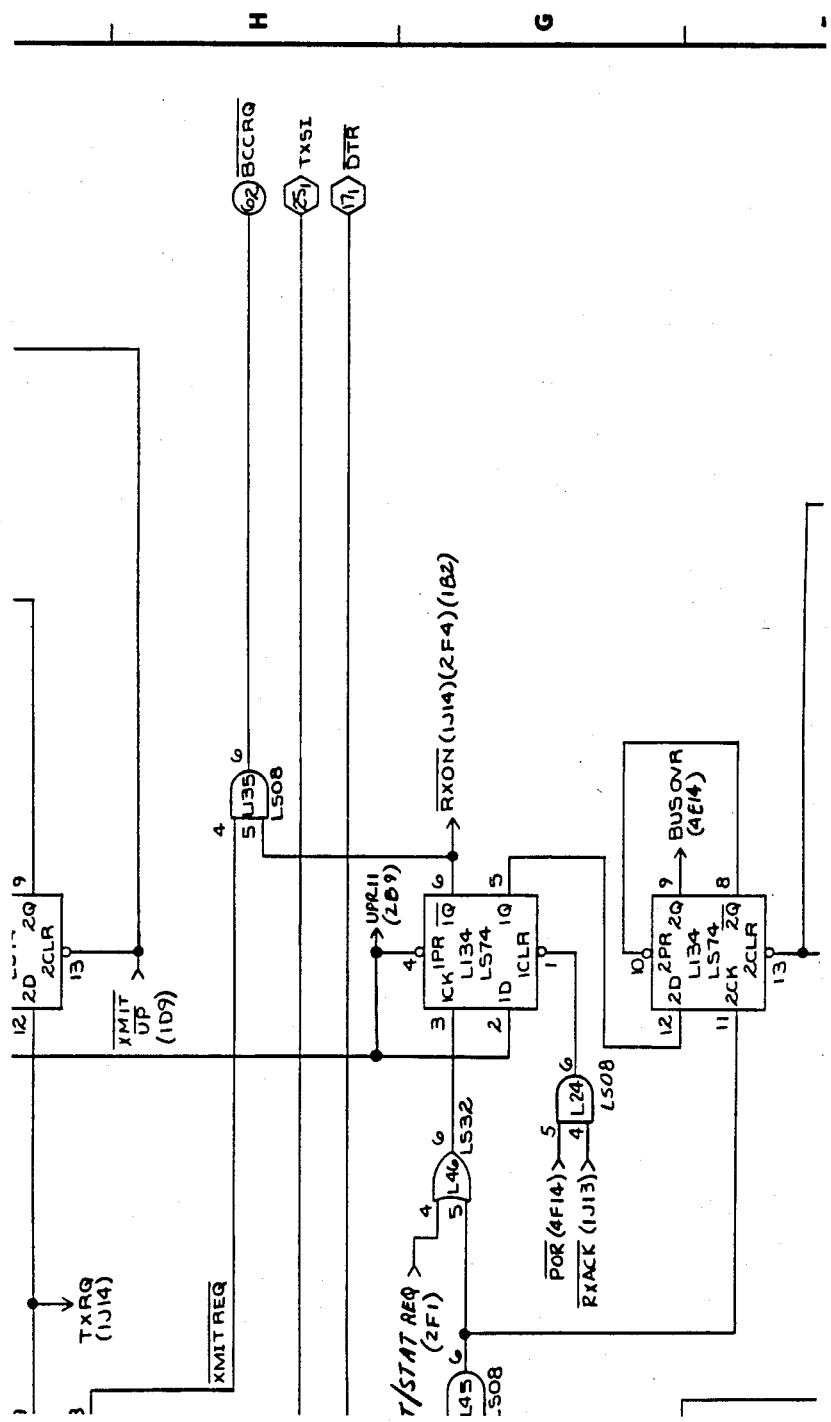
Figures 2, 3, 4, 4G:
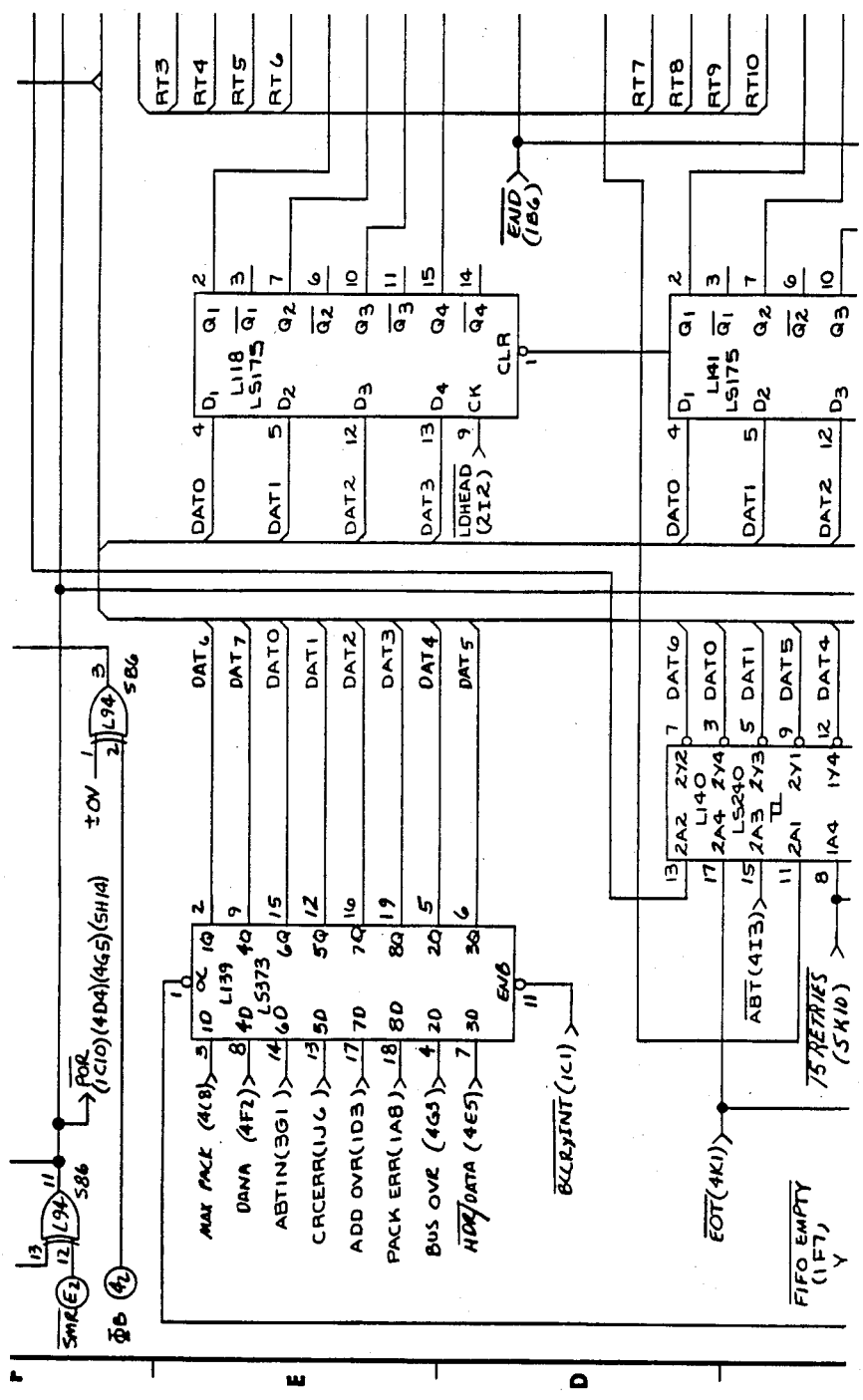
Figures 2, 3, 4, 4H:
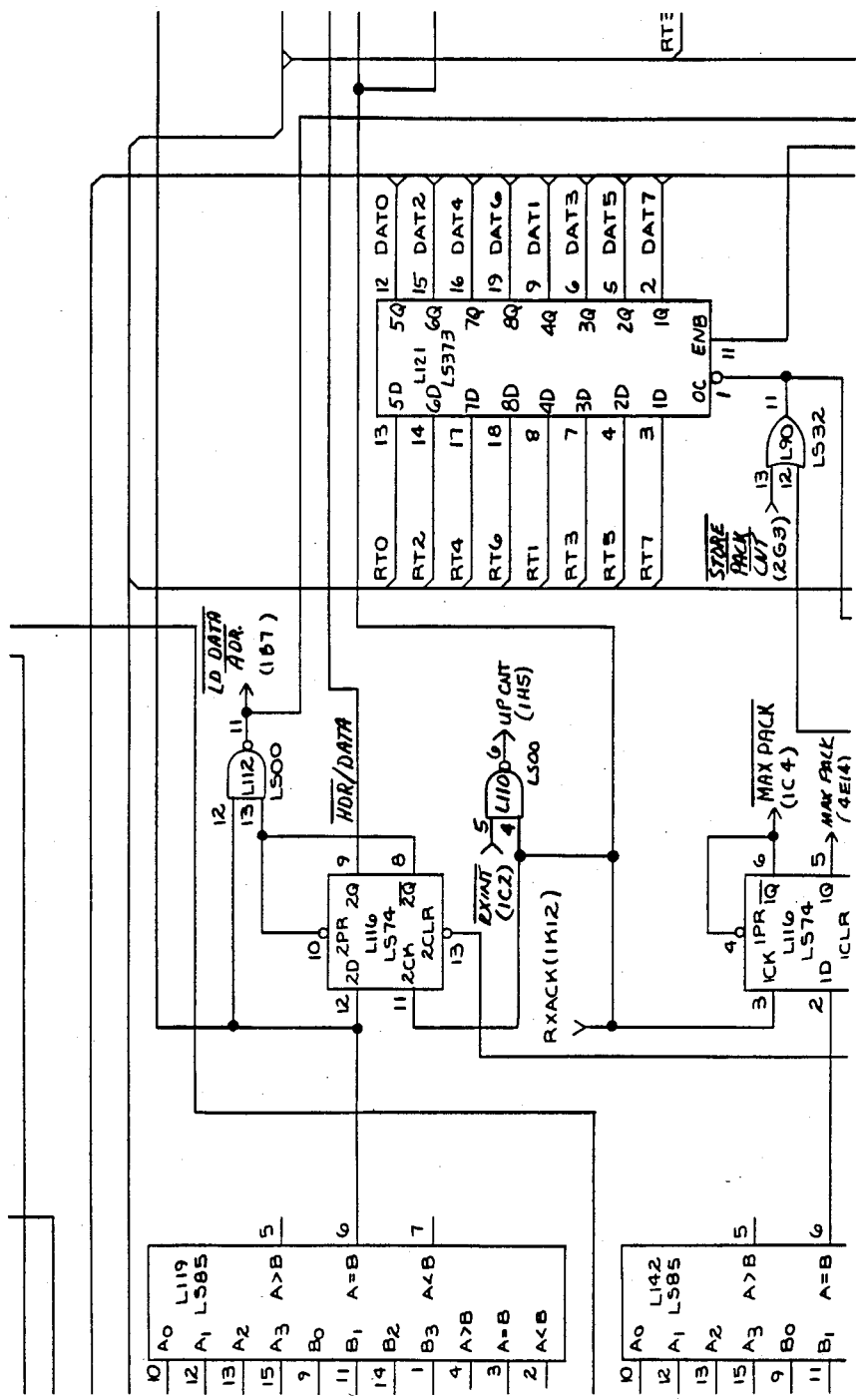
Figures 2, 3, 4, 4I:
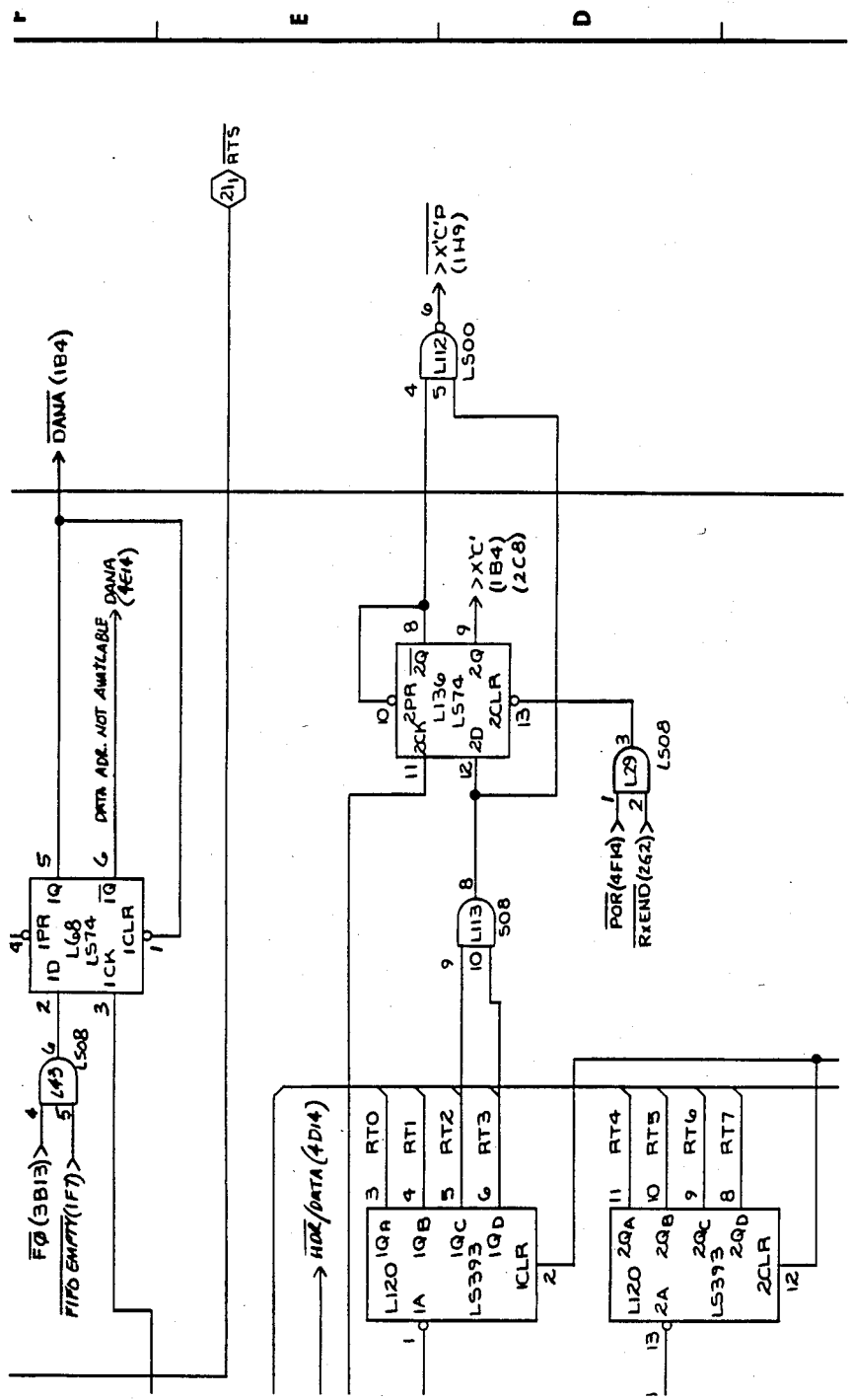
Figures 2, 3, 4, 4J:
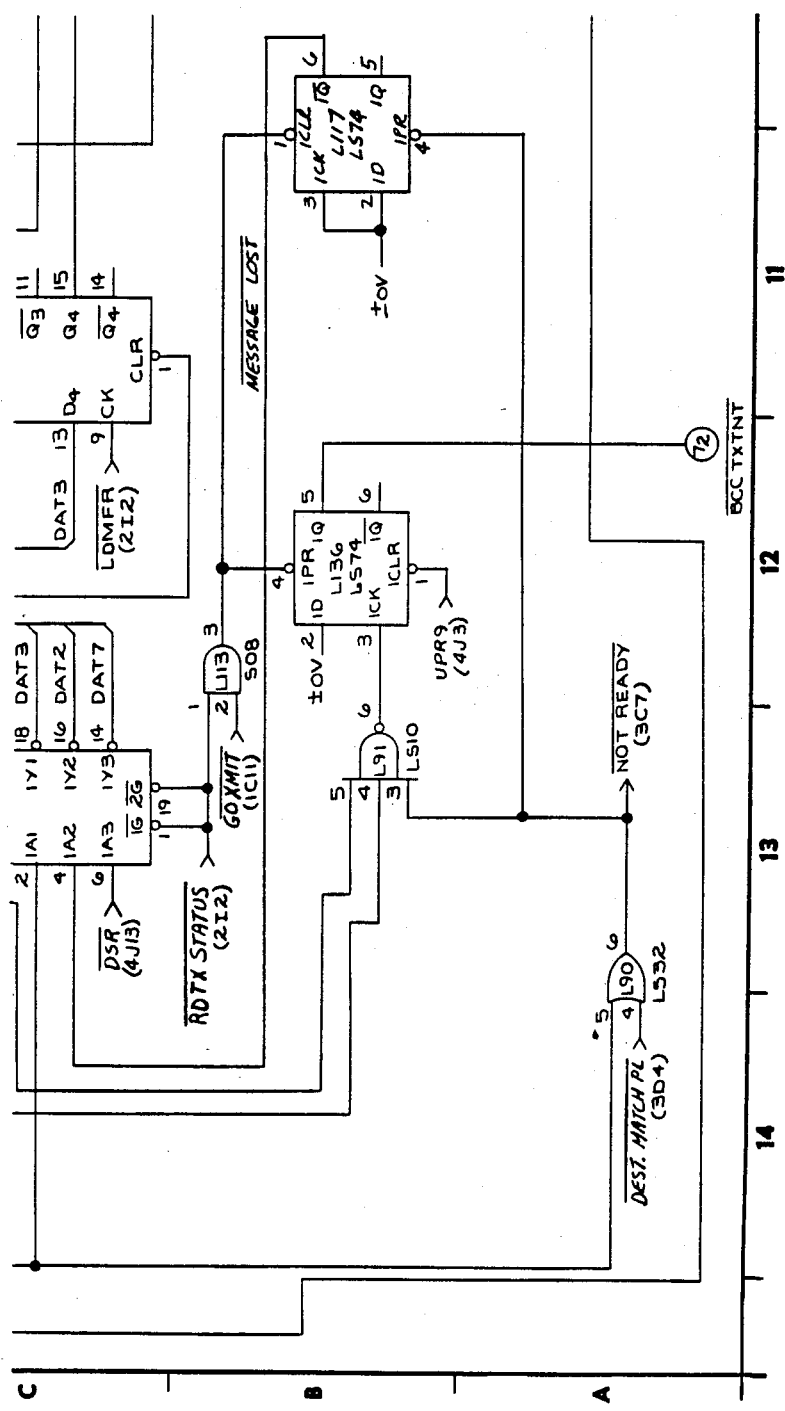
Figures 2, 3, 4, 4K:
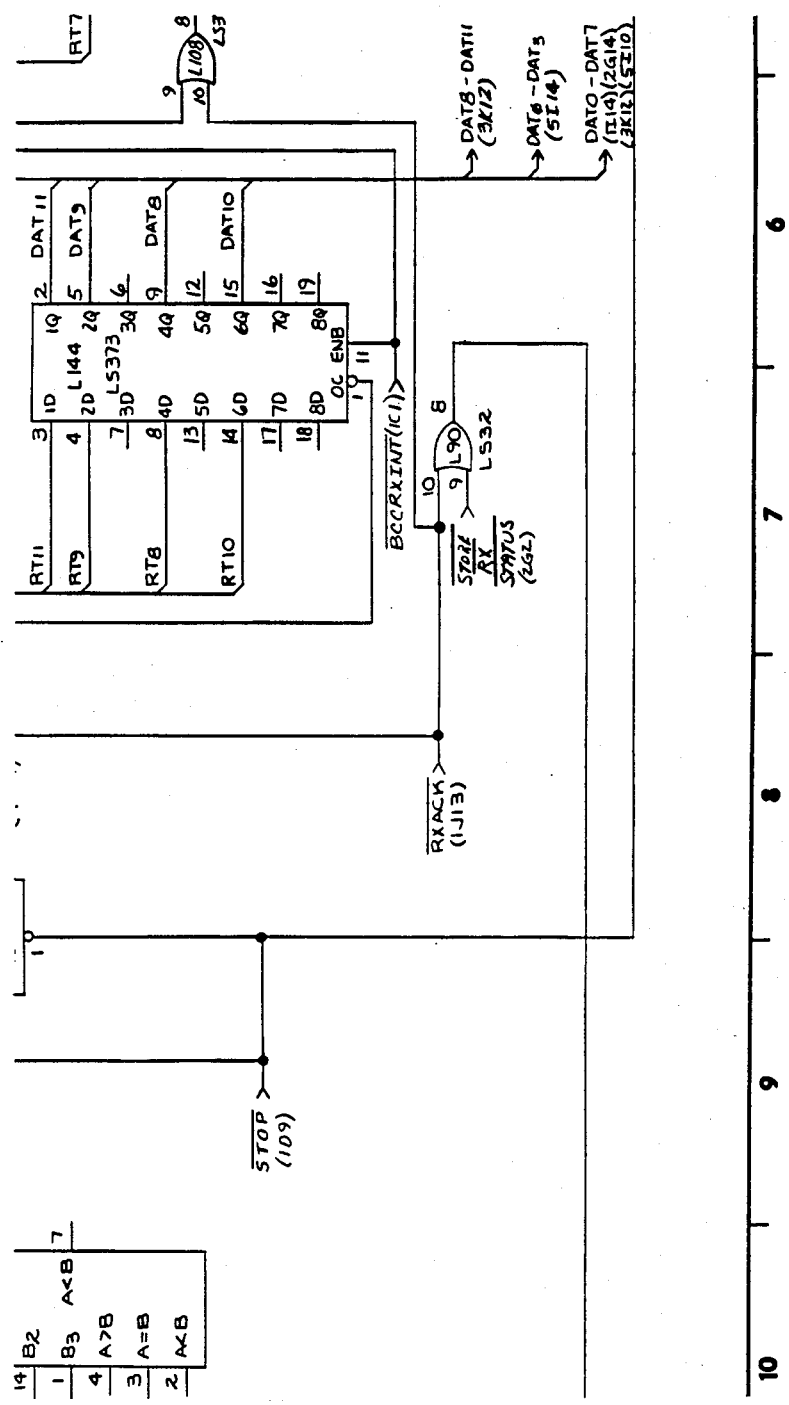
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
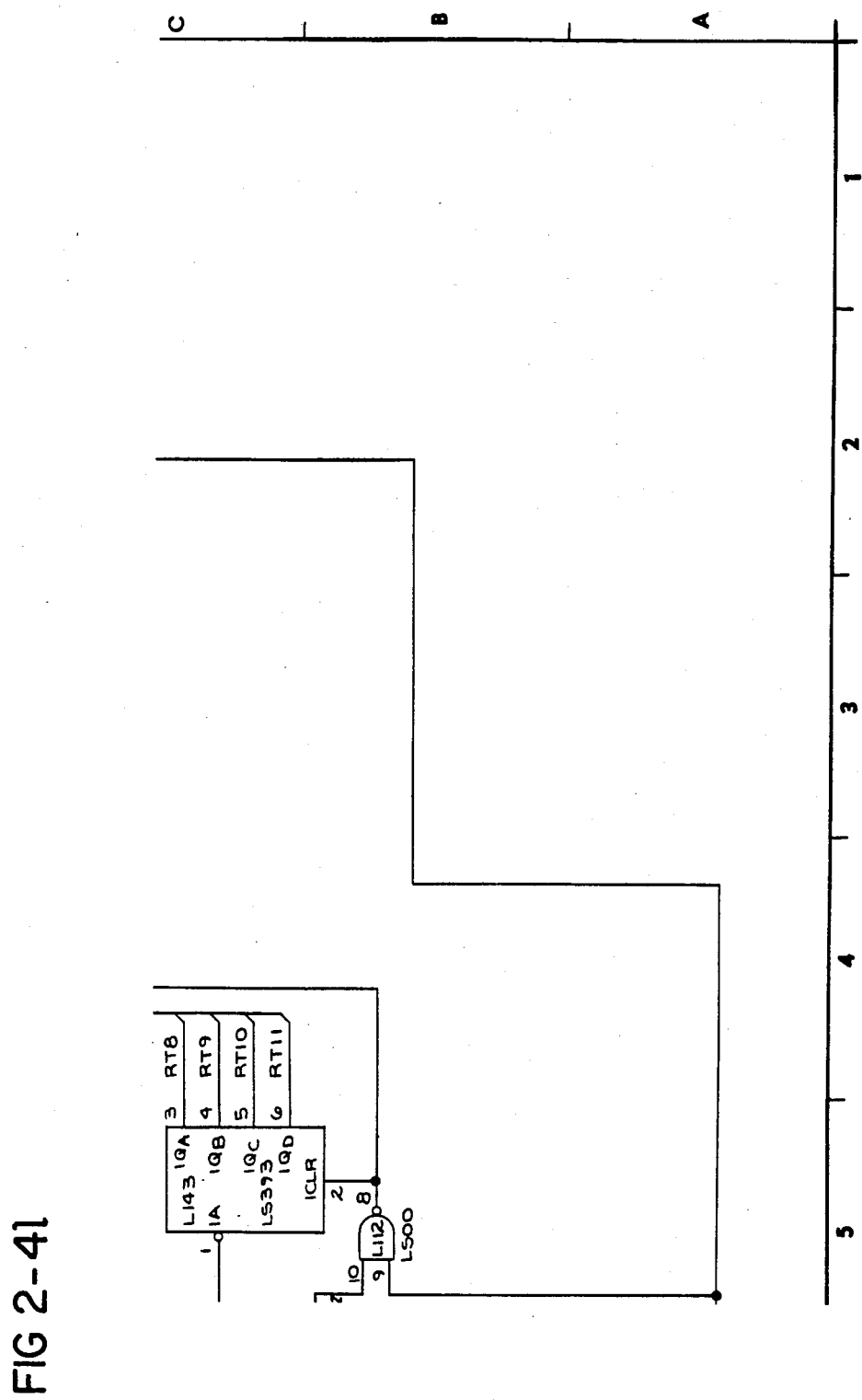
Figures 2, 3, 4, 5, 5A:
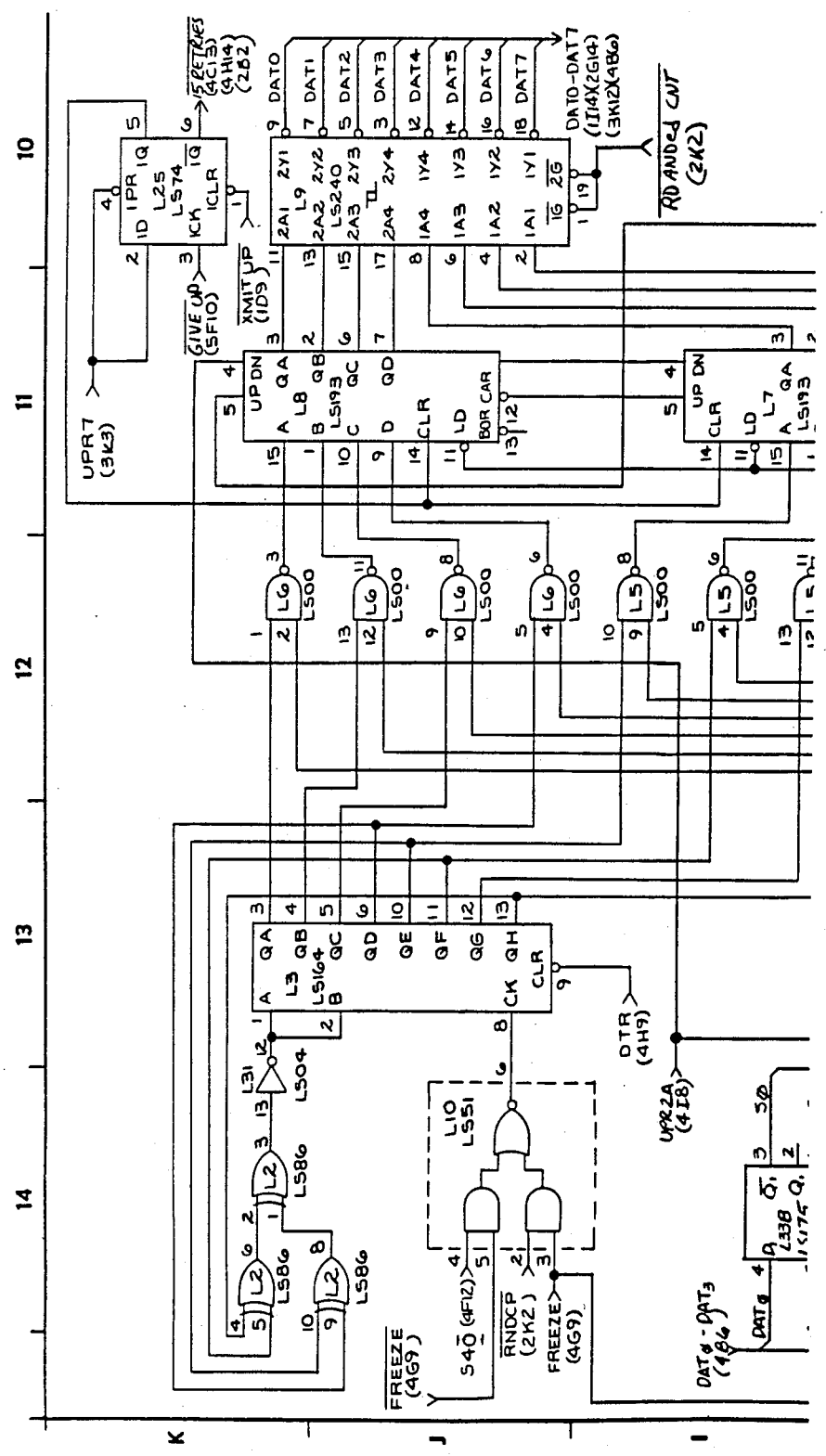
Figure 3:
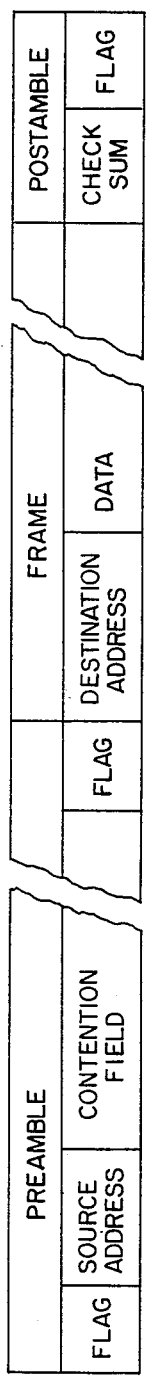

During routine communication activity, the controller 32 forms message packets of sequential discrete bit signals in the form illustrated in FIG. 3, starting with a preamble, followed by a frame, in turn followed by a postamble. The preamble and postamble are generated directly by the controller while the frame comes from the memory of the sending station and alone is delivered to the memory of the receiving station. The preamble starts with an opening flag character of 8 bits (01111110), followed by a 16-bit code identifying the sending controller and specified by the contents of L53, L54 at the beginning of the transmit operation. The sending address is followed in turn by a contention field consisting of a repeated sequence of (1 0) extending for an interval which is specified by the value stored in register L59. The postamble consists of an 8-bit check sum followed by another flag character (the closing flag).

Considering now the receive operation, four signals are received by controller 32 from the modem 30: the received serial bit stream RXSO, received clock RXC, data carrier detect /DCD1, and data set ready /DSR. These signals are applied to the A inputs of maintenance multiplexer L33. During normal receive operation (with the /LOOPBACK signal inactive), L33 selects and forwards these four signals as NRZI, BRX CLOCK, /BDCD, and /BDSR respectively.

Multiplexer L33 can also operate in a loopback mode for diagnostic function. During loopback operation, the maintenance multiplexer accepts four input signals from the controller's own transmitter and uses these in place of the four inputs normally received from the modem. The TXSI transmitted serial data stream replaces the RXSI received serial data stream on the pin 4 (NRZI) output of L33. A bit rate transmitter clock waveform derived from TXCLK replaces RXC as the source of BRX CLOCK on output pin 7. The carrier detect input is suppressed to keep /BDCD inactive on the pin 9 output of L33, and the Data Set Ready input (DSR) is replaced by Data Terminal Ready (DTR) from the Condition Code Register. When the station processor sets bit one of the Condition Code Register to activate the /LOOPBACK signal it directs the controller to perform a diagnostic loopback test.

Either normal or loopback operation can begin when the station processor activates the Data Terminal Ready (/DTR) signal, which originates on pins 2 and 3 of the L62 Condition Code Register. /DTR drives the pin 13 input to channel B of the L33 Maintenance Multiplexer. It also connects the pin 15 strobe input to L33 and, therefore, serves as a controller input enable. If /DTR is inactive at the pin 15 input to L33, the Maintenance Multiplexer will not operate and the controller will be effectively disconnected from the modem.

In either mode of operation, whether the controller is operating under normal conditions or performing a diagnostic loopback test, NRZI data from the L33 Maintenance Multiplexer next passes through the L32 and L11 NRZI Decoder before emerging from L94 as the NRZ input data signal called BRX DATA. L32 and L11 are always held in the clear state and are both clocked by BRX CLOCK, the received data clock from the modem, to reconstruct the NRZ serial data stream.

After BRX DATA, the received serial bit stream, has been decoded into NRZ format, it is then buffered for one bit time in the L72 Bit Delay Flipflop and split into two inbound data streams: a path that converts the serial data bits into parallel words of data and a second path that carries the serial data through the data monitoring logic. The Bit Delay Flipflop is set by BRX DATA on pin 2 of L72 and clocked by BRX CLOCK on L72 pin 3.

In the path producing parallel data, received serial data from pin 5 of the L72 Bit Delay Flipflop is applied to pin 3 of the L95 Serial In, Parallel Out (SIPO) Register, which assembles the serial bit stream into 8-bit bytes of parallel data. SIPO output is bused on SR0-7 to the L96 and L97 Assembly Register, which assembles pairs of 8-bit bytes into 16-bit words. The Assembly Register is actually one stage of a hardware double buffer, with the L75 and L98 Assembly Register Output Buffer forming the second stage. Words of received data move from the Assembly Register to the Assembly Register Output Buffer, and from there across the station bus to station memory. In general, during a receive operation, the controller can have one byte that is being assembled from serial bits in the SIPO, a previously assembled byte occupying the Assembly Register, and the previous two bytes awaiting transfer to station memory in the Assembly Register Buffer.

Data stream monitoring logic also receives the serial bit stream from L72, which enters pins 7 and 10 of the L71 Control Character Bit Counter. Loaded with an initial value of three, the Control Character Bit Counter tallies up to five consecutive ones in the serial data stream as it increments from three to eight. Since the input data stream is applied directly to the L71 counter enable inputs, any "zero" bit within the inbound data will reinitialize the counter and begin a new counting sequence. If five consecutive ones appear and the Control Character Bit Counter increments all the way up to eight, the pin 11 output from L71 asserts pin 3 of L49 and pin 9 of L27. At the end of the next bit time, pin 14 of L71 replicates the sixth serial data bit.

If, after five consecutive ones, the sixth bit is a zero and the seventh bit is a one, the zero must be an inserted zero, which must now be deleted. (As will be discussed hereafter, an 0 is inserted in the data stream when necessary to prevent formation of spurious flag characters.) The pin 14 output from L71 gates L71's pin 11 output through to pin 8 of L27, as described earlier. A signal on pin 8 of L27 will be active (low) only if the character currently being assembled in the SIPO is a control character or a character containing an inserted zero.

L49 samples three signals: the control character and inserted zero indicator on pin 8 of L27; pin 11 of L71; and the inverted output from pin 6 of the L72 Bit Delay Flipflop, which by this time holds the seventh bit of the character. If all three inputs are high, indicating that a one followed five ones and a zero, L49 asserts /DELETE 0 on its pin 6 output. Applying /DELETE 0 to L95 pin 1 inhibits the SIPO from shifting in the next bit on pin 3, which is the zero that must be deleted. The /DELETE 0 signal also goes to L114 pin 10, where it prevents the inserted zero bit from being recognized by the Broadcast Station Address Counter.

If the sixth bit is a one, the inbound character must be one of the control characters: either a flag character or an abort character. Pins 1 and 2 of L115 sample the Q output from the Bit Delay Flipflop (L72 pin 5) and set the 2D input on pin 12 of the L117 Abort Character Flipflop only when six consecutive ones are followed by a seventh one. (The preset pin 10 of L117 is enabled by the SHARED FLAG signal; therefore, abort characters are recognized only in the data layer). Pins 4 and 5 of L115 perform a similar function to assert /FLAG IN on pin 6 of L115 only when six consecutive ones are followed by the zero of a flag character.

When the control character detection logic detects a flag character in the SIPO, a FLAG IN-/FLAG IN signal pair and a FLAG GEN signal are generated. The FLAG GEN signal is also generated if the SIPO is filled three times without detection of a flag. The L66 Flag Decoder keeps count of flag arrivals and sets the signals OPEN FLAG, SHARED FLAG, or CLOSE FLAG to identify the current place in a received packet.

Receive sequencer L28 generates the sequence of control signals required to accept and assemble inbound data. The receive data sequence begins when a SIPO NEAR FULL signal from pin 15 of L114 asserts pin 4 of L28.

An output from L28 pin 7 toggles the L47 Low-High-Order Byte Flipflop to switch between assembling a low-order byte into L96 and a high-order byte into L97.

Supposing the controller not to be sending, (so that L14 (sec 2) is blocked by a low BCTS) no further action will take place, although serial bits will continue to be put in parallel form, and presented to the Address Comparator, until a shared flag is detected. Then, if the subsequent word (designating a 16-bit unit) is found by the Address Comparator to match the station address, L14(sec 1) will be switched and generate the DEST MATCH signal. Absent an address match nothing further will happen through the end of the packet.

After a destination match, the controller begins making station bus requests to transfer words of received message data into station memory. L45 receives a DEST MATCH signal on pin 4 and an /RX BUS REQ signal on pin 5. The output of L45 goes through L46 and then asserts the clock input on pin 3 of the L134 Receive Bus Request Flipflop, generating the /RXON signal on pin 6 of L134. Active /RXON in turn asserts the /BCCRQ signal via L135. With the /TRX signal active because no transmission is in progress, a RXACK signal is emitted by L109. The Receive Bus Request Flipflop remains set until it is cleared by receipt of the /RXACK signal that acknowledges a bus request and issues the bus grant.

A bus overrun condition arises if another receive bus request is initiated by the receipt of a second /RX BUS REQ signal before the pending bus request is granted and /RXACK clears the L134 Receive Bus Request Flipflop. In this case, the active RXON signal on pin 12 of L34 is clocked by the second bus request signal from L45, generating the receive overrun indicator, an active BUS OVR signal on L134 pin 9. BUS OVR is held as bit 4 of the L139 Receive Status Register.

DEST MATCH from pin 5 of the L14 Destination Match Flipflop clocks an address for the header out of the FIFO (L26, L27, L30, L31) and into the Header Address Holding Register by asserting pin 11 on both L128 and L129. At the same time, /DEST MATCH PL (along with /LOAD HEAD) clocks the header buffer address into the Receive Up/Down Counter by asserting pin 11 of all four of L26, L27, L30, L31.

UP CNT on pin 5 of the LS193s increments the Receive Up/Down Counter as each word is transferred. The current address value moves from the Receive Up/Down Counter to the station address bus via L151 and L152, which are gated by /RXACK each time a bus request from the controller is acknowledged. Because the low-order bit of a buffer address is used as the header/data flag and replaced with zero, SA0 is grounded at the pin 2 input to L151.

As data transfers proceed, the L120 and L143 Receive Total Counter tallies the number of words that are received and stored into station memory. Counters L120 and L143 count up upon receiving each station bus acknowledge signal on L120 pin 1.

The L119 Header Word Count Comparator matches the number of header words received against the expected size of the header previously loaded into L118 to detect the transition between the header and data fields. L119 compares bits 3-6 from the Receive Total Counter with the programmed header word count and applies its A=B output to drive the L116 Header/Data Flipflop.

An active /HDR/DATA signal output from L116 indicates that header words are being received. As inbound data continues to arrive and the Receive Total Counter increments to reach the specified header word count, /HDR/DATA goes high to mark the end of the header and the beginning of the data field. This signal, in turn, generates /LD DATA ADR from pin 11 of L112, which terminates transfers to the header buffer region of station memory and initiates transfers into the data buffer.

Once the packet header has been received and transferred into station memory, the Receive Packet Address FIFO presents F0-15 with its next address, which is a data buffer address. The data buffer address is gated into the Receive Up/Down Counter by the same logic that loaded the header buffer address, but with /LD DATA ADR asserted on pin 13 of L132 instead of /LOAD HEAD on L132 pin 12. The header buffer address remains stored in the Header Address Holding Register (L128 and L129), which is not clocked at this time. UP CNT increments the current address in the Receive Up/Down Counter as DMA transfers carry each word of the data field across the bus to station memory.

Almost identical in operation to the Header Word Count Comparator, the L142 Maximum Frame Size Comparator matches the total number of message words received against the predetermined maximum frame size. Software loads the L141 Maximum Frame Size Register with the largest expected message size in units of 128 words. L142 compares bits 7-10 from the Received Total Counter with the programmed maximum frame size and uses its A=B output to drive the L116 Maximum Packet Size Flipflop. An active MAX PACK signal from L116 pin 5 indicates packet size overflow, which terminates the receive operation and sets bit 6 of the Receive Status Register.

The bit transmitting rate of the network is such that a controller may at times receive message packets from the modem faster than the station processor can acknowledge receive interrupt requests and supply buffer addresses at which to store frame information in its memory. A Received Packet Address FIFO stores up to eight buffer address pairs, each supplying a 16-bit header buffer address and a 16-bit data buffer address, to provide buffer addresses when the controller needs them. Header and data buffer addresses are stored alternately within the FIFO: its deepest location holds a data address, the next location addresses a header buffer, then another data address, and so on.

Even with up to eight pairs of header and data buffer addresses stored in the FIFO, underrun can occur when the controller consumes buffer addresses faster than the station processor replaces them. FIFO underflow occurs if the FIFO is empty (or contains only a data buffer address) when the controller needs a header buffer address at the time of a destination match. The controller uses bit 7 of the Receive Status Register to report that FIFO underflow has occurred and the packet is lost.

If the controller needs only a header buffer—as when operating in the diagnostic promiscuous mode, for example, or when a sending station goes off the air before completing its header transmission—the FIFO synchronization circuit based on L107 retrieves the extraneous data buffer address from the FIFO and discards it. All buffers begin at even addresses; therefore, the low-order bit of a FIFO address is used only to identify the address as either a header buffer address or a data buffer address. If low-order bit F0 on pin 15 of L126 is cleared to zero, the address is a header address; if low-order bit F0 is set to one, it is a data buffer address.

Buffer addresses normally are consumed in pairs, and the controller can identify an address in context during normal operation. Use of the low-order bit as a header/data flag distinguishes header buffers from data buffers even when packet reception terminates abnormally, leaving an unused address in the FIFO, or when the controller accesses the FIFO (to obtain a header buffer address) between the time that the station processor loads a data buffer address and the time that it loads the associated header buffer address.

When the controller detects the closing flag character that signals the end of a data field, CLOSE FLAG is asserted at pin 16 of L66. This by way of L108 and L109 generates an /END signal and by way of L108 clocks the L107 Receive Interrupt Flipflop. When L107 asserts RXINT on its pin 5 output, it generates the DOWN CNT signal applied to L149 so that L149 will decrement succeeding address values. The RXINT signal also releases pin 9 of the L155 Receive Interrupt Sequencer, which generates five control signals, each properly timed to regulate word count and status processing.

Based on a 4-bit, free-running counter driven by the 4-MHz station clock, the Receive Interrupt Sequencer generates the five control signals by counting up from EH. The load input to pin 9 of the LS161 counter is driven by RXINT, which remains low until the controller generates its receive interrupt request. Therefore, a count of 1110 binary (EH) is constantly loaded into the Receive Interrupt Sequencer L155 and applied to its outputs during most of a packet receive operation. Once all packet data is received, RXINT goes active on pin 9 of L155, removing its load signal, and L155 begins to count up from EH.

The second clock pulse increments the count past FH to 0, generating a carry and asserting /LOAD HEAD on the pin 15 carry output. The count continues to increment from zero as output signals CNT/STAT REQ, /STORE PACK CNT, /STORE RX STATUS, and /RX END (count of 5, the highest value this counter ever reaches) are asserted at the proper time. When the controller makes a station bus request and /RXON goes active on the pin 7 input of L155, it disables the counter until /RXACK goes active to indicate that the bus request was granted. This procedure suppresses Receive Interrupt Sequencer operation while the controller waits for a bus grant.

/LOAD HEAD gates the same header buffer address used earlier out of the Header Address Holding Register and back into the Receive Up/Down Counter. /STORE PACK COUNT on pin 13 of L155 gates the word count from the L121 and L144 Word Count Buffer into the L151 and L152 System Data Bus Drivers, from which it is stored in the station memory preceding the header. The receive bus grant signal, /RXACK, asserts pins 1 and 19 of L151 and L152 to gate data from the System Data Bus Drivers out onto the station data bus. /STORE RX STATUS on pin 8 of L38 gates eight status flags from the L139 Receive Status Register into the data bus drivers, from which they are stored in station memory in the low-order byte of the word preceding the word count. Finally, after the packet word count and status have been transferred, /RXEND from pin 3 of L38 completes the receive interrupt sequence by reinitializing the controller to begin a new packet receive operation. Pin 6 of the L107 Receive Interrupt Flipflop also asserts /BCC RX INT to request a receive interrupt once the receive operation ends.

When the value stored in Transferred Word Counter L120, L143 rises to 12, a signal passes through L113 to the 2D input of Flipflop L136 and to pin 5 of L112. Pin 6 of L112 goes low when this signal is applied and, propagated through L132, puts a low on the unload pin of the FIFO (L26, L27, L30, L31). The next RXACK signal, which will be generated in connection with the transfer of the 13th 16-bit word into the station memory and therefore corresponding to the receipt of the 208th bit of the received frame, clocks the Minimum Word Count Flipflop, to produce the )X'C' signal, while the pin 6 output from L112 goes high. If the )X'C' signal is not generated, the Receive Interrupt Flipflop is blocked so that the various activities described earlier that take place at the normal ending of a message will not occur. Further, the rising edge of /)X'C' from L112 passing through L132 unloads the oldest address (which has been used as the address for the currently received packet) from the FIFO (L26, L27, L30, L31), and if the 13th RXACK signal is not generated, this address will not be unloaded from the FIFO and will be used for the next received packet. Thus, although the transfer into station memory is started as soon as frame words are received, only when the frame has extended to 13 words (208 bits) will the received message be validated by sending the /BCC RXINT signal and withdrawing the frame address from the FIFO queue.

Station bus control operations take place through gate L138. An active bus grant (/BCCGT) signal on pin 19 of L138 enables all of its channel 2 control lines. The first of these, on pin 11, places test signal 8//16 on the station bus via L138 pin 9. An active (low) 8//16 signal establishes the use of 16-bit transfers across the bus. System bus control logic then determines whether a memory read or a memory write operation is taking place by examining the TXR signal pair on pins 15 and 17 of L138. Once the direction of transfer has been determined, the signal pair is placed on the bus through pins 3 (/SMWR) and 5 (/SMRD). Control line 2A2, pin 13, is not used.

A packet format error (ie, a framing error) activates some of the same logic used to process the receive interrupt and terminate received packet handling. Loss of the received carrier raises /BDCD on pin 6 of L133. Then, provided that the minimum word indicator signal )X'C' is active to show that 13 words have been received, PACK ERR on pin 6 of L133 asserts pin 6 of L108 which, through inverter L109, generates the same /END signal used to indicate the end of a data field.

The controller gates the header buffer address from the Header Address Holding Register into the Receive Up/Down Counter (as at the end of a normal packet receive operation) and decrements this address to store two bytes of word count and two bytes of status. Operation is identical to the normal sequence of events after a closing flag, except that status bit 3 indicates that a framing error has occurred.

When inbound data is present but the FIFO does not contain a data buffer address, the L68 Data Address Not Available Flipflop asserts a /DANA error signal. This situation can only occur when the F0 marker bit is set to one, indicating that a data buffer address is needed, and the FIFO is empty, indicating that there is no data buffer address available. The /DANA indicator flag is clocked by the /HDR/DATA signal on pin 3 of L68 and preserved as bit 7 of the Receive Status Register.

When a station wishes to send a communication, it assembles the frame of the message in a contiguous block of memory 21. In particular, the processor starts the frame with the address of the destination station in the first two bytes of a header of the standard length. After the frame is assembled in the manner indicated, the station processor, using output ports, loads L57 and L58 with the frame byte count and loads L60 and L61 with the address of the frame in memory 21.

The station processor also loads L59 with a value g determined with reference to the currently stored network propagation parameter p and therefore indirectly with reference to the current network propagation number n. If the network propagation number n implied by the promulgated parameter p is not more than 200 bits, the processor loads a value g at least equal to n/8 (rounded up) minus 3; otherwise, the processor loads a value at least equal to n/4 (rounded up) minus 3.

Finally, the controller 32 generates, using an output port, the signal /START TX to have controller 32 begin the transmission operation.

Controller 32, responsive to the signal /START TX, sets latch L30, but further transmitting activity is delayed until a signal from lead /DCD2 indicates by way of L33, L91, and L27 that no signals are being received on outbound channel 14.

When (/DCD2) indicates no activity, the controller asserts its Request to Send (/RTS) line to notify the modem that it needs to transmit an outbound packet. Upon receipt of a Clear to Send (/CTS) indication from the modem, the controller begins to assemble a packet and transmit. If the controller later detects a collision, a /CRASH signal input on pin 1 of L30 cancels ERTS and terminates the send request. After a backoff interval has elapsed (discussed hereafter), a /RETRY signal on pin 4 of L30 presets the Request to Send Latch to issue a new ERTS.

The ERTS signal on pin 5 of the L30 Request to Send Latch asserts pin 5 of the L27 Carrier Sense Circuit. L27 forms a set-reset latch that is set only when the controller does not detect a carrier on the channel. If the carrier is not sensed, the ERTS output from pin 5 of L30 fires the Transmit 1-Shot (L30 and L32) to generate the /START XMIT signal. The ERTS signal also initializes L47 and L15 so that the CONT LAYER signal is high on pin 6 of L47 and pin 5 of L15 is low.

Any one of several special conditions can clear the L30 Request to Send Latch and ultimately remove the active /RTS signal to terminate a transmit operation. When a collision occurs, the CRASH signal from the collision detection circuit activates L12 pin 12 and thereby asserts the clear (pin 1) input to L30. A software generated /CLRRTS signal produced when the station processor accesses output port C0H activates L44 pin 13 and clears L30 via pin 13 of L12. At the end of a transmit operation, /EOT RST from the L68 End of Transmit Flipflop (and L125) activates L44 pin 2 and clears L30 via L12. When power is first applied, the Power On Reset (/POR) indicator (derived from the SMR station bus signal) activates L44 pin 1. This too clears L30 via L12.

The /START XMIT pulse activates the transmit control circuitry. It effects the loading of the value stored in L60,61 into the Transmit Up Counter L82, L83, L84, L85, the value stored in L59 into the Contention Down Counter L36, L37, and the value stored in L57, L58 into the Frame Word Counter L34, L17, L35, and initiates the assembly of a packet.

Multiplexers L100, L101, and L148 effect the assembling of packets. Flag generator L79 supplies the flag sequence to L148 while L100 and L101 make a preliminary assembly of source address and all contents of the frame, which are made available at holding registers L123 and L99, and the contention field, which is available as a repeated sequence of (1 0) from flipflop L147. L101 emits a serial bit stream of the partially assembled packet to L148. Multiplexer L148 completes the packet assembly by incorporating flag sequences from L79, incorporating the check sum, and inserting 0's where necessary to prevent spurious generation of flags.

Serial output data from the L148 Control Multiplexer passes through the L103 Serial Transmit Data Holding Register and is then converted from NRZ to NRZI format before being sent to the modem. The TXCLK signal received from the modem on L69 pin 3 clocks the outbound data. Unlike the received data clock, which is only present while data is being received, TXCLK never stops. The L69 Transmit Clock Synchronization Latch gates the transmit clock with the Clear to Send (BCTS) signal, suppressing TXCLK unless BCTS is active. Leaving pin 5 of L69, the transmit clock drives L48 pins 2 and 9, and L48 then generates the XMIT CLOCK and SHIFT CLOCK signals.

L11, the NRZI Encoder, receives /TXNRZ, the outbound serial data stream, from the L103 Serial Transmit Data Holding Register. Clocked by the SHIFT CLOCK signal once in every bit time interval, the NRZI Encoder converts the serial data from NRZ to NRZI format and sends the converted data out over the TXSI signal line to the modem. During diagnostic loopback operation, serial transmit data from pin 8 of L11 replaces RXSO as the controller data input to the L33 Maintenance Multiplexer, as described earlier.

Shift register L79 is the flag generator for the controller. The inverted flag character bit pattern hardwired onto its A through H parallel inputs (pins 11-4 and 3-5) is also used by three flipflops in L81 as part of the transmit timing sequencer. The flag character bit pattern of 01111110 is created by holding pins 11 and 6 of L79 low while holding pins 3, 4, 5, 12, 13, and 14 high. A flag character is parallel loaded into L79 at the beginning of a transmit operation when /START XMIT is present on L79 pin 1 and the XMIT CLOCK asserts L79 pin 2.

When the /START XMIT signal goes high and the next clock pulse arrives, the first bit of the serialized flag character is sent out on L79 pin 9 to the L148 Control Multiplexer. Thereafter, the L79 Flag Generator constantly circulates its input bit pattern and supplies a continuous stream of serialized flag characters to the Control Multiplexer, which injects a flag character into the serial transmit data stream only when /FLAG OUT is active on its pin 2 and 14 select inputs.

Following the transmission of the opening flag, the 16-bit station address stored in L100, L101 moves in serial form through L148, and this is followed by a stream of repeated (1 0) generated at pin 7 of L 147 and moving through L100, L101 and then L148.

After every 8th bit is transmitted, a /7COUNT signal is generated at pin 6 of L74. This signal is applied to effect down counting of the Contention Down Counter L36, L37. When the (g+1)th 7 COUNT signal is given (g being the value initially loaded into L59), this Counter counts down past zero and generates a borrow output on pin 13. Then at the (g+2) 7-COUNT signal clocks control circuitry L15 and L47 to switch the CBC END paired signals and the CONT LAYER-DATA LAYER pair and end the contention field portion of the packet. The preamble thus terminates after (g+2) 8-bit bytes have been transmitted (where g is the value loaded into L59 at the beginning of the transmission).

After the end of the contention field, the controller switches another flag through L148 and then begins sequencing words of the packet frame from the station memory through L146, L145 and L123, L99 to Shift Register L100, L101 and then along the output path as previously described.

The controller counts the words in an outbound message frame and terminates the transmission after sending the number of words designated by the value loaded into L57 and L58. The word count reflects only words that the controller obtains from station memory.

At the beginning of a transmit operation, a /START XMIT pulse from the Transmit 1-Shot also gates the frame word count from the L57-8 Transmit Frame Word Count Register into the Transmit Frame Word Counter (L17, L34, and L35). Then, once transmit operation begins in the frame, the /=15 COUNT signal that occurs at the fifteenth bit time of each output word asserts pin 4 of L34, the low-order stage of the Transmit Frame Word Counter. Asserting pin 4 of L34 decrements the word count and borrows ripple from stage to stage through L17 and L35.

When the Transmit Frame Word Counter reaches zero, pin 13 on L35 is driven low. The next /=15 COUNT falling edge clocks this low level through the L18 Transmit Frame Word Count Underflow Latch to generate the /MC=0 signal. An active level on /MC=0 indicates that all data has been sent; however, the outbound packet is then completed when the controller performs a CRC, transmits a frame check sequence, and concludes the packet with a closing flag character.

Use of separate but almost identical logic circuits in the Transmit Up Counter and the Receive Up/Down Counter allows full-duplex loopback operation for diagnostics. As each word is sent and the Transmit Up Counter increments through the buffer from its lowest station memory address to its highest, it gates current address information onto the station address bus via tri-state buffers L105 and L106.

A data bus interface circuit connects the controller to the station data bus, which carries only station memory data on its high-order byte and either memory or I/0 data on its low-order byte. Bidirectional bus transceivers L145-6 gate data to and from the station data bus, using their pin 1 direction control inputs to determine the transfer direction. Controller input transfers can be station memory reads by the controller or I/0 writes by the station processor; similarly, controller output can be a station memory write by the controller or an I/0 read by the station processor. In each case, circuitry in L92 determines the transfer direction.

Bus grant signal /BCCGT activates the high-order byte of the data bus transceiver, which handles only memory data, by enabling pin 19 on L146 when the bus grant is received. Since the low-order byte of the data bus transceiver can handle either memory data or I/0 data, it is enabled by either /BCCIO or /BCCGT on pin 19 of L145. After entering the controller through the data bus transceiver, outbound data is then buffered in the Parallel Transmit Data Holding Register (L99 and L123). This data buffering step provides enough time to receive an entire word of parallel data from station memory before applying both bytes simultaneously to the L100 and L101 Shift Register. After one word time, /START XMIT clocks the parallel data out of the Parallel Transmit Data Holding Register and into the L100-1 Transmit Data Shift Register, where it is serialized and shifted out to the L148 Control Multiplexer, one bit at a time, in response to each cycle of the XMIT CLOCK.

Serial data exits the Transmit Data Shift Register via pin 13 of L101 and enters the Control Multiplexer on pin 3 of L148. Used to insert control information into the serial data stream, the L148 Control Multiplexer accepts four different serial data sources as input and, under the control of signals applied to its channel select lines, gates only one of these four inputs along to the L103 Serial Transmit Data Holding Register as output. The following are the four inputs to the control multiplexer: 1) a constantly repeating 01111110 (binary) pattern from the L79 Flag Generator and Timing Sequencer, which enters the Control Multiplexer on pin 6 and is gated onto its pin 7 output for use as a flag character whenever /FLAG OUT is active on pins 9 and 12 of L104; 2) a constantly repeating zero bit that enters the Control Multiplexer on pin 5 and is gated onto its pin 7 output for use as an inserted zero bit whenever /INSERT 0 is active on both pin 10 of L104 and pin 4 of L48. Since zero insertion is not performed during a frame check sequence character, CRC SEND on pin 5 of L48 disables the inserted zero; 3) serialized frame check sequence data, which enters the Control Multiplexer on pin 4 and is gated onto its pin 7 output whenever /CRC SEND is active on pin 5 of L48; 4) serialized output data from the Transmit Data Shift Register (pin 3 of L101), which enters the Control Multiplexer on pin 3 and is gated onto its pin 7 output when all three of the signals /CRC SEND, /FLAG OUT, and /INSERT 0 are inactive. This is the normal source of serial output data.

The output selected through the L148 Control Multiplexer leaves pin 7 of L148 and enters pin 2 of the L103 Serial Transmit Data Holding Register. Clocked at the bit rate by timing signal XMIT CLOCK, the Serial Transmit Data Holding Register holds NRZ data that requires only conversion to NRZI format before it can be gated onto the serial output line and from there to the modem. The output of L148 is also monitored at the L102 Consecutive Ones Counter, which tallies the number of adjacent one bits and, if more than five are counted, signals the need to insert a zero in the serial data stream.

If the L102 Consecutive Ones Counter detects more than five consecutive one bits in the serial data stream, its output pin 11 goes high to assert STOP SHIFT, which basically freezes the serial transmit operation for one bit time. The STOP SHIFT signal prevents data from being shifted out of the Transmit Data Shift Register by asserting pin 6 of both L100 and L101. It also asserts pin 9 of L80, generating an /INSERT 0 signal on L80 output pin 8. STOP SHIFT inhibits the Transmit Timing Sequencer by asserting pin 15 of L79 while /INSERT 0 holds off pin 13 of L81. STOP SHIFT also disables the Contention Bit Pattern Generator by asserting pin 3 of L147 and, therefore, ensures that the 0/1 toggle output on pin 7 of L147 will not change state. (This procedure handles the case of an inserted zero in the sending station address field of the preamble.) The STOP SHIFT signal, in effect, temporarily shuts down the entire controller transmit operation.

The /INSERT 0 signal has several functions, all of which contribute to its main objective: injecting a dummy zero bit into the serial transmit data stream. Fed back through L104 to pin 2 of the L148 Control Multiplexer, /INSERT 0 asserts the Control Multiplexer's pin 5 input onto its pin 7 output line, thereby gating a zero onto the output, since pin 5 of L148 is tied to ground. This zero is applied to pin 2 of the L103 Serial Transmit Data Holding Register, where the next +XMIT CLOCK pulse inserts it into the serial data stream.

Inserted zero bits from L103 also travel back to the L102 Consecutive Ones Counter, where they assert pins 7, 9, and 10. The next +XMIT CLOCK pulse on pin 2 of L102 then resets the Consecutive Ones Counter to begin searching for a new sequence of five consecutive ones. Finally, CRC hardware also receives the /INSERT 0 signal on pin 9 of L73 to prevent it from including the inserted zero in the computed checksum that it is accumulating for use in the frame check sequence. When a zero is inserted, the /INSERT 0 signal on L73 pin 9 goes active, preventing the +SHIFT CLOCK signal from passing through L73 to pin 1 of the L93 CRC Generator chip and preventing L93 from detecting the inserted zero.

Cyclic redundancy check logic helps ensure that transmitted information is received correctly. CRC circuitry includes L73 and L92, along with the L93 CRC Generator chip. It can generate an outbound message checksum or verify the checksum supplied in a received frame check sequence, but it cannot perform both simultaneously. During full-duplex operation, when the controller executes a diagnostic loopback test, transmit checksum generation takes precedence over receive checksum verification and the CRC logic operates only on outbound data.

During normal, half-duplex operation, an active high BCTS signal on pin 10 of L73 enables the transmit SHIFT CLOCK through to L73 pin 8, where it clocks the CRC generator chip to process outbound data. If the active low /BCTS signal is received at L73 pin 5 instead, the received /BRx CLOCK from the modem is gated through on pin 13 of L73, where it clocks the CRC generator chip to process inbound data.

The frame check sequence does not accumulate on inserted zeros. When a zero is inserted during transmission, the /INSERT 0 signal on L73 pin 9 goes active, blocking the SHIFT CLOCK signal from passing through L73 to L93 and, therefore, preventing the zero from being included in the CRC checksum.

When the controller is operating in the data layer, an active level of /7 CLOCK asserts pin 12 of L80 to generate the /=15 COUNT signal eight bit times later. The /=15 COUNT signal marks the beginning of the fifteenth and last bit time in a 1-word timing interval. It is used to clock transmitter input operations, which are word oriented because they accept data from the 16-bit station data bus. For example, /=15 COUNT is fed back to the pin 15 input to both L100 and L101 where it loads the next word (not byte) of data from the Parallel Transmit Data Holding Register into the Transmit Data Shift Register.

Because it is driven by the /7 CLOCK signal, the /=15 CLOCK signal also remains active for only one bit time. The 2Q output from JK flipflop L147 toggles between data layer operation and contention layer operation; it prevents L80 from asserting /=15 COUNT while the controller is operating in its contention layer because the controller does not accept input from the station data bus during contention layer operation and, therefore, does not need a word oriented control signal.

The transmit control sequence begins when L135 pin 2 receives /START XMIT from the L32 Transmit 1-Shot. This in turn asserts the pin 10 preset of the L72 Transmit Flag Enable Flipflop, which generates a /FLAG OUT signal on L72 pin 8. The FLAG OUT signal remains active while the opening flag character is sent. Eight bit times after being asserted, /FLAG OUT returns high when the 7 COUNT signal on pin 12 of L10 gates the next SHIFT CLOCK pulse through L10 to clock pin 11 of L72.

The opening flag character is followed by a contention bit sequence and a shared flag. The CBC END signal becomes active on pin 1 of L35 at the end of the contention field; this again presets L72 and generates a second /FLAG OUT pulse, which remains active while the shared flag is sent. Eight bit times later, the next 7 COUNT pulse again gates SHIFT CLOCK through L10 to clock L72 and remove /FLAG OUT.

The data field and the frame check sequence follow the shared flag. The transmit sequencer idles during data field transmission while it waits for the message count to decrement to zero. When pin 2 of the L111 End of Message Flipflop receives /MC=0 to indicate a zero message count, the next /=15 COUNT clocks an End of Message (/EOM) signal from L111 pin 5 and generates CRC SEND on L111 pin 6. The CRC SEND signal initiates transmission of the frame check sequence and concludes the data field control sequence.

A closing flag is then sent to end the transmit packet. CRC SEND from the L111 End of Message Flipflop asserts pin 10 of L10, and the next /=15 COUNT signal on pin 11 of L10 enables the SHIFT CLOCK through pin 9 of L10 to L72, which asserts /FLAG OUT for the third and final time. While the closing flag character is being sent, L135 pins 9 and 10 are active, which asserts pin 12 of the L68 End of Transmission Flipflop through L46. Eight bit times later, when the closing flag character is complete, the /7 COUNT signal on pin 11 of L68 asserts the End of Transmission (/EOT) signal on L68 pin 8. After yet another eight bit times, the transmit sequence concludes when the next /7 COUNT signal asserts /EOT RST on pin 3 of L125. This final 8-bit time delay compensates for the 2-bit controller propagation delay and the 4-bit modem propagation delay.

In order to transmit the frame, the controller must issue a bus requests and obtain a words of outbound message data from station memory. Once every 16 bits, the /=15 COUNT signal asserts pin 11 of the L111 Transmit Bus Request Flipflop to request station bus access by activating the TXRQ and /XMIT REQ signals on L111 pins 9 and 8, respectively. Either /XMIT REQ or the /RXON receive bus request signal asserts the /BCCRQ station bus request line via pin 6 of L135. At the same time, TXRQ sets pin 12 of the L69 Transmit Bus Underrun Flipflop, which will be clocked by the next /=15 COUNT to abort the transmit operation if the pending bus request is not honored before the next bus request becomes necessary.

If the transmit bus request is not honored quickly enough and the TXRQ signal remains active on pin 12 of the L69 Transmit Bus Underrun Flipflop until it is time for the controller to make a subsequent transmit bus request, the /=15 COUNT signal that triggers the next transmit bus request will also clock L69 to activate /ABT and signal an error via bit 1 of the L140 Controller Status Register. Normally, when the station bus request is honored and the bus grant is received, the same /XMIT OP signal from the L67 Transmit/Receive Flipflop that identifies the bus grant as a station memory read operation also clears the Transmit Bus Request Flipflop and removes the active input to the L69 Transmit Bus Underrun Flipflop.

The controller issues a station bus request each time it needs to transmit a word of message data. When its station bus request is granted, the controller must gate a DMA current address from the Transmit Up Counter to the station address bus and initiate the station memory access. However, transmit bus requests are no different from receive bus requests; therefore, when it receives a bus grant the controller must first determine whether the grant was a transmit grant to perform a station memory read or a receive grant to write to station memory.

The L67 Transmit/Receive Flipflop monitors the station bus grant line (/BCCGT) and sets or clears the Transmit Request (TXR) signal pair to distinguish transmit bus requests from receive bus requests. If the active high TXR signal is asserted on pin 9 of L67 when /BCCGT is received, it asserts /XMIT OP to begin obtaining a word from station memory. /XMIT OP in turn gates the DMA current address from the L82-5 Transmit Up Counter through the L105-6 station address bus drivers to the station address bus.

When certain status bits are active in the L140 Controller Status Register, the controller must request a station processor interrupt by asserting the /BCC TXINT signal and allow the station processor to determine whether it should continue the transmission or take alternative action. Setting the L136 Transmit Interrupt Flipflop generates the /BCC TXINT signal on pin 5 of L136, which is tied directly to the transmit interrupt line to the station processor.

Any of three signals can set the Transmit Interrupt Flipflop and generate a transmit interrupt request under three different circumstances. The /EOT signal sets L136 via L91 when the end of a transmit operation occurs and no serious problems have been encountered. The /BDSR signal sets L136 via L91 when the modem unexpectedly drops its data set ready indication. An active /15 RETRIES signal sets L136 via L91 after the controller detects a collision during each of 15 consecutive attempts to transmit.

Turning now to the receiving operation during a packet transmission, the function of this part of the operation is to compare the preamble of the received packet with the preamble of the transmitted packet to dedect discrepancies indicating a collision with another station's transmission. Comparison of the preamble of a packet recieved during a transmission with that of the transmitted packet is effected in several stages. Any of several failures generates a signal CRASH which terminates the transmission by clearing transmitting latch L30.

After the OPEN FLAG signal is generated, L19 Contention Byte Counter tallies the number of contention bytes received by counting the SIPO FULL signals produced as each incoming byte is received. As L19 counts the number of bytes in the preamble field, it passes the count to comparator L20, which matches the received contention byte count against the original value that was loaded into L59. If the count differs from the value in L59, L20 generates a high EQUAL signal on pin 19. The EQUAL signal is applied to pin 10 of L44. L44 also receives the OPEN FLAG signal on pin 11 and the FLAG IN signal on pin 9. Thus, if while the OPEN FLAG signal is active, a FLAG IN signal occurs (indicating a second flag has been detected) before the EQUAL signal has dropped (indicating a received preamble of the specified length), a FLAG CRASH signal is generated at pin 11 of L13. It can be seen that the FLAG CRASH signal will be generated whenever the opening flag is garbled, since it will then be unrecognized and the OPEN FLAG signal will be active only after the preamble reception has proceded for at least three bytes. The FLAG CRASH signal is also generated if the /CBC END signal goes low before the OPEN FLAG signal goes high.

The 0/1 CRASH signal on pin 8 of L94 occurs when the contention bit pattern has not maintained its alternating zero and one uniformity. Latch L89 monitors the contention bit pattern during a specific time period, called the GO 0/1 window, that begins with detection of a source address match and ends when the shared flag is received. A low on L89 pin 1 holds the latch clear at times outside the GO 0/1 window. During the GO 0/1 window, L89 receives the serial data comprising the contention bit pattern on pin 4. As each bit arrives, it is toggled through the D1 flipflop by the BRX CLOCK input on L89 pin 9. Meanwhile, the D2 flipflop in L89, which is wired up as a toggle with its /Q output tied to its D input, produces an alternating zero and one bit pattern template that duplicates that generated by L147 and assembled into the contention field of the transmitted packet. This is compared against the received contention pattern in xor gate L94 (pins 8, 9, and 10). Any discrepancy between the received pattern and the template generates the 0/1 CRASH signal. Either of 0/1 CRASH applied to pin 5, or FLAG CRASH applied to pin 3 of L26 will produce a low at pin 6, driving pin 11 of L46 low; this, in turn, presets L67. Presetting L67 drives its output pin 5 high and generates the CRASH signal.

An active SRC CRASH signal occurs when the 16 bits following an operning flag differ from the transmitted station address. Address Comparator L78, L74 compares the station address contained in hardware configuration switches (SW1-2) or in the Station Address Register (L54-6) with the value presented from Register L96,L97. If the incoming word matches the controller's station address, pin 19 of L74 is low and pin 4 of L12 is high. When BCTS is high, signaling that transmission is in progress, and pin 4 of L12 is high, signaling an address match, and pin 8 of L49 goes high indicating the two bytes following a flag are assembled in L96, L97, the CONT MATCH signal is generated at pin 9 of L14 and inverted by L2 to give SRC CRASH at pin 2 of Collision Detect Flipflop L2(sec 1). The CHECK timing signal generated at pin 9 of Address Timing Control Flipflop L18(sec 2) via L66(sec 2) and L24 pin 8 clocks the Collision Detect Flipflop to generate the CRASH signal if the address match is not detected at the time the 16 bits following an opening flag are presented at the Address Comparator.

As mentioned earlier, the CRASH signal terminates the transmission.

The collision back off algorithm timing logic is based on the "slot time" concept. A slot time is the time required to overcome propagation delay, modem delay, and contention determination. In this particular case, one base slot time (16 usec) is defined as the propagation delay in a dual-cable, 5000-ft system.

The L1 Base Slot Time Oscillator is a 10% duty cycle, 16-usec, free running oscillator. When a 16-usec slot time is required, software loads a value of FH into L33B. Then, when it receives the /LD SLOT GEN signal on its pin 9 input, L33B loads L33A with ones (FH). Any clock input to L33A pin 2 then generates a carry on L33A pin 15, allowing the 16-usec clock input on pin 2 to generate a 16-usec clock output on pin 15. Of course, the slot time must be varied to accommodate networks other than the 5000-ft system.

To handle the general case of a network with arbitrary cable length, the controller has a variable slot time generator that alters the slot time under software control via L33B. To select a slot time, station processor software loads the appropriate value into L33B. Upon receiving the /LD SLOT GEN signal on its pin 9 input, L33B loads L33A with the value established by the software.

The counter still increments upon receiving each tick of the 16-usec clock on pin 2, and the carry output is delayed until it overflows. If, for example, a 2-bit delay is needed in addition to the 16-usec base slot time, L33A must be loaded with DH (1101). The counter will then increment twice before the carry signal is generated on its pin 15 output, extending the 16-usec clock by two bit times.

Collision Counter L137 counts the number of consecutive collisions or "crashes" between successful transmission attempts. L137 receives the /CRASH signal as input on pin 3 and counts up until the next start transmit signal. station processor software can read the value produced from L137 through L138 by means of an I/0 port access via /RD COLL CT.

The /GIVE UP signal is generated after an 8H count has been reached. This active low signal asserts L25 pin 3, but it has no immediate effect because L25 needs a positive clock to generate the /15 RETRIES signal. Therefore, when the count of L137 reaches FH, the /GIVE UP signal goes inactive (high) and thereby clocks the /15 RETRIES signal out of L25.

The /15 RETRIES signal asserts pin 8 of the L140 Transmit Status Register. The station processor can read this status flag and determine whether or not to reinitiate the transmit operation. The signal from L25 pin 5 clears the L7 and L8 counters and reloads the L33A Slot Counter. A new count can begin upon receipt of the next /CRASH signal.

The backoff algorithm forces the station detecting a collision to stop sending and wait for a designated number of slot times before attempting to transmit again. When successive collisions occur, the number of slot times between transmission attempts increases exponentially. Each controller generates a random number which it logically ANDs with the binary exponent of the slot time increment, reducing the possibility that two or more stations involved in a collision will wait for the same number of slot times and then attempt to retransmit at the same time. Instead, after two or more stations involved in a collision have executed the back off procedure, it is more likely that these stations will request transmission slots at different times. After a station recognizes that a collision has occurred and invokes its backoff procedure, it follows normal procedure to attempt another transmission. An 8-bit, pseudorandom number generator provides the random value.

The binary exponential number generator L4 generates a number in exponential sequence (1, 3, 7, 15, . . .) upon the arrival of each CRASH signal on pin 8. L6 accepts this number and combines it with the random number generated by L3. Counters L7 and L8 then count up from the random number on their inputs and generate the /RETRY signal off L7 pin 12 at the end of the count. This procedure provides the required random delay. The count is available to be read on the lower 8 data bits through the bidirectional transceiver L9 and I/0 port signal /RD ANDed CNT. The counters are cleared after 15 retries by a signal from pin 5 of L25.

There is a 50% chance that two stations will generate identical time delays after their first collision, which inevitably leads to a second collision. There is a 25% chance of identical delays after the second collision, a 12.5% probability after the third collision, and proportionally decreasing chances thereafter. There is also the possibility that the controller will experience 16 consecutive collisions without having the opportunity to transmit successfully. In this case, after 15 retries, the controller will notify the station processor of its condition via the Transmit Status Register.

When 16 consecutive collisions have blocked a transmission attempt, the station processor can either shut down controller operation or reinitiate the transmit function, depending on certain network parameters that it checks in pre-programmed tables. If the network usually handles a high volume of traffic, the station processor may elect to reinitiate the transmit operation.

If the network has only a few other channels that are transmitting, the station processor will determine that there is a problem and take appropriate remedial action.

Additional details of the operation can readily be seen from the schematic drawing of composite FIG. 2.

Since the logic of the controller operation is somewhat complex it will be worthwhile to recapitulate the way the collision management strategy is implemented.

Taking g as the value loaded into the L59 register, the contention field will be transmitted until this register is counted down, a down count occurring each time an 8-bit section of packet is sent. Taking account of additional sequencing delays, the last bit of the contention field will be the $8(g+2)$th packet bit transmitted, and the last bit of the shared flag will be the $8(g+3)$th packet bit.

When a transmitting controller receives a packet a CRASH signal will be generated and terminate transmission under the following conditions: If another station is the sender of the initial portion of the packet received, the source comparison with the subject controller's address will not match and CRASH will be generated at the end of the source address field when the 9th received packet bit arrives at SR7 at the top of the SIPO, corresponding to the time when the second half of the address becomes available to the comparator. (For the present discussion received bits will be counted as they arrive at SR7 of the SIPO.) If the subject station is the sender of the initial portion of the packet received, the specific events depend on where in the received packet the collision occurs:

(1) If the head of the collision starts in the opening flag of the received packet (bits 1–8), the flag will not be recognized as such, a FLAG GEN signal will be generated via L49 pin 8 when 25 bits are received, the source address comparison window will be placed over the field extending from 25 to 40 bits from the start of the packet where there will be no source address code, and a CRASH will be generated.

(2) If the head of the collision starts in the source address (bits 9–24), the FLAG GEN signal will be generated via L115 pin 6, a source address comparison will be made against the field extending in bits 9–24, but because of the collision, a match will not occur and a SRC CRASH will occur.

(3) If the head of the collision starts in the contention field extending from bit 25 through bit $8(g+2)$, the 0/1 CRASH will be generated.

(4) If the head of the collision starts in the shared flag (bits $8(g+2)+1$ through $8(g+3)$), the shared flag will not be recognized as such, the 0/1 window will not be terminated, and the garbled flag character will be compared with the contention template and generate the 0/1 CRASH.

Thus it is seen that the preamble of the packet will extend for $8(g+3)$ bits, and if a collision creates a garble in any portion of this preamble as it is received, the transmission will be terminated.

The last collision detection possibility occurs if the collision occurs in the shared flag. In this case the CRASH signal will arise when the flag flows through L94 the 0/1 Comparator. It might be as late as the fifth bit of the flag sequence that generates the crash because of the adventitious correspondence of the first part of the flag character to the contention field (or later with decreasing probability during a statistical resolution period). When the fifth bit of the shared flag is in the comparator and the transmission is terminated, the 7th bit of the frame will be applied to the Bit Delay Flipflop L72 and (if the controller is at the distal end of the network) another n bits are strung along the cables. Thus there might be as many as n+7 signals of the frame transmitted prior to termination.

If n+7 bits is less than the 208 bits of frame required to actuate the Minimum Frame Word Flipflop L136, a collision detection strategy is implemented by loading into L59 the value g=(n/8) - 3 (with fractions rounded up.) Since in these circumstances, packets with collisions will not have 208 bits of frame, the packet frame will be blocked from effective entry into the memory of any receiving station by the inaction of L136.

If n+7 bits is as much or more than the 208 bits of frame to actuate the Minimum Frame Word Flipflop, an alternative strategy is implemented by loading into L59 the value g=(n/4) - 3. In these circumstances, the preamble of the packet will be formed with sufficient length so that the controller will still be sending preamble at the instant when it will detect the last possible collision and terminates its transmission. A packet collided packet will therefore never extend to the destination address of the packet so that no controller will process anything into its station memory.

What is claimed is:

1. A method of operating a communication network connecting a plurality of computer stations each having a memory, the function of the network being to transfer data from the memory of one station to that of another, said network having an inbound channel and an outbound channel connected at a head end, the inbound channel being for conducting transmissions toward the head end, and the outbound channel for conducting transmissions away from the head end, the stations being connected to transmit transmissions to the inbound channel and to receive transmissions from the outbound channel, data transmissions being effected over said network in the form of packets of sequential discrete signals transmitted at a uniform rate, and the time required for a signal transmitted by the ultimate station to the head on the inbound channel and thence on the outbound channel to the ultimate station being more than the time required to transmit 32 discrete signals, including the steps:

defining a current network propagation parameter p derived from the network signaling rate and the time required for a signal transmitted from the ultimate station to propagate to the network head and back to the ultimate station, said parameter p providing an indication of the number of discrete signals n that can be transmitted from the ultimate station on the inbound channel before the first of such signals can be detected on the outbound channel at the ultimate station, Promulgating p to each station, storing the value of p at each station, forming, with reference to the stored value of p, each pocket for transmission so as to have greater than n discrete signals, starting to transmit a packet only when no signals are being received by the station from the outbound channel, comparing, with reference to the stored value of p, the first n signals of the packet next received after starting transmission with the first n signals of the packet being transmitted to ascertain if there are discrepancies therebetween, terminating transmission when discrepancies are discerned, and absent such discrepancies, transmitting an entire packet.

2. A method as claimed in claim 1, including the additional steps:

revising the definition of p whenever the network is changed to reflect such changes, and promulgating said revised value of p to each station of the network to supersede the previously promulgated value.

3. A method as claimed in claim 1 or 2, wherein each packet for transmission is formed with reference to the stored value of p so as to have greater than 2n discrete signals, and including the steps:

evaluating, with reference to the stored value of p, the number of discrete signals received in each received packet accepting no data as valid unless received in a packet that contains more than 2n discrete signals.

4. A method as claimed in claim 1 or 2, wherein each packet for transmission is formed to have at least 2n preliminary signals and after said preliminary signals a sequence of signals designating the station which is to receive the packet and including the step:

accepting at a given station no data as valid unless received in a packet that contains a sequence of signals designating said given station.

5. A method as claimed in claim 1 or 2, wherein each sending station forms packets with a coded indication of the number q of discrete signals that can be transmitted by said sending station on the inbound channel before the first of such signals is received by the sending station on the outbound channel, said coded indication being included within the first r discrete signals of the packet, r being uniform for all stations of the network, wherein said each sending station forms packets so as to have a number of signals greater than n plus the greater of r or its own q, and including the steps:

analyzing at each station the first r signals of incoming packets to ascertain a putative value q′ of the number of discrete signals that can be transmitted by the packet sending station on the inbound channel before the first of such signals is received by the packet sending station on the outbound channel, accepting no data as valid unless it is in a packet with more than n plus the greater of q′ or r discrete signals.

6. Apparatus for interfacing a communication network to one of a plurality of computer stations each having a memory, the function of the network being to transfer data from the memory of one station to that of another, said network having an inbound channel and an outbound channel connected at a head end, the inbound channel being for conducting transmissions toward the head end, and the outbound channel for conducting transmissions away from the head end, the stations being connected to transmit transmissions to the inbound channel and to receive transmissions from the outbound channel, data transmissions being effected over said network in the form of packets of sequential discrete signals transmitted at a uniform rate, and the time required for a signal transmitted by the ultimate station to the head on the inbound channel and thence on the outbound channel to the ultimate station being more than the time required to transmit 32 discrete signals, including packet transmitting means and packet receiving means, network parameter storing means for receiving and storing a current network propagation parameter p indicative of the number n of sequential discrete signals which may be transmitted onto the inbound channel by the ultimate station before the first such signal is received by the ultimate station from the outbound channel, channel activity sensing means to receive an indication of activity on said outbound channel, delaying means to delay starting to transmit until no signals are being received from the outbound channel, packet assembling means for assembling each packet for transmission so as to have the total packet length greater than n discrete signals, comparing means for comparing the first n signals of the packet next received after starting transmission with the first n signals of the packet being transmitted, transmission terminating means for terminating transmission when discrepancies are discerned in such comparing, and absent such discrepancies, transmitting an entire packet.

7. Apparatus as claimed in claim 6, wherein said packet assembling means assembles each packet for transmission with an initial sequence of at least 2n signals followed by a receiving station address sequence designating the station which is to receive the packet and positions all packet data following after said receiving station address sequence, and including, discriminating means that accepts no data that is not preceded in a received packet with a signal sequence designating the address of said apparatus.

8. Apparatus as claimed in claim 6, wherein said assembling means assembles each packet to have greater than 2n discrete signals, and including:

counting means for counting the number of discrete signals received in each received packet, discrininating means for accepting no data as valid unless received in a packet that contains more than 2n discrete signals.

9. Apparatus as claimed in claim 6, 7, or 8, wherein said packet assembling means assembles within the first n signals in each packet a contention field containing a periodicly repeating sequence of signals, the number of repeats of such sequence being dependent on the stored value of p.

10. Apparatus as claimed in claim 6, 7, or 8, wherein said packet assembling means assembles within the first n signals in each packet a sequence of signals uniquely identifying said apparatus.

11. Apparatus for interfacing a computer station with a communication network, the interfacing apparatus from time to time receiving a packet with data from the network and storing the data therefrom in a station memory at a location assigned by the station and identified by an address, comprising an address queue means for storing a plurality of addresses, said addresses being ordered by age in said address queue means, an address queue storing means for receiving from the station an address designating a location in station memory where data from a packet to be received is to be stored, and for storing the address when received in said address queue means, said address queue operating to present successive addresses with an interval shorter than the time required by the computer station to supply a new address, data entry means for entering data from a packet on arrival thereof in the station memory at a location identified by the oldest address in said address queue means and, when the packet data has been validly stored, cancelling said oldest address from said address queue means, whereby the interfacing apparatus enters data from packets into said station memory at preassigned locations during periods wherein data packets are received from the network at a rate exceeding the maximum rate at which the station is capable of assigning addresses.

* * * * *